US006760009B2

(12) United States Patent
Omura et al.

(10) Patent No.: US 6,760,009 B2
(45) Date of Patent: Jul. 6, 2004

(54) COORDINATE POSITION INPUTTING/DETECTING DEVICE, A METHOD FOR INPUTTING/DETECTING THE COORDINATE POSITION, AND A DISPLAY BOARD SYSTEM

(75) Inventors: Katsuyuki Omura, Kanagawa (JP); Takao Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/164,648

(22) Filed: Jun. 10, 2002

(65) Prior Publication Data
US 2003/0001825 A1 Jan. 2, 2003

Related U.S. Application Data

(63) Continuation of application No. 09/328,402, filed on Jun. 9, 1999, now Pat. No. 6,421,042.

(30) Foreign Application Priority Data

Jun. 9, 1998 (JP) .......................................... 10-160302
Jul. 30, 1998 (JP) .......................................... 10-215321
Aug. 17, 1998 (JP) .......................................... 10-230960

(51) Int. Cl.[7] ................................................ G09G 5/08
(52) U.S. Cl. ........................ 345/157; 345/156; 345/158
(58) Field of Search ............................... 345/157, 156, 345/158, 175, 857, 862

(56) References Cited

U.S. PATENT DOCUMENTS 5,317,140 A * 5/1994 Dunthorn .................... 250/221
5,489,938 A * 2/1996 Maruyama et al.
5,502,568 A * 3/1996 Ogawa et al. ............... 356/375
5,694,495 A * 12/1997 Hara et al. ................... 382/324
5,757,674 A * 5/1998 Marugame ................... 702/152
5,923,417 A * 7/1999 Leis .......................... 356/141.1
6,008,798 A * 12/1999 Mato, Jr. et al. ............ 345/168
6,100,538 A * 8/2000 Ogawa .................... 250/559.29
6,421,042 B1 * 7/2002 Omura et al. ............... 345/157
6,434,278 B1 * 8/2002 Hashimoto .................. 382/285

OTHER PUBLICATIONS

U.S. patent application Ser. No. 10/164,648, Omura et al., filed Jun. 10, 2002.

U.S. patent application Ser. No. 10/623,558, Sakuyama et al., filed Jul. 22, 2003.

* cited by examiner

Primary Examiner—Matthew C. Bella
Assistant Examiner—Mackly Monestime
(74) Attorney, Agent, or Firm—Oblon, Spivak, McClelland, Maier & Neustadt, P.C.

(57) ABSTRACT

The coordinate-position inputting/detecting device comprises a lighting device for emitting light into an entry area into which an arbitrary pointing body is inserted to perform an entry operation. At least two image pickup devices are provided with a prespecified space therebetween on a peripheral section of the entry area for picking up images of the pointing body illuminated by the light from the lighting device. Position on the CCD of the image pickup devices where an image of the pointing body is formed is obtained according to output from each of the image pickup devices. Coordinates of the position of the pointing body in the entry area are calculated from these positions.

24 Claims, 72 Drawing Sheets

DRAWING

GESTURE COMMAND

COORDINATE POSITION INPUTTING/DETECTING DEVICE, A METHOD FOR INPUTTING/DETECTING THE COORDINATE POSITION, AND A DISPLAY BOARD SYSTEM

The application is a continuation of application No. 09/328,402, filed on Jun. 9, 1999, now U.S. Pat. No. 6,421,042.

FIELD OF THE INVENTION

The present invention relates to a method and device for inputting/detecting the coordinate position and a display board system and more particularly, to a method and device for enabling input and/or detection of coordinates of not only a two-dimensional position but also a three-dimensional position with improved operability as well as a display board system which uses the coordinate-position inputting/detecting device.

BACKGROUND OF THE INVENTION

Conventionally there has been known a display board which can read freehand information written on a whiteboard or on a writing surface of a writing sheet with some writing tool using a dedicated scanner and output the read information onto a recording paper with a dedicated printer. While, in recent years, there has also been suggested a display board system in which a coordinate-position inputting/detecting device is provided in a writing surface of a display board for enabling inputting of freehand information written in the writing surface in real time.

For instance, the Soft Board manufactured and provided by the Microfield Graphics, Inc. is a device having a coordinate-position inputting/detecting device provided on a whiteboard. This Soft Board can acquire visual data such as characters and pictures drawn on the whiteboard into a computer in real time. With the display board system using this Soft Board, it is possible to input visual data captured with the Soft Board into a computer for displaying the data on a CRT thereof. The data may be displayed on a large-sized screen using a liquid crystal projector, or the data may be printed on a recording paper using a printer. It is also possible to project an image on a screen of a computer with the Soft Board connected thereto onto the Soft Board with a liquid crystal projector and operate the computer on the screen of the Soft Board.

There has also been disclosed a display board system having a display unit for displaying characters and images thereon, a coordinate-position inputting/detecting device with a coordinate-position input surface (a touch screen) provided on a front surface of the display unit, and a control unit for providing controls over display by the display unit according to input from the coordinate-position inputting/detecting device. This system forms a display surface and a writing surface of the display board by making use of the display unit and the coordinate-position inputting/detecting device.

For instance, in case of the Smart 2000 manufactured and supplied by the SMART Technologies Inc., when an image of a character, a picture, or a graphics is projected with a liquid crystal projector connected to a computer onto a panel, freehand information is captured into the computer using a coordinate-position inputting/detecting device (writing surface) provided on a front surface of the projection surface (display surface) of the panel. Then, the freehand information is synthesized with the image information in the computer, and the synthesized information can be displayed again with the liquid crystal projector in real time.

The display board system can display an image inputted by the coordinate-position inputting/detecting device that is superimposed on an image on the screen displayed by the display unit as an overwritten. Because of this characteristics, this display board system has been used in conferences, presentations, or for educational purposes and its effect in actual use has been highly evaluated. When a communicating function for transferring audio or video data is integrated with the display board system as described above, the display board system can also be used as an electronic conference system by connecting remote sites with a communication line.

By the way, as a coordinate-position inputting/detecting device used in the display board system as described above, devices described below are known according to a difference between input methods thereof. As a first case, there is an optical coordinate-position inputting/detecting device disclosed in Japanese Patent Laid-Open Publication No. HEI 8-240407. This coordinate-position inputting/detecting device has two infrared CCD cameras and these cameras detect a peak signal of an infrared ray from the infrared LED provided on a pen-type pointing body inserted in a coordinate-position entry area with the infrared CCD camera to compute a coordinate position pointed by the pointing body.

As a second case, there is an optical coordinate-position inputting/detecting device disclosed in Japanese Patent Laid-Open Publication No. HEI 9-319501. In this coordinate-position inputting/detecting device, the coordinate entry area is scanned with a laser beam. A pen pen-type pointing body with a corner cube reflector as a recursive reflecting member provided thereon is inserted into the coordinate entry area and an arbitrary position is pointed thereby. Light is recursively reflected by the pointing body. The reflected light is received by a plurality of light-receiving elements and a position pointed by the pointing body is computed.

With the coordinate-position inputting/detecting device in the above mentioned case, however, as a dedicated pointing body is required for pointing to an arbitrary position in the coordinate entry area, an input operation with, for example, a fingertip, is not allowed, which is inconvenient. Furthermore, when the dedicated pointing body is lost or damaged, the input operation using the coordinate-position inputting/detecting device can not be carried out. On the other hand, in the coordinate-position inputting/detecting device in the first case, an infrared LED has to be provided in a pointing body, therefore, power unit or so for the pointing body is required, which is inconvenient from the view point of its maintenance.

Furthermore, in the coordinate-position inputting/detecting device, coordinates of only a two-dimensional (X-Y direction) position can be inputted, therefore, it is difficult to determine movement of a pointing body in the vertical direction (Z direction) and a double click or the like.

SUMMARY OF THE INVENTION

It is an object of the present invention to improve, for the purpose of solving the problems described above, operability and usability of a method and device for inputting/detecting the coordinate position by enabling specification of coordinates of a position in an entry area pointed thereto with an arbitrary pointing body such as a fingertip or an ordinary pen without using a particular pointing device.

It is another object of the present invention to realize a coordinate-position inputting/detecting device enabling entry of not only a two-dimensional position but also a three-dimensional position.

It is another object of the present invention to improve workability and adaptability to handling of a display board system by using the coordinate-position inputting/detecting device with excellent operability.

In the present invention, an image of a pointing body inserted into an entry area is picked up by at least two image pickup elements. Then, the position of the image of the pointing body formed on each of the image pickup elements is obtained according to the output from each of the image pickup elements. Finally, coordinates of the position of the pointing body are identified by using the computed positions of the images. Therefore, entry operation can be carried out using an arbitrary pointing body without using a particular pointing body.

In the present invention, light is emitted from light emitting unit into the entry area. An image of a pointing body illuminated by the light emitted from the light emitting unit is picked up by at least two image pickup elements. Then, the position of the image of the pointing body formed on each of the image pickup elements is obtained according to the output from each of the image pickup elements. Finally, coordinates of the position of the pointing body are identified by using the computed positions of the images. Therefore, an entry operation can be carried out using an arbitrary pointing body without using a particular pointing body.

In the present invention, the light emitting unit and the image pickup devices are so placed that the direction of the light emitted from the light emitting units is substantially the same as the direction from which the pointing body is viewed from each of the image pickup elements. Therefore, the light emitted from the light emitting unit does not directly enter the image pickup elements, and also shadow is not generated on the pointing body as much as possible.

In the present invention, there is provided an incident light preventing unit for preventing the light emitted from the light emitting unit from directly entering into each of the image pickup elements. Therefore, the light emitted from the light emitting means does not directly enter into the image pickup elements.

In the present invention, the light emitting unit comprises at least a light source and a mirror. Therefore, the light emitted by the light source can be reflected by the mirror and diffused along the entry area, so that, a light that covers the entire entry area can be emitted from the light emitting unit.

In the present invention, the angle of the light emitted by the light source can be changed by operating the mirror, so that, direction in which the light is reflected from the mirror can be adjusted.

In the present invention, light reflected by a mirror is received by a light receiving element, and the angle of the mirror is changed according to intensity of the light received by the light receiving element.

In the present invention, there is provided a reflection preventing unit which prevents the light emitted by the light emitting unit from its being reflected, so that unnecessary light does not enter the image pickup elements.

In the present invention, when coordinates of the same position are obtained continuously then it is determined that the coordinates are obtained due to dust or something. In such a case the coordinates of this position are not stored in the memory and also are not outputted to an external device. As a result, it is possible to prevent coordinates of the position obtained due to dust or something from its being outputted to an external device.

In the present invention, optical distortion of an image of a pointing body picked up by each of image pickup elements is electrically corrected, and higher quality of an image of a pointing body can be obtained.

In the present invention, when a plurality of pointing bodies each with a different pattern provided thereto are inserted into the entry area, patterns are recognized according to each output from the image pickup elements, which allows an entry operation concurrently using the plurality of pointing bodies to be carried out.

In the present invention, width of the pointing body is determined according to images of the pointing body picked up by image pickup elements.

In the present invention, the coordinates of the position of a pointing body identified by coordinate-value identifying unit is corrected by using the width of the pointing body obtained by the width identifying unit so that it is possible to obtain coordinates of an accurate position.

In the present invention, image of an entry area previously picked up by each of image pickup elements is stored as a reference image, images of the entry area picked up afterward by each of the image pickup elements are extracted. Then, a difference between the corresponding reference images and images of the pointing body inserted into the entry area obtained by the corresponding image pickup elements is extracted. From this difference, a position in the image of each of the image pickup elements where an image of the pointing body is formed is computed and coordinates of the position of the pointing body are obtained using the computed positions of the pointing body.

In the present invention, image of the entry area is picked up utilizing two-dimensional image pickup elements, which allows coordinates of a three-dimensional position of a pointing body to be computed.

In the present invention, a reference image consists of an image only of a background plate, so that an image of only a pointing body can easily be extracted from an image with the background plate and the pointing body included therein.

In the present invention, image of the pointing body can easily be extracted just by removing a reference pattern from an image in which the background plate and the pointing body is present.

In the present invention, an area photographable by the image pickup element is restricted by an area restricting unit so that the area is adjusted to the entry area. Therefore, the image pickup element may not be affected by noise such as interference light.

In the present invention, when coordinates of the same position are obtained continuously then it is determined that the coordinates are obtained due to dust or something. In such a case the coordinates of this position are not stored in the memory and also are not outputted to an external device. As a result, it is possible to prevent coordinates of the position obtained due to dust or something from its being outputted to an external device.

In the present invention, by deciding each image of an entry area used to compute coordinates of a position abandoned by updating means as each new reference image, dust existing on the entry area is taken in as a portion of a reference image. Therefore, it is prevented that coordinates of a position of dust are disadvantageously computed.

In the present invention, a coordinate-position inputting/detecting device is provided in the front surface of a display unit for displaying characters and images, and a display surface and a writing surface of a display board are formed with the display unit and coordinate-position inputting/detecting device, so that viewability of the display unit and operability of the system can be improved.

In the present invention, a coordinate-position inputting/detecting device is provided in the front surface of a display unit for displaying thereon characters and images. As a result, a display surface and a writing surface of the display board are formed with the display unit and coordinate-position inputting/detecting device, so that viewability of the display unit and operability of the system can be improved. Furthermore, the display board system comprises a frame unit having a holding section for holding a display surface and a writing surface of the display board at a specified height, a printer accommodating section for accommodating the printer therein, and a control unit accommodating section for accommodating the control unit therein. The control unit accommodating section, printer accommodating section and the holding section are arranged in the vertical direction in this order from the bottom. As a result, transport and installation of the system can easily be carried out.

In the present invention, by using a plasma display as a display unit, optimization of the display board system can be performed. Namely, use of the plasma display allows the thickness of a display unit to be reduced, and the plasma display also has high brightness as well as a wide viewing angle, and can reproduce moving pictures smoothly, so that the plasma display is preferable as a display unit of the display board system.

In the present invention, a keyboard placement section for placing a keyboard connected to a personal computer is provided at a position in the upper side of the printer accommodating section and in the lower side of the holding section. Therefore, handling capability of the system is improved.

In the present invention, an angle adjusting unit for adjusting an angle of a display surface and a writing surface of the display board is provided in a holding section. Therefore, disturbance light coming into the display unit (display surface), especially, light from lighting equipment such as a fluorescent tube on the ceiling can be prevented.

In the present invention, a plurality of connecting terminals for connecting various types of information equipment and AV equipment such as a digital camera, a DVD player, and video equipment are provided in a display unit and is usable as a large-sized screen monitor. Therefore, the display board system can be used in any occasion.

Other objects and features of this invention will become understood from the following description with reference to the accompanying drawings.

DESCRIPTION OF THE PREFERRED EMBODIMENTS

Detailed description is made hereinafter for embodiments of the a method and device for inputting/detecting the coordinate position according to the present invention and a display board system using the same with reference to the attached drawings.

Figure 1:
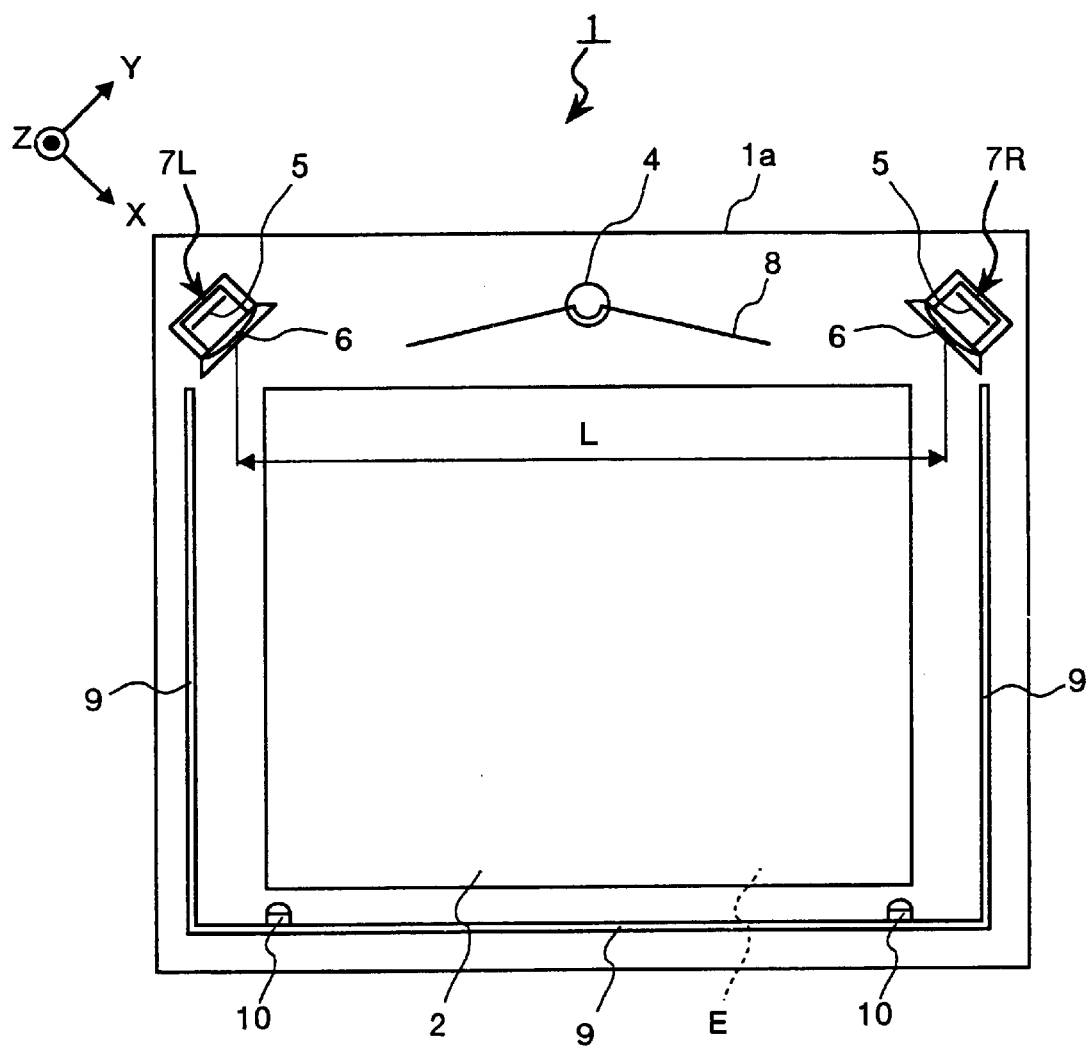
FIG. 1 is a front view showing general configuration of a coordinate-position inputting/detecting device according to Embodiment 1 of the present invention.

FIG. 1 is a front view showing general configuration of a coordinate-position inputting/detecting device according to Embodiment 1 of the present invention. FIG. 1 shows a state when the coordinate-position inputting/detecting device according to Embodiment 1 is attached to the front surface of a writing surface E (e.g., a white board) of a display board as an example. This coordinate-position inputting/detecting device 1 comprises a frame 1a having a rectangular space having substantially the same size as the writing surface E of a display board, namely having an entry area 2 where a user performs an entry operation using a pointing body such as a finger or a pen. Provided in this frame 1a are a lighting device 4, image pickup devices 7L and 7R, a shade 8, a light absorbing member 9, and a light receiving element 10. The pointing body may be anything such as a user's finger or hand, or a pen on the condition that an arbitrary position can be pointed therewith.

Figure 2:
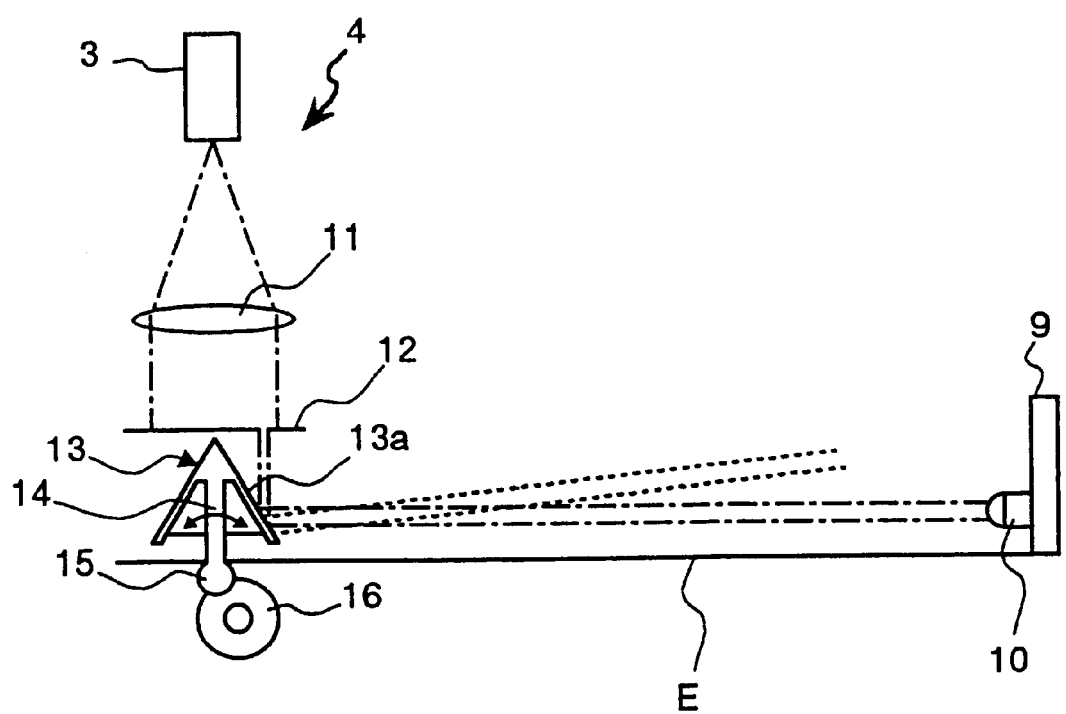
FIG. 2 shows general configuration of a lighting device of the coordinate-position inputting/detecting device shown in FIG. 1.

The lighting device 4 is provided at substantially the center of the upper side of the entry area 2 and emits light which spreads in parallel with the writing surface E as well as over the entire entry area 2 using the light from a light source (Refer to FIG. 2). The entry area 2 in the coordinate-position inputting/detecting device 1 according to Embodiment 1 is actually formed with the light emitted from the lighting device 4 so as to cover the whole surface of the writing surface E.

The image pickup devices 7L and 7R are provided at both edges of the upper side of the entry area 2 on the same side as that of the lighting device 4 and are separated from each other by a distance L. The image pickup devices 7L and 7R pick up an image of a pointing body inserted into the entry area 2. Each of the image pickup devices 7L and 7R have at least a CCD (Charge Coupled Device) 5 as a one-dimensional image sensor (one-dimensional image pickup element) for outputting image information (an image of an object) as an electric signal, and a focusing optical lens 6 for forming an image of the pointing body inserted into the entry area 2 on the CCD 5 as shown in FIG. 1. The CCD 5 and the focusing optical lens 6 are separated from each other by a distance f (Refer to FIG. 5).

The shade 8 is provided on the lighting device 4 so that the light from the lighting device 4 can uniformly be emitted over the entire entry area 2. Further, the shade 8 also prevents the light emitted from the lighting device 4 to be directly entering into the image pickup devices 7L and 7R. The light absorbing member 9 is provided in the peripheral section of the entry area 2 except in the upper side thereof. This light absorbing member 9 suppresses reflection of the light by absorbing the light emitted from the lighting device 4. Namely, the light absorbing member 9 is provided in order to prevent the reflected light (scattered light) due to the light emitted from the lighting device 4 from its entering the image pickup devices 7L and 7R.

Furthermore, the light receiving elements 10 (e.g., PIN photodiodes) are located on the light absorbing member 9 at both edges of the lower side of the entry area 2. These light receiving elements 10 receive the light emitted from the lighting device 4 and outputs a signal according to intensity of the received light.

In the coordinate-position inputting/detecting device 1 according to Embodiment 1 as shown in FIG. 1, the lighting device 4 as well as the image pickup devices 7L and 7R are located along one line in the upper side of the entry area 2. Thus, the direction in which the light is emitted from the lighting device 4 is the same as that to which an object (pen A) is viewed from the image pickup devices 7L and 7R. As a result, the light emitted from the lighting device 4 can be prevented from directly entering into the image pickup devices 7L and 7R, and also production of a shadow on the pointing device viewed from the image pickup devices 7L and 7R can be prevented as much as possible. However, the lighting device 4 as well as the image pickup devices 7L and 7R may be located not in the upper side of the entry area 2 but, for instance, in the lower side thereof, therefore, FIG. 1 does not limit the location of the attachment of the lighting device 4 as well as of the image pickup devices 7L and 7R.

When a pointing device such as a finger or a pen is inserted into the entry area 2, although detailed description will be made later, the light emitted from the lighting device 4 is irregularly reflected by the pointing device, and a portion of the irregularly reflected light is detected by each CCD 5 in the image pickup devices 7L and 7R respectively. In other words, the image pickup devices 7L and 7R in Embodiment 1 have sensitivity only when the pointing device is inserted into the entry area 2, and capture an image (pick up an image) of the pointing device inserted into the entry area 2 through the irregularly reflected light.

By the way, in the description below, a state where a portion of the pointing device such as a finger and a pen contacts the writing surface E and moves along the writing surface E with the device contacted thereto will be called as a pen-down state. Comparing this pen-down state to a writing state with a fountain pen or a ball-point pen, the former state corresponds to a state where a tip of the pen contacts and ink oozes out from the pen tip. Then, a state where the pointing device moves in the vertical direction with respect to the writing surface E and there is no contact between the device and the writing surface E will be called as a pen-up state. Comparing the pen-up state to a writing state with a fountain pen or a ball-point pen, the former state corresponds to a state where a tip of the pen is moved away from a paper at intervals between strokes of characters or during movement between characters and the ink does not ooze out from the pen tip.

Therefore, by enabling determination as to whether the pointing device is in a pen-up state or a pen-down state in the coordinate-position inputting/detecting device 1, it is possible to electronically imitate a writing operation such that characters and graphics are drawn on paper with a fountain pen or a ball-point pen.

In the coordinate-position inputting/detecting device 1 according to Embodiment 1, when the writing surface E is viewed along the same direction as that of the image pickup devices 7L and 7R, it can clearly be understood that a layer of light having a certain thickness along the vertical direction of the writing surface E is formed because of the light emitted from the lighting device 4. Herein, the pen-up/pen-down state will be described assuming that light is emitted from the lighting device 4 very close to the writing surface E. When a pointing device is gradually being inserted into the entry area 2 the quantity of light reflected by the pointing device gradually increases. A pen-down state is a state where the pointing device penetrates through the entire layer of the light and contacts the writing surface E. In this pen-down state, the quantity of light reflected by the pointing device is the maximum. On the other hand, a pen-up state is a state where the pointing device is floating over the writing surface E, therefore, the quantity of light reflected by the pointing device is less as compared to that in the pen-down state. In other words, the area on the pointing device that is lighted because of the light emitted from the lighting device 4, namely, the area from where the light is reflected in the pen-up state is different from that in the pen-down state. In coordinate-position inputting/detecting device 1 according to Embodiment 1, it is possible to determine whether a pointing device is in the pen-up state or in the pen-down state according to the light quantity of the images of the pointing device picked up by the image pickup devices 7L and 7R.

However, when the layer of the light is formed at a position which is separated from the writing surface E, change in the light quantity of the image of the pointing device in the pen-up state and pen-down state is difficult to occur in proportion to the distance from the writing surface E to the layer of the light. In other words, when there is a gap (a region of no light) between the writing surface E and the layer of the light an object can not be sensed. More specifically, even if the pointing device is in the state where the device does not contact the writing surface E (pen-up state), the same light quantity as that in the pen-down state may sometimes be obtained when the light layer is formed at the location away from the writing surface E, which may possibly be determined as the pen-down state. When a character string is written on the writing surface E in this state then all the movements of the pointing device are determined as the movements for the entry of characters. Due to this, a drawback in the input device that characters and words get linked to each other may occur.

The above mentioned pen-up/pen-down state has to accurately be determined at any position on the writing surface E. Therefore, the height and parallelism of the light emitted from the lighting device 4 with respect to the writing surface E are required to precisely be adjusted.

The configuration of the lighting device 4 will then be described more specifically. FIG. 2 shows a general configuration of the lighting device 4. As shown in FIG. 2, the light emitted from the light source 3 towards the writing surface E is transformed into parallel light by the optical lens 11. This parallel light is then passed through an arc-shaped slit 12 and is reflected by an inclined surface 13a of a conical mirror 13. When the light is reflected by the conical mirror 13, a light which is parallel to the writing surface E as well as which spreads over entire area of the entry area 2 is obtained.

Herein, the conical mirror 13 will be described in more detail. FIG. 2 shows a cross section of the conical mirror 13. A shaft 14 is provided at the center of the conical mirror 13 as shown in FIG. 2. This shaft 14 is used not only for attachment of the conical mirror 13 to the frame 1a by being inserted into a hole (not shown) provided in the frame 1a, but also for adjustment of an angle at which light from the light source 3 is to be reflected.

Provided at the end of the shaft 14 is a spherical angle adjusting section 15. By moving the angle adjusting section 15 to and fro and both sides, the angle of reflection of the light passing through the arc slit 12 can be changed in the X-Y direction, therefore, parallelism of the light with respect to the writing surface E can be adjusted.

The angle adjusting section 15 is connected to an actuator 16 for adjusting the angle of reflection of the light by the conical mirror 13 by moving the angle adjusting section 15. The actuator 16 is driven under the control by a microcomputer (Refer to FIG. 3) described later according to light receiving power of the light receiving element 10 having received the light reflected by the conical mirror 13. Namely, the actuator 16 makes the angle adjusting section 15 operate under the control by the microcomputer to adjust the angle of reflection of the light by the conical mirror 13 so that the light receiving power of the light received by the light-receiving element 10 is the maximum (namely, so that the light reflected from the conical mirror 13 vertically enters the light receiving element 10).

As described above, by automatically adjusting the reflecting angle of the light by the conical mirror 13, parallel light with respect to the writing surface E can be emitted from the lighting device 4. Therefore, it is possible to enhance detection precision of coordinates where a pointing body is positioned and also to accurately determine a pen-up/pen-down state.

Figure 3:
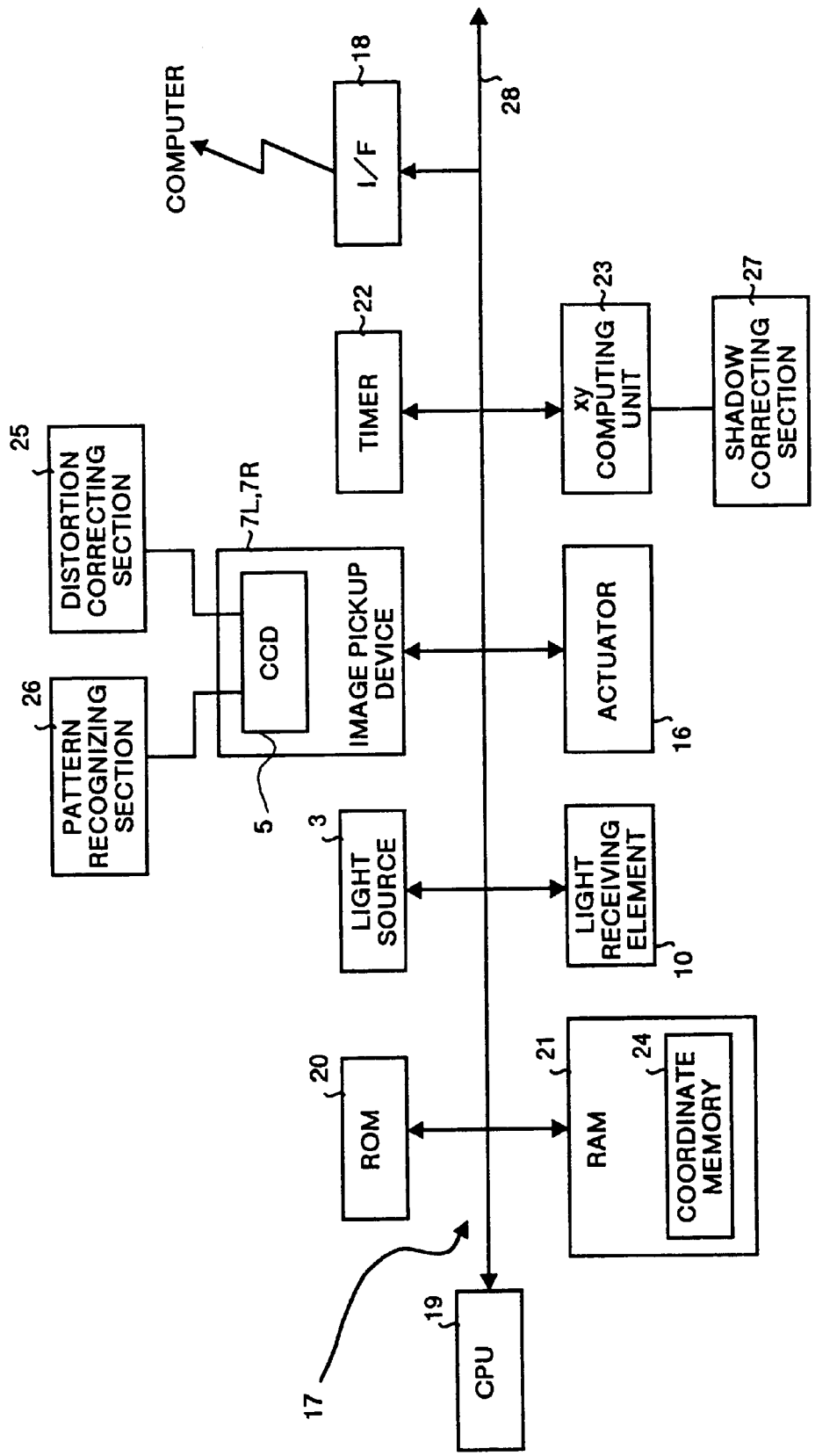
FIG. 3 is a block diagram of the coordinate-position inputting/detecting device according to Embodiment 1 of the present invention.

FIG. 3 is a block diagram of the coordinate-position inputting/detecting device 1 according to Embodiment 1. As shown in FIG. 3, the coordinate-position inputting/detecting device 1 has a microcomputer 17 which provides controls over all the sections of the device. This microcomputer 17 comprises a CPU 19 which provides a centralized control over all the sections of the device, a ROM 20 which stores therein fixed data such as a control program, and a RAM 21 which stores therein variable data. Connected to the microcomputer 17 are the above mentioned light source 3, image pickup devices 7L and 7R, light receiving element 10, actuator 16, and a timer 22 for counting a prespecified time, an xy computing unit 23 for computing coordinates of a position of a pointing body using images of the pointing body picked up by the image pickup devices 7L and 7R, and an interface (I/F) 18 for connecting the coordinate-position inputting/detecting device 1 to a computer (e.g., a personal computer) or the like each described later through a bus 28.

A shadow correcting section 27 is provided to the xy computing unit 23 is for executing processing so that a shadow produced on the pointing body inserted into the entry area 2 will not cause any influence over the processing for identifying coordinates of a position of the pointing body. The RAM 21 has a coordinate memory 24 provided therein for temporarily storing the coordinates of a position of the identified pointing body in the manner as described later.

Furthermore, a distortion correcting section 25 and a pattern recognizing section 26 are provided in the CCD 5. The distortion correcting section 25 electrically corrects difference in measurement due to optical distortion of image information obtained by the CCD 5. With this operation, higher quality of image information can be achieved. The pattern recognizing section 26 executes processing for recognizing a plurality of pointing bodies to make an entry operation possible to be performed by concurrently using the plurality of pointing bodies. For example, different specific patterns are given to the pointing bodies respectively, and the pattern recognizing section 26 recognizes and determines a pattern given to a pointing body trough the CCD 5. As a result, it is possible to compute coordinates of positions pointed by the plurality of pointing bodies respectively as described later.

Figure 4:
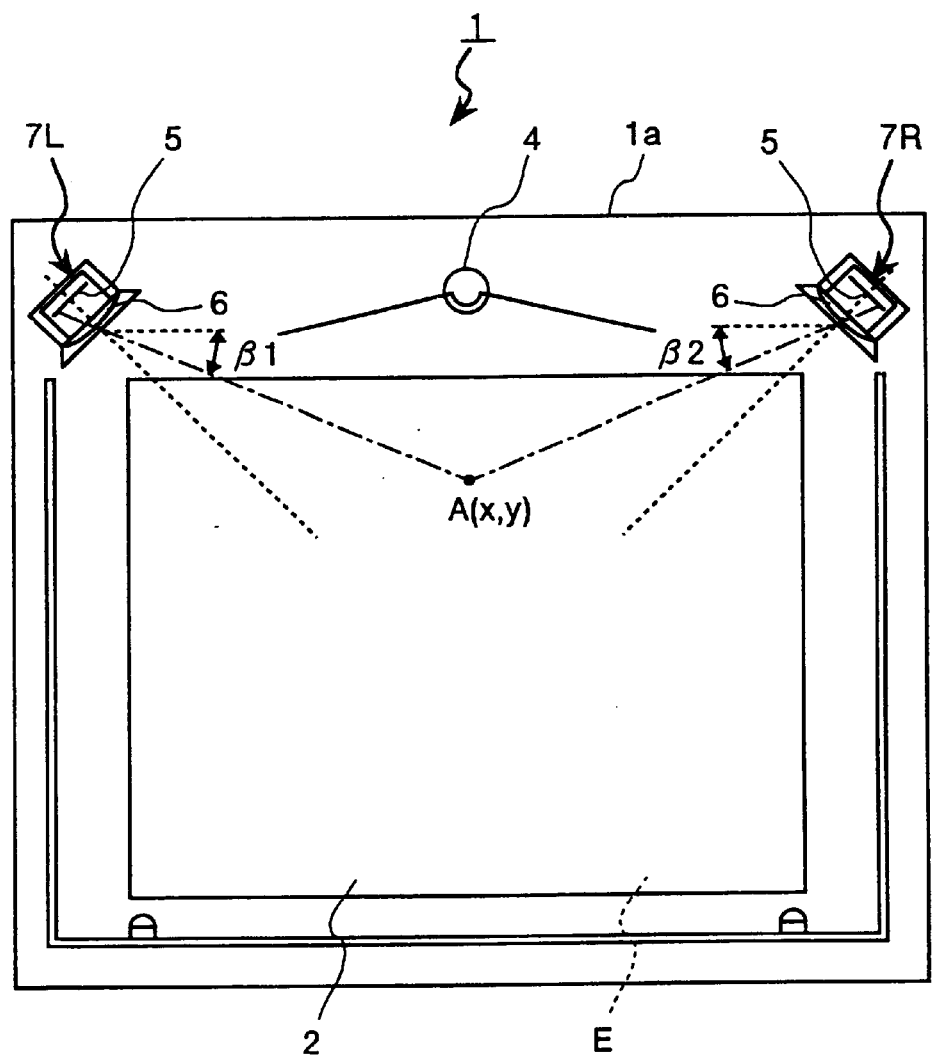
FIG. 4 shows the processing for computing coordinates of a position of a pointing body inserted into the entry area in the coordinate-position inputting/detecting device according to Embodiment 1 of the present invention.
Figure 5:
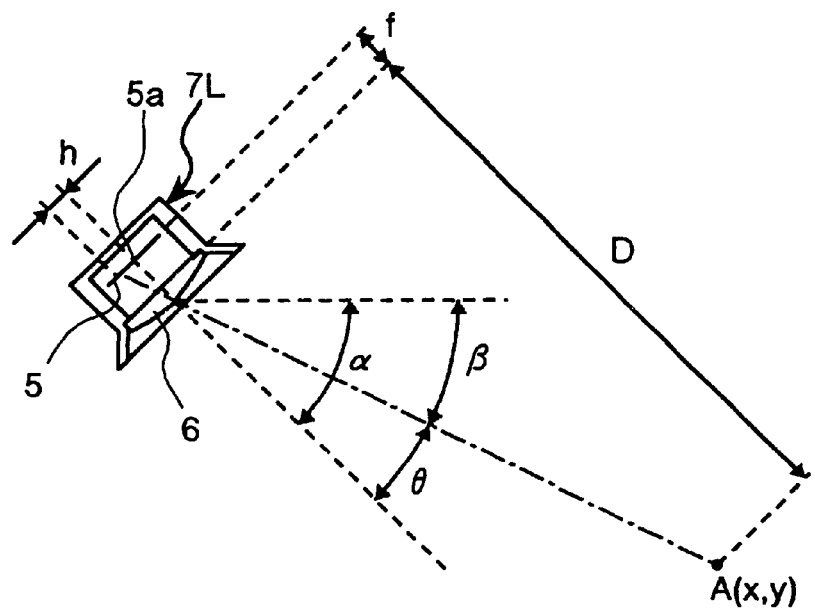
FIG. 5 shows the processing for computing coordinates of a position of a pointing body inserted into the entry area in the coordinate-position inputting/detecting device according to Embodiment 1 of the present invention.

The processing executed by the microcomputer 17 according to the control program stored in the ROM 20 will be described. It should be noted that the processing for adjusting a reflecting angle of light by the conical mirror 13 is as described above, therefore, description is made herein for the processing executed by the microcomputer 17 centering on the processing for computing coordinates of a position of a pointing body such as a user's finger and a pen inserted into the entry area 2. FIG. 4 and FIG. 5 explain the processing for computing coordinates of a position of a pointing body inserted into the entry area 2. FIG. 4 shows a state where an arbitrary position within the entry area 2 is pointed to by a pen A as a pointing body, while FIG. 5 shows a portion of FIG. 4 enlarged to make clear a relation between the image pickup device 7L and the pen A.

As shown in FIG. 4, when the pen A (pointing body) is inserted into the entry area 2 in order to write a character or a graphic at a certain position (x, y) on the writing surface E, the inserted pen A is illuminated by the light emitted from the lighting device 4. A subject image as an image of the portion of the illuminated pen A is formed on each of the CCD 5 through the focusing optical lens 6 of the image pickup devices 7L and 7R. The xy computing unit 23 shown in FIG. 3 executes the processing for computing coordinates (x, y) of a position of the pen A according to the subject images formed on the CCDs 5 as described above.

Specific description is made for the processing of computing the coordinates (x, y) of a position of the pen A by the xy computing unit 23. Description is made herein for the processing of computing the coordinates (x, y) of the position of the pen A by taking the subject image picked up by the image pickup device 7L shown in FIG. 5 as an example. It should be noted that the processing described later is also executed to the subject image picked up by the image pickup device 7R.

Figure 6:
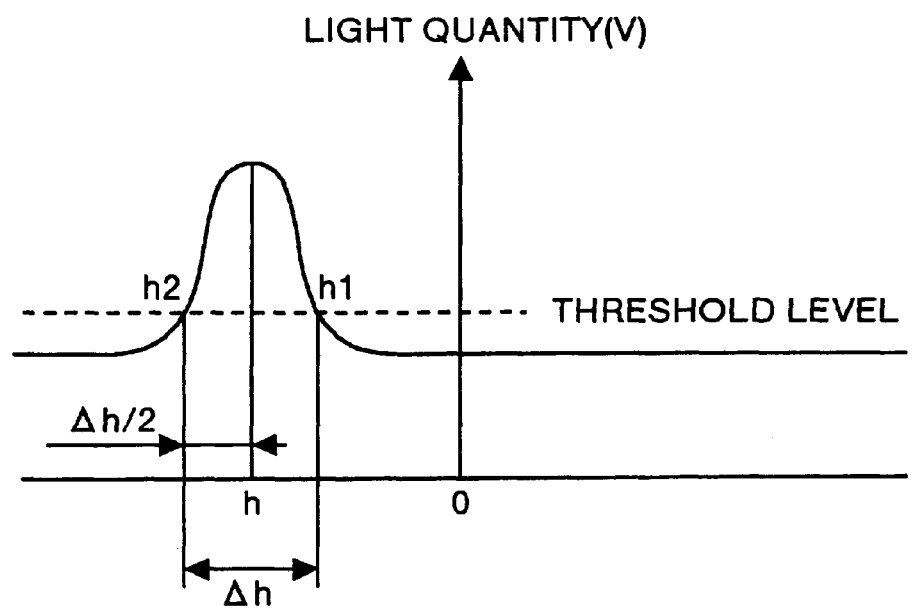
FIG. 6 is a graph showing a relation between a position of an image of an object formed on a CCD and light quantity of the image of the object picked up by the CCD in the coordinate-position inputting/detecting device according to Embodiment 1 of the present invention.

FIG. 6 is a graph showing an example of a relation between a position of a subject image formed on the CCD 5 of the image pickup device 7L and light quantity of the subject image picked up by the CCD 5. In FIG. 6, the position of the subject image formed on the CCD 5 is represented by a distance h from the center 5a of the CCD 5 to an imaging point. The subject image picked up by the CCD 5 appears as a waveform shown in FIG. 6 according to the position of the image formed on the CCD 5 as well as to the light quantity. Herein, assuming that a threshold level concerning the light quantity of the subject image is set to a level indicated by a dotted line in FIG. 6, a size Δh of the subject image can be computed with the following equation.

$$\Delta h = h2 - h1 \quad (1)$$

Where h1 and h2 are distances from the center 5a of the CCD 5 to the position where the light quality at the same level as the threshold level is obtained as shown in FIG. 6.

Then, the center h of the subject image shown in FIG. 6 (the distance h from the center 5a of the CCD 5 to a point at which the image is formed) can be computed with the following equation.

$$h = h1 + (\Delta h/2) \quad (2)$$

As shown in FIG. 5, the distance h from the center 5a of the CCD 5 to the point at which the image is formed depends on the angle θ between a central line of the CCD 5 and a line linking the pen A and the point at which the image is formed. This angle θ can be computed by with the following equation.

$$\theta = \arctan(h/f) \quad (3)$$

Where f is a distance between the focusing optical lens 6 and the CCD 5, which in turn corresponds to the focal length of the focusing optical lens 6.

As shown in FIG. 5, an angle β between the image pickup device 7L and the pen A can be computed with the following equation.

$$\beta = \alpha - \theta \quad (4)$$

Where α is an angle between a reference line that links the image pickup devices 7L and 7R and the central line of the CCD 5, this in turn is the angle at which the image pickup device 7L is attached.

By executing the same above processing to the subject image picked up by the image pickup device 7R, an angle β between the image pickup device 7R and the pen A can also be computed. Herein, the angle between the image pickup device 7L and the pen A will be considered to β1 while the angle between the image pickup device 7R and the pen A will be considered as β2 as shown in FIG. 4.

Then, the coordinates (x, y) of the position of the pen A can be computed with the following equation based on the principle of triangulation.

$$x = L \tan \beta 2 / (\tan \beta 1 + \tan \beta 2) \quad (5)$$

$$y = x \tan \beta 1 \quad (6)$$

In addition, by monitoring the changes in the level of the light quantity of the subject image shown in FIG. 6, it is also possible to determine whether the state of the pen A is a pen-up/pen-down state or a double-clicked state or not.

Figure 7:
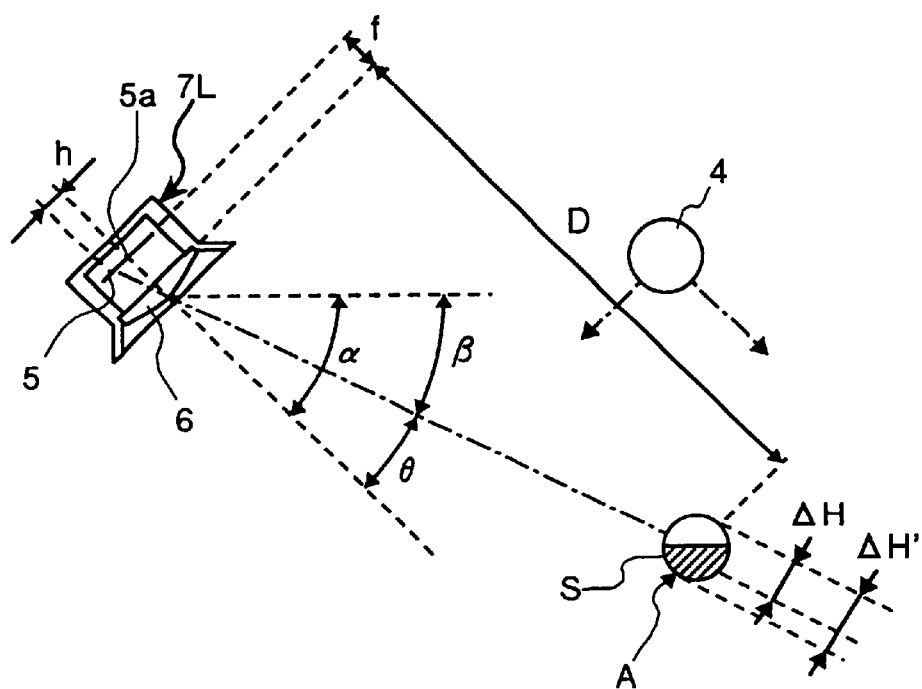
FIG. 7 shows a shadow produced on the pointing body in the coordinate-position inputting/detecting device according to Embodiment 1 of the present invention.
Figure 8:
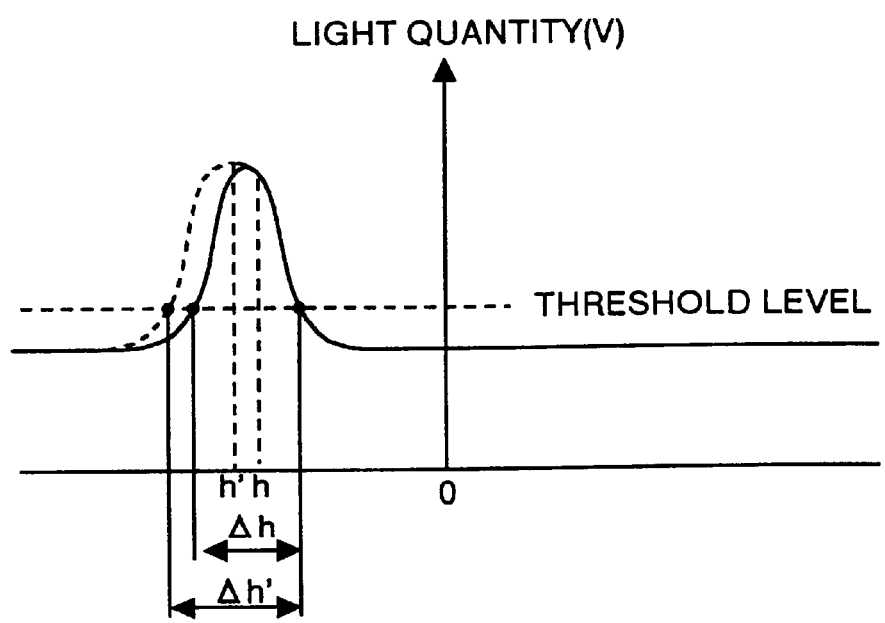
FIG. 8 is a graph showing a comparison between the case where there is a shadow on the pointing body to the case where there is no shadow thereon concerning a relation between a position of an image of an object formed on the CCD and light quantity of the image of the object picked up by the CCD in the coordinate-position inputting/detecting device according to Embodiment 1 of the present invention.

Although the coordinates (x, y) of the position of the pen A computed by the processing described above may be inputted into a computer through the I/F 18 as they are, by executing the processing for correction described below, coordinates (x, y) of a more accurate position of the pen A can be computed. The reason why execution of the correction processing is preferable is because a shadow S as shown in FIG. 7 is produced on the pen A viewed from the image pickup devices 7L and 7R (the cross section of the pen A in FIG. 7 is a circle). More specifically, as shown in FIG. 8, the size Δh' of the subject image of the pen A formed on the CCD 5 in a state when there is no shadow S thereon is larger than the size Δh (computed according to the Equation (1)) of the subject image of the pen A having the shadow S thereon. Therefore, when a shadow S is produced, an error occurs in the computation (according to Equation (2)) of the distance h from the center 5a of the CCD 5 to the point at which the image is formed and the coordinates of the computed position of the pen A are not accurate. Therefore, in order to compute accurate coordinates of a position, it is required to take into consideration existence of a shadow S on the pen A. A method of computing the accurate coordinates (x, y) of the position of the pen A is described by describing hereinafter a method of computing a distance h from the center 5a of the CCD 5 to a point at which the image is formed by taking into consideration existence of the shadow.

Figure 9:
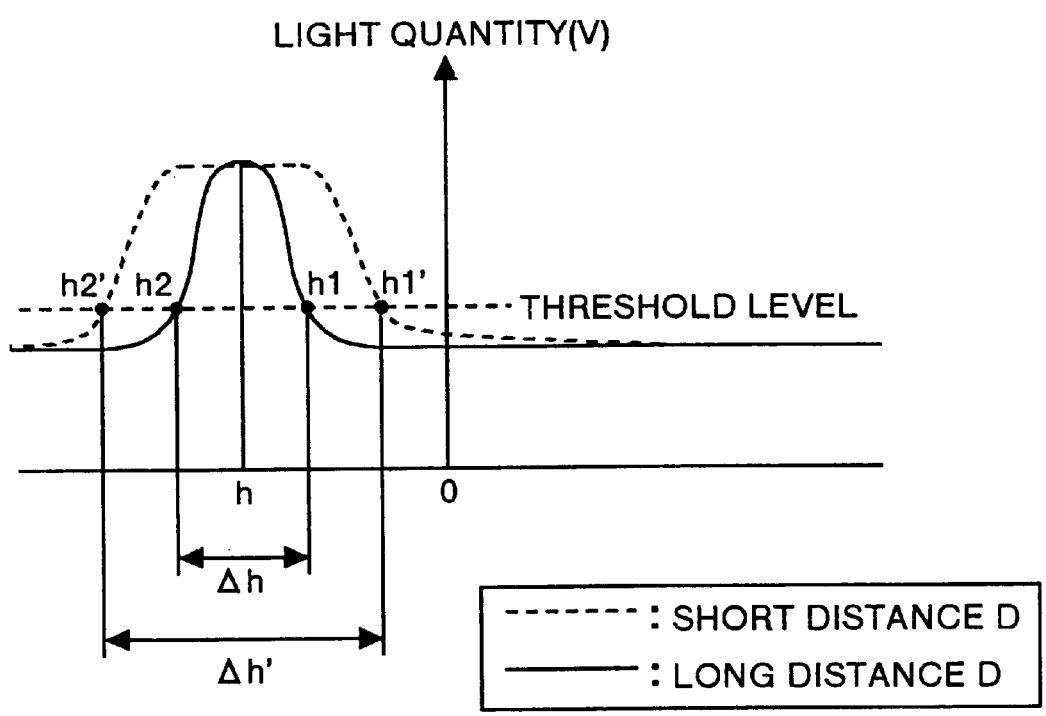
FIG. 9 is a graph showing a relation between a position of an image of an object formed on a CCD, light quantity of the image of the object picked up by the CCD, and a distance D in the coordinate-position inputting/detecting device according to Embodiment 1 of the present invention.

At first, description is made for the processing of computing a width of an illuminated portion of the pen A by the light emitted from the lighting device 4, namely a width ΔH of the subject shown in FIG. 7 according to the subject image of the pen A formed on the CCD 5 of the image pickup device 7L. In this case, a magnification of a subject image formed on the CCD 5 is considered to change according to a distance D (Refer to FIG. 5 and FIG. 7) between the image pickup devices 7L and 7R and the pen A. FIG. 9 is a graph showing an example of a relation between a position of a subject image formed on the CCD 5 of the image pickup device 7L, light quantity of the subject image picked up by the CCD 5, and the distance D. The difference in the magnification of the subject image formed on the CCD 5 appears due to the difference in the width of output from the CCD 5 as shown in FIG. 9. Namely, when the distance D is long the subject image becomes of a size as shown by the sign Δh, and when the distance D is short the subject image becomes of a size shown by the sign Δh'. This distance D is computed according to the coordinates (x, y) of the position of the pen A computed with the Equation (5) and Equation (6) as well as according to the angle θ computed with the Equation (3).

Then, width of the illuminated portion of the pen A due to the light emitted from the lighting device 4, namely a subject width ΔH of the pen A shown in FIG. 7 is computed with the following equation. It should be noted that this processing may be executed by either the xy computing unit 23 or the shadow correcting section 27.

$$\Delta H = (D/f) \Delta h \quad (7)$$

Then, the shadow correcting section 27 executes the processing for correcting the center h of the subject image (a distance h between the center 5a of the CCD 5 and the point at which the image is formed) according to, for instance, the subject image width ΔH' of the actual pen A previously stored in the ROM 20 together with the control program. As shown in FIG. 8, assuming that the center of the corrected subject image is h', the center h' can be computed with the following equation as an approximate value.

$$h' = h + (f/D)(\Delta H' - \Delta H)/2 \quad (8)$$

The subject image width ΔH of the pen A shown in FIG. 7 can be computed by using the following Equation (7') in place of the Equation (7). In this case, an angle γ between a straight line which links the light source 3 and the subject (pen A) and a straight line which links the center h of the subject image obtained with Equation (2) and the subject (pen A) is computed. Then, by substituting this angle γ and the subject width ΔH' of the actual pen A previously stored in the ROM 20 in the Equation (7'), a subject width ΔH of the pen A viewed from the center h of the subject image on the CCD 5 can be computed.

$$\Delta H = \frac{1}{2}(1 + \cos\gamma)\Delta H' \quad (7')$$

Then, by substituting the computed value in Equation (8), center h' of the subject image can be obtained.

In case of the image pickup device 7R also, a width ΔH of a subject can be computed in the same manner as described above, and the processing of computing the center h' of the subject image is executed.

Then, the xy computing unit 23 executes again the processing of computing the coordinates (x, y) of a position of the pen A using the value of the center h' obtained in the shadow correcting section 27. Namely, the xy computing unit 23 executes the sequence of calculation described with respect to Equation (3) to Equation (6) using the value of the center h' obtained in the shadow correcting section 27, and computes the coordinates of the position of the pen A. As a result, it is possible to compute the coordinates of the accurate position.

Although data for a subject width ΔH' of the pen A used in the coordinate-position inputting/detecting device 1 is previously stored in the ROM 20 herein as one example, rewriting data as required may be possible by storing a subject width ΔH' in a memory such as a non-volatile RAM so that a pen to be used can be changed.

The above mentioned Equations (1) to (8) can previously be stored in the ROM 20 as a portion of the control program. The coordinates (x, y) of a position of a pen A are computed according to a distance h between the center 5a of the CCD 5 and the subject image formed on the CCD 5 through those Equations (1) to (8). Namely, by computing a distance h from the center 5a of the CCD 5 in the image pickup device 7L as well as a distance h from the center 5a of the CCD 5 in the image pickup device 7R, the coordinates (x, y) of a position of the pen A can be obtained.

Furthermore, the subject image of a pen A does not always have to perfectly be formed on the CCD 5. Namely, when the image is not perfectly formed thereon, only the size ΔH of the subject image on the CCD 5 becomes larger, therefore, the center h' of the subject image is not affected thereby.

Figure 10:
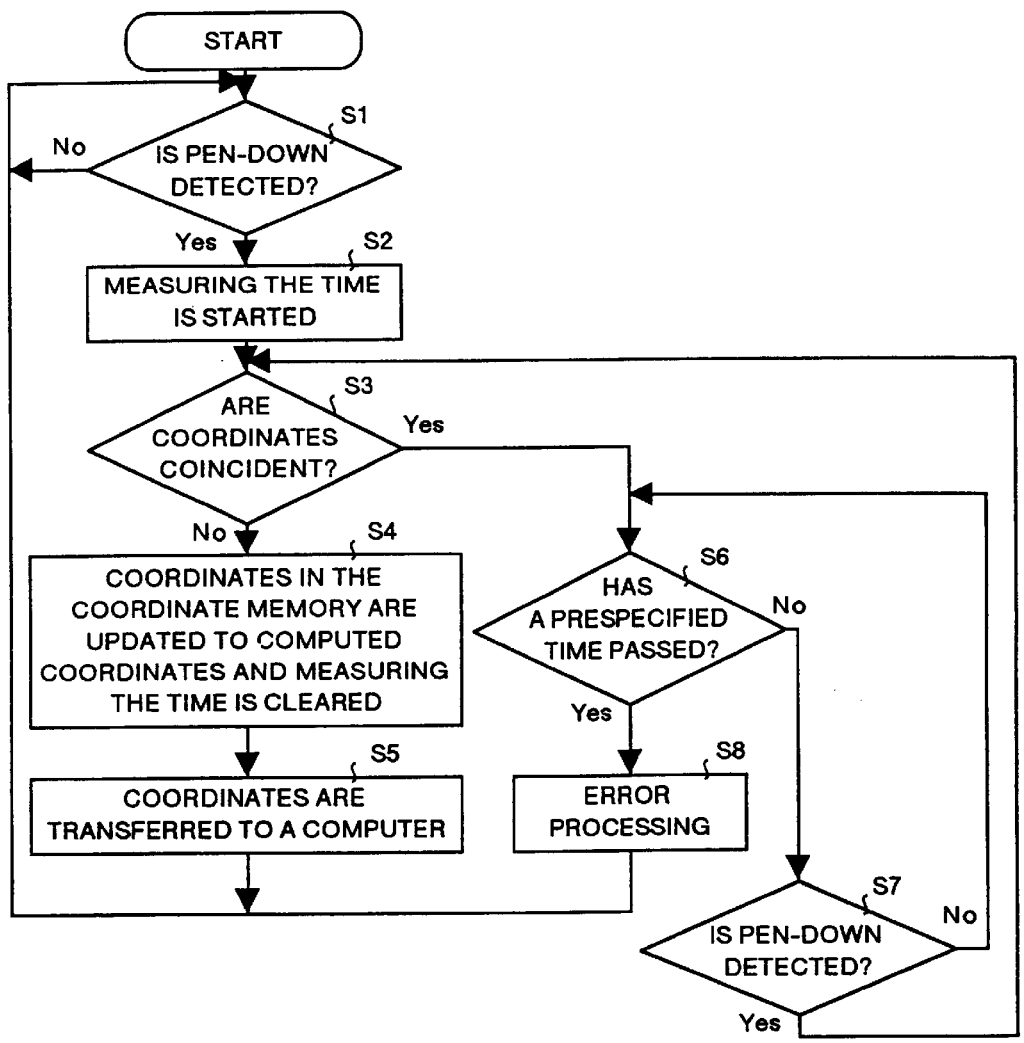
FIG. 10 is a flow chart showing the processing when coordinates of a computed position are transferred to a computer in the coordinate-position inputting/detecting device according to Embodiment 1 of the present invention.

The coordinates (x, y) of the position of the pen A computed as described above are temporarily stored in the coordinate memory 24 and then inputted into a computer through the I/F 18. The coordinates of a position mentioned herein indicate either one of the coordinates having been subjected to correction because of the above mentioned shadow or the coordinates which are not subjected to any correction. FIG. 10 is a flow chart showing the processing when coordinates of a computed position are transferred to a computer. The microcomputer 17 makes, as shown in FIG. 10, when the coordinates (x2, y2) of the position of the pen A are computed by the xy computing unit 23, namely when the pen-down state is detected (Yes in step S1), the timer 22 start counting a prespecified time (step S2).

In the next step, the microcomputer 17 determines whether the coordinates (x2, y2) of the computed position are coincident with the coordinates (x1, y1) of the position stored in the coordinate memory 24 or not (step S3). When it is determined that the coordinates of the two positions are not coincident (No in step S3), the microcomputer 17 updates the coordinates of the position stored in the coordinate memory 24 to the newly computed coordinates (x2, y2) of the position, and clears the counting by the timer 22 (step S4). Then, the microcomputer 17 transfers the coordinates of the position in the coordinate memory 24 to a computer (step S5), the system control is returned to step S1 where the microcomputer waits for a new detection of a pen-down. The computer executes the processing in response to movement of the pen A according to the transferred coordinates of the position. For example, the computer executes the processing for drawing characters and graphics on a display.

On the other hand, when it is determined that the coordinates of the two positions are coincident (Yes in step S3), the microcomputer 17 waits for computation of coordinates of a new position which are different from the coordinates of the position stored in the coordinate memory 24 by the xy computing unit 23 during the period of time until a prespecified time is counted by the timer (step S6, step S7, step S3). More specifically, the microcomputer 17 waits for computation of the coordinates of a new position by the xy computing unit 23 (detection of the pen-down state), and when the coordinates of the new position are computed (Yes in step S7), the system control is shifted to step S3, and the microcomputer 17 determines whether the coordinates of the computed position is coincident with the coordinates of the position in the coordinates memory 24 or not. Then, when it is determined that the coordinates of the two positions are not coincident (No in step S3), the microcomputer 17 executes the processing in steps S4 and step S5 as described above. On the other hand, when it is determined that the coordinates of the two positions are coincident (Yes in step S3), the microcomputer 17 shifts the system control again to step S6.

Then, the microcomputer 17 executes, when it is determined that the prespecified time has passed (Yes in step S6), the error processing (step S8), returns the system control to step S1, and waits for new detection of a pen-down. Namely, when non coincident coordinates can be obtained (step S3) until the prespecified time passes, it is considered that there is no movement of the pen A. Therefore, the coordinates of the computed position by the xy computing unit 23 are regarded as a position of, for instance, dust or something deposited on the writing surface E, and the error processing is executed in step S8. As this error processing, the microcomputer 17 does not update the coordinates (x1, y1) of the position stored in the coordinates memory 24, but discards the coordinates (x2, y2) of the position computed in step S1 so that the coordinates of the position in the coordinates memory 24 will not be transferred to the computer.

In this case, the microcomputer 17 may provide controls for transmitting an error signal to the computer to stop an entry operation of coordinates and then restarting, when the dust or something is removed and an instruction for restoration is inputted by the user, the stopped operation of entering coordinates. The microcomputer 17 may transfer the coordinates of the position of the dust-like substance to the computer and give a note on the dust-deposited position to the computer. With this configuration, the coordinates of the position of the dust can be prevented from being entered into the computer.

Furthermore, in the coordinate-position inputting/ detecting device 1 according to Embodiment 1, a plurality of users can also concurrently enter freehand characters and graphics into a computer. In this case, however, each of the pointing bodies to be used at the same time needs to be discriminated from the others. In the coordinate-position inputting/detecting device 1 according to Embodiment 1, the pattern recognizing section 26 shown in FIG. 3 performs the processing of identifying the plurality of pointing bodies, and the xy computing unit 23 computes coordinates of a position for each identified pointing body. For example, it is assumed that pointing bodies are pens and each of patterns with differently-pitched stripes is added to the periphery of each pen (the pattern may be anything such as vertical stripes, horizontal stripes or a grid). The pattern recognizing section 26 executes the processing for recognizing patterns of the plurality of pens picked up by the CCD 5 in each of the image pickup devices 7L and 7R.

Figure 11:
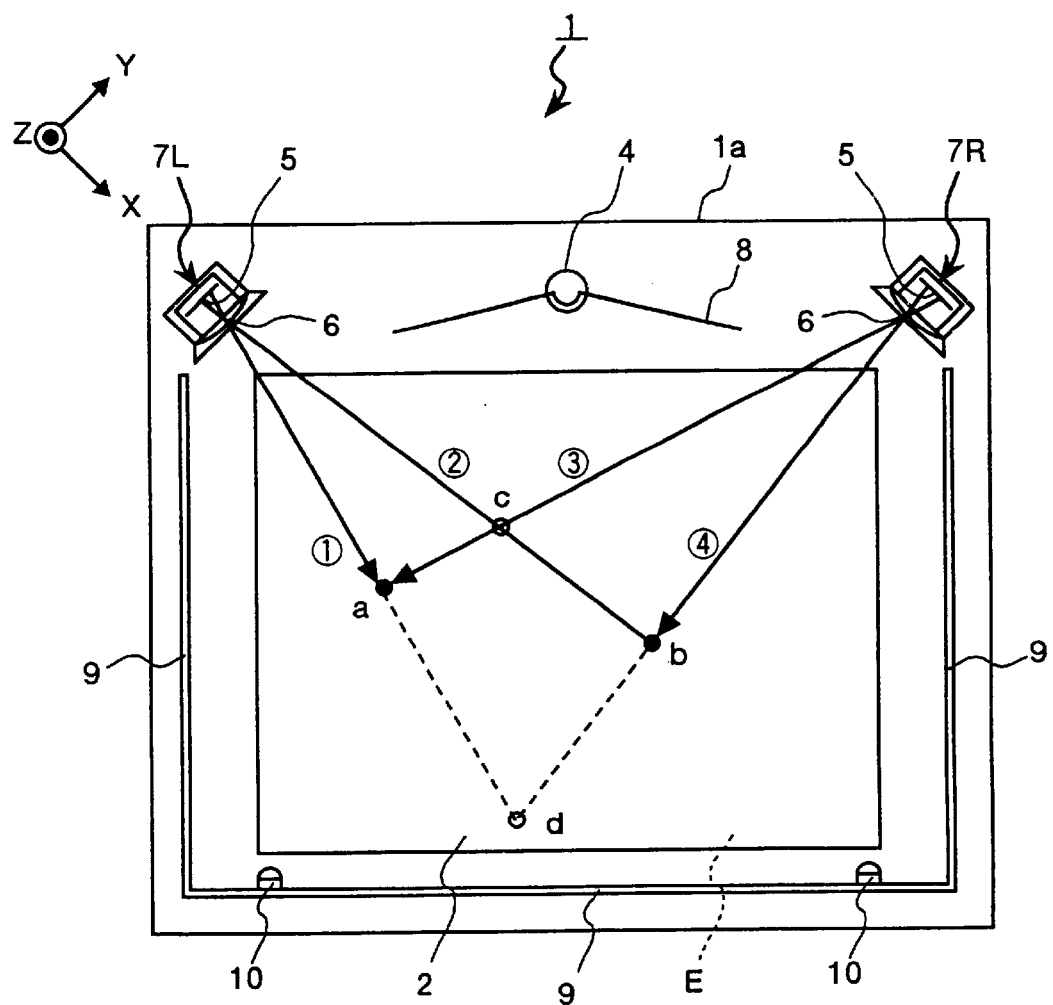
FIG. 11 shows the processing when an operation of inputting freehand characters and graphics into a computer is performed concurrently using two pens in the coordinate-position inputting/detecting device according to Embodiment 1 of the present invention.

FIG. 11 explains the processing when an operation of inputting freehand characters and graphics into a computer is performed concurrently using two pens. Herein, it is assumed as an example that 'a' point a and a point 'b' in the entry area 2 are concurrently pointed to by using two pens. In this case, subject images of the pens existing in the directions of ① and ② are picked up by the image pickup device 7L, while subject images of the pens existing in the directions of ③ and ④ are picked up by the image pickup device 7R respectively. Herein, if identification can not be made which subject images are of the same pen among the subject images of the pens picked up by the image pickup devices 7L and 7R, coordinates of a point 'c' and a point 'd' will be computed in addition to those of the point 'a' and point 'b'. Therefore, it is necessary to identify which subject images are of the same pen by using differently pitched patterns added to the periphery of pens. However, a pitch of each pattern of the subject images picked up by the image pickup devices 7L and 7R changes according to a distance D between the image pickup devices 7L and 7R and the pen even if the pitches are the same (Refer to FIG. 9). Therefore, the coordinates of all positions of the points 'a' to 'd' will be computed hereinafter.

As described above, by computing the coordinates of positions of the points 'a' to 'd', each distance D between the image pickup device 7L and each point from the points 'a' to 'd' can be computed respectively, and also each distance D between the image pickup device 7R and each point from the points 'a' to 'd' can be computed respectively. Then, the microcomputer 17 computes, assuming that an actual pitch of a pattern added to a pen is P and a pitch of each pattern among the subject images changing according to each distance from the image pickup devices 7L and 7R to a pen is p (which is recognized by the pattern recognizing section 26), each pattern pitch of pens at each point using the equation described below.

$$P = (D/f)p$$

By using the above equation, each pitch P of pens at each point from the points 'a' to 'd' viewed from the image pickup device 7L is computed, and also each pitch P of pens at each point from the points 'a' to 'd' viewed from the image pickup device 7R is computed respectively. Then, the microcomputer 17 compares each pitch P of pens at each point from the points 'a' to 'd' viewed from the image pickup device 7L to each pitch P of pens at each point from the points 'a' to 'd' viewed from the image pickup device 7R respectively, and determines that the points whose pitches P are coincident or similar are points that are actually pointed by pens.

The method of enabling identification of each pointing body is not limited to the above mentioned patterns, but there are also methods of changing a color for each pointing body (this will require a use of a color CCD as the CCD 5) or of changing a form and a size or the like of each pointing body.

As described above, with the coordinate-position inputting/detecting device 1 according to Embodiment 1, the lighting device 4 emits light to the entry area 2, a pointing body illuminated by the light emitted from the lighting device 4 is picked up by at least two image pickup devices 7L and 7R, each position on the CCD 5 where an image of the pointing body is formed is computed according to each output from the image pickup devices 7L and 7R respectively, coordinates of position of the pointing body is computed by using the computed position, so that coordinates of a position in the entry area pointed using an arbitrary pointing body such as a finger tip or an ordinary pen can be identified, which allows operability of the coordinate-position inputting/detecting device to be enhanced.

In the coordinate-position inputting/detecting device 1 according to Embodiment 1, although measures are taken so that light does not directly enter the image pickup devices 7L and 7R by providing the shade 8 on the lighting device 4, the same measures may be taken using some technique other than using the shade 8. The area into which the light is to be emitted may be restricted by the lighting device 4 itself.

In the coordinate-position inputting/detecting device 1 according to Embodiment 1, although the light absorbing member 9 for suppressing reflection of light is provided on the peripheral section of the entry area 2 excluding the upper side thereof, creating a perfect non-reflecting condition described above is not an essential condition for the present invention. For example, in place of the light absorbing member 9, a reflecting member having a uniform reflecting condition in a direction to which light is diverted away from the entry area 2 may be provided on the peripheral section of the entry area 2 excluding the upper side thereof. As a result, the light emitted from the lighting device 4 is reflected by the reflecting member toward outside of the entry area 2, therefore, the reflected light (scattered light) can be prevented from entering into the image pickup devices 7L and 7R.

Figure 12:
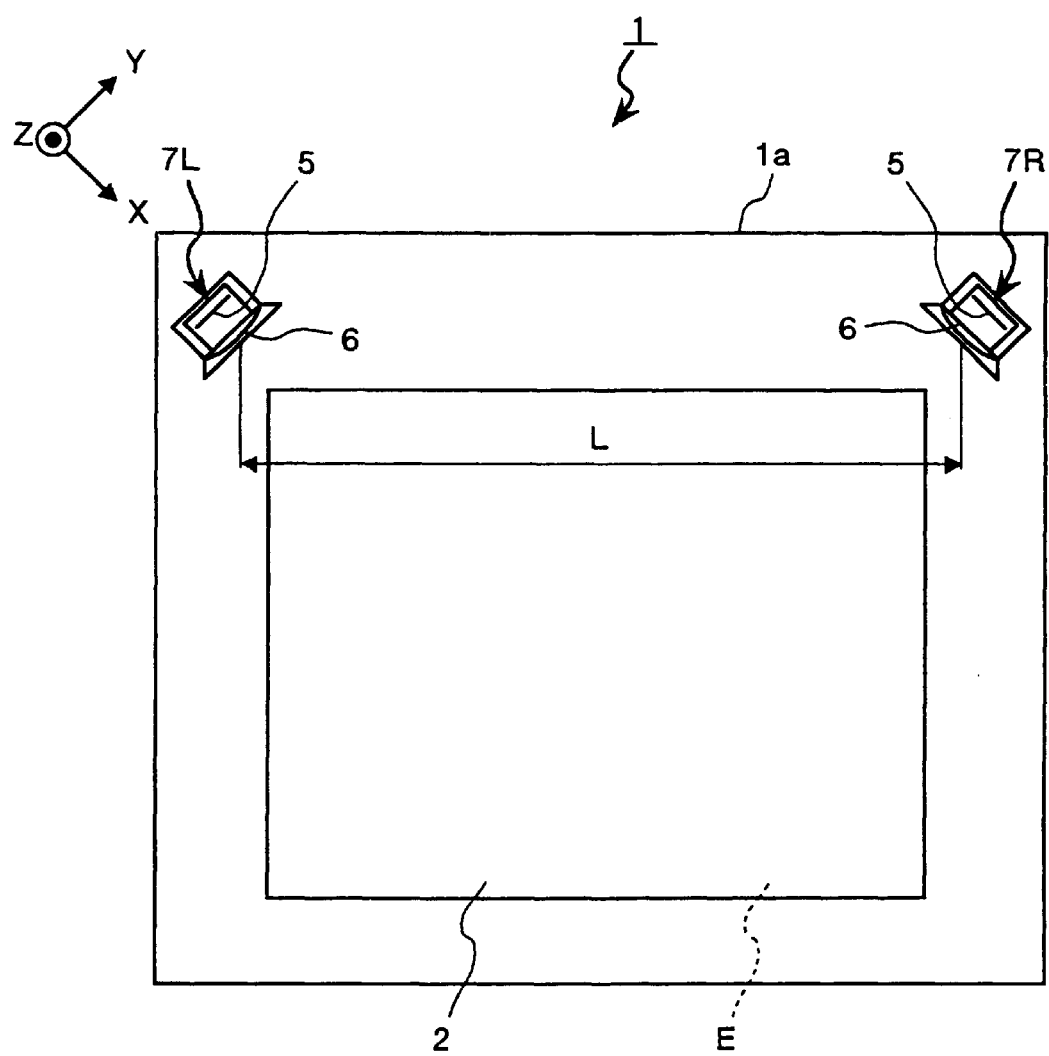
FIG. 12 is a front view showing general configuration of a modification of the coordinate-position inputting/detecting device according to Embodiment 1 of the present invention.

In the coordinate-position inputting/detecting device 1 according to Embodiment 1, although the lighting device 4 is used, coordinates of a position of a pointing body can be computed by picking up an image of the pointing body inserted into the entry area 2 by the image pickup devices 7L and 7R even if the lighting device 4 is omitted therefrom. That is because the coordinate-position inputting/detecting device 1 according to Embodiment 1 computes coordinates of a position of a pointing body using each position of images of the pointing body formed on the CCDs 5 of the image pickup devices 7L and 7R. As an example, FIG. 12 shows a front view of a general configuration of the coordinate-position inputting/detecting device 1 from which the lighting device 4 is omitted. As shown in FIG. 12, when the lighting device 4 is omitted from the coordinate-position inputting/detecting device 1, the shade 8, the light absorbing member 9, and the light receiving element 10 can also be omitted therefrom in accordance with the above case.

Furthermore, by using a frame of a display board, the coordinate-position inputting/detecting device 1 according to Embodiment 1 can be integrated with the display board. In addition, the coordinate-position inputting/detecting device 1 according to Embodiment 1 can be used by attaching to the front surface of the display of a computer, and the coordinate-position inputting/detecting device 1 according to Embodiment 1 can also be integrated with the display by using the frame of the display.

Figure 13:
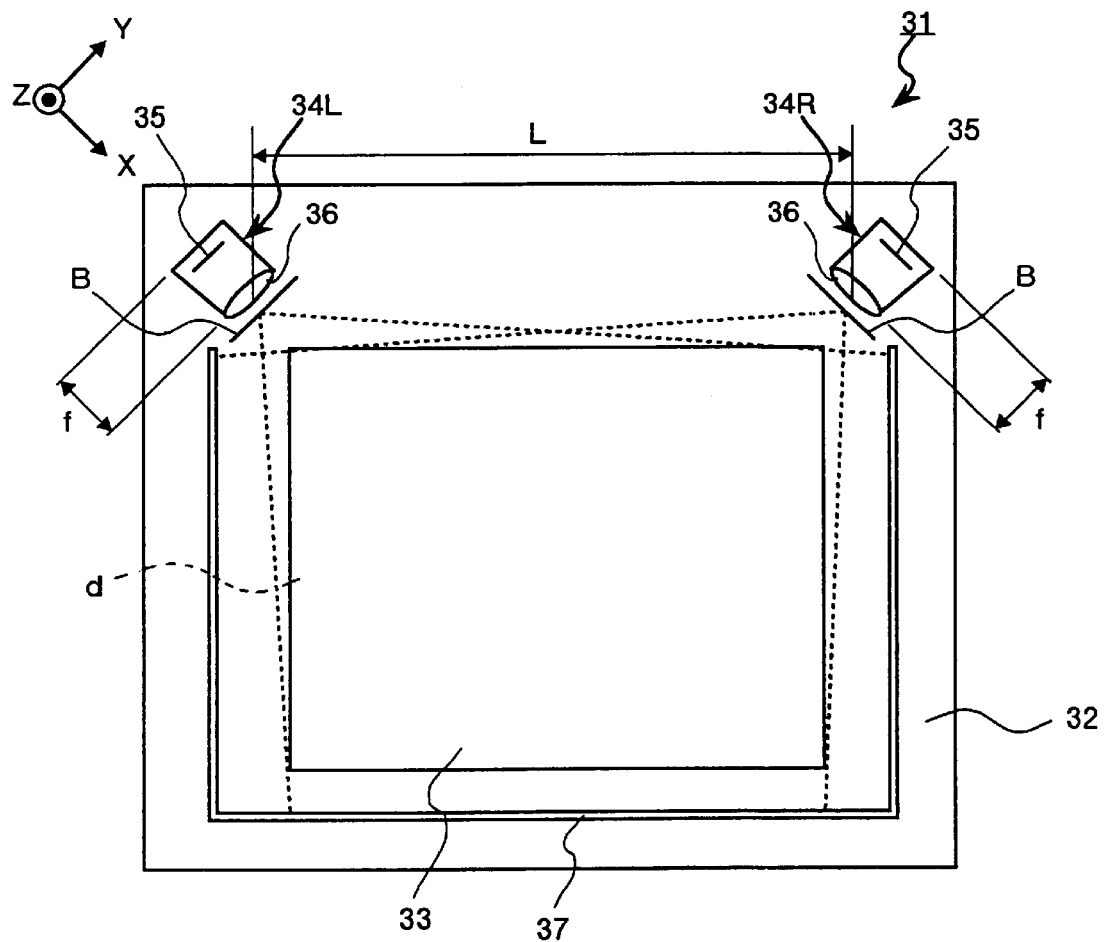
FIG. 13 is a front view showing general configuration of a coordinate-position inputting/detecting device according to Embodiment 2 of the present invention.

FIG. 13 is a front view showing a general configuration of a coordinate-position inputting/detecting device according to Embodiment 2 of the present invention. FIG. 13 shows a state, as an example, where the coordinate-position inputting/detecting device 31 according to Embodiment 2 is attached to a display surface d of a computer. The coordinate-position inputting/detecting device 31 has a frame 32 having a rectangular space with substantially the same size as that of the display surface d of a computer, namely having an entry area 33 for performing an entry operation using a pointing body such as a finger or a pen by a user. Provided on this frame 32 are cameras 34L and 34R and a background plate 37 which will be described in detail below.

The cameras 34L and 34R are provided on both edges in the upper side of the entry area 33 at a distance L therebetween. The cameras 34L and 34R pick up an image of the entry area 33 and output the image (photographed image) as an electric signal. These cameras 34L and 34R are electronic cameras, and each of the cameras has a two-dimensional image sensor (two-dimensional image pickup element) 35 and a focusing optical lens 36. This two-dimensional image sensor 35 is a two-dimensional CCD image pickup element formed with a large number of CCDs (Charge Coupled Device) arranged in a matrix. The two-dimensional image sensor 35 and focusing optical lens 36 are spaced at a distance f therebetween.

In addition, the cameras 34L and 34R are located so that each optical axis of the cameras is parallel with the display surface d and at substantially the same level as that of the surface of the display surface d. Because of this configuration, the display surface d can be prevented from its reflection into the cameras 34L and 34R.

Figure 14:
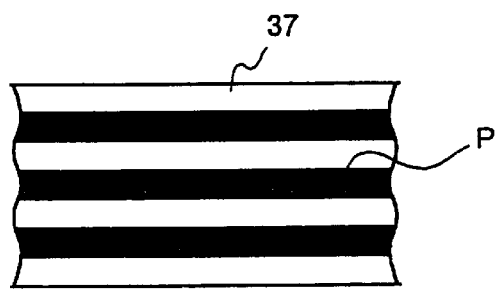
FIG. 14 shows a background plate provided in the coordinate-position inputting/detecting device according to Embodiment 2 of the present invention.

The background plate 37 is provided at a location as a peripheral section of the entry area 33 excluding the upper side thereof where the whole field of view photographed by the cameras 34L and 34R is covered. The background plate 37 is located so as not to interrupt with the angle of view of the cameras 34L and 34R. FIG. 14 explains the background plate 37 and shows a portion of the background plate 37. As shown in FIG. 14, a reference pattern P for making easier extraction of a differential image described later is added to the background plate 37. The reference pattern P shown in FIG. 14 is a pattern with horizontal stripes in dark and light colors, but color patterns or the like used in chroma key technology can also be used as the reference pattern P. Furthermore, a pattern in uniform black color which absorbs the light may be used as a reference pattern on the background plate 37.

Figure 15:
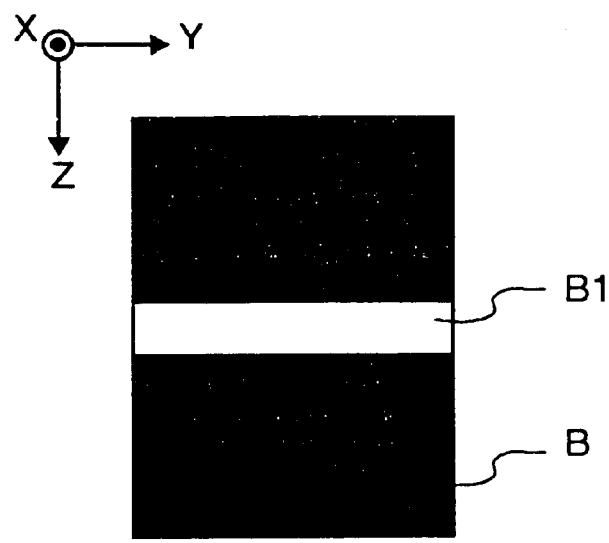
FIG. 15 shows a light shielding plate provided in the coordinate-position inputting/detecting device according to Embodiment 2 of the present invention.
Figure 16:
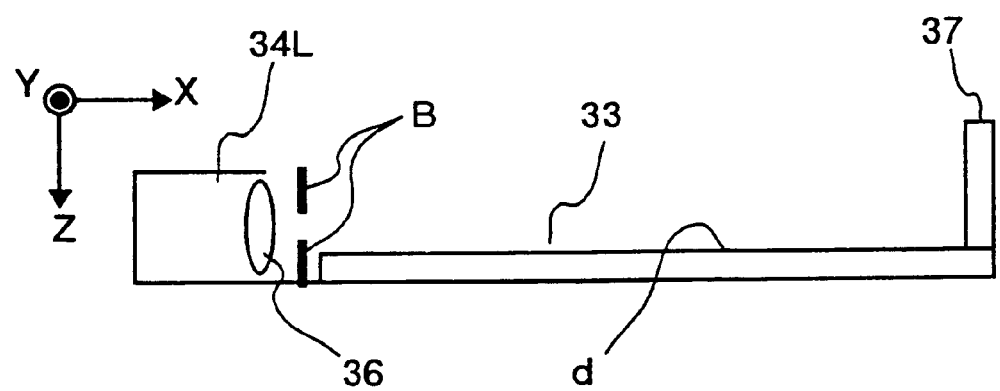
FIG. 16 is a cross-sectional view of the coordinate-position inputting/detecting device according to Embodiment 2 of the present invention.

In addition, a light shielding plate B for restricting an area to be photographed is attached to each of the cameras 34L and 34R. FIG. 15 explains the light shielding plate B, and FIG. 16 is a cross-sectional view of the coordinate-position inputting/detecting device 31. As shown in FIG. 15, the light shielding plate B has a horizontal notch B1. Then, as shown in FIG. 16, the light shielding plates B are provided in the front surface of the focusing optical lenses 36 of the cameras 34L and 34R respectively, the area which can be photographed by each of the cameras 34L and 34R so restricted that the area matches the entry area 33. It is possible to reduce occurrence of noise due to disturbance light or the like by making the field of view of each of the cameras 34L and 34R narrow with this light shielding plate B.

Figure 17:
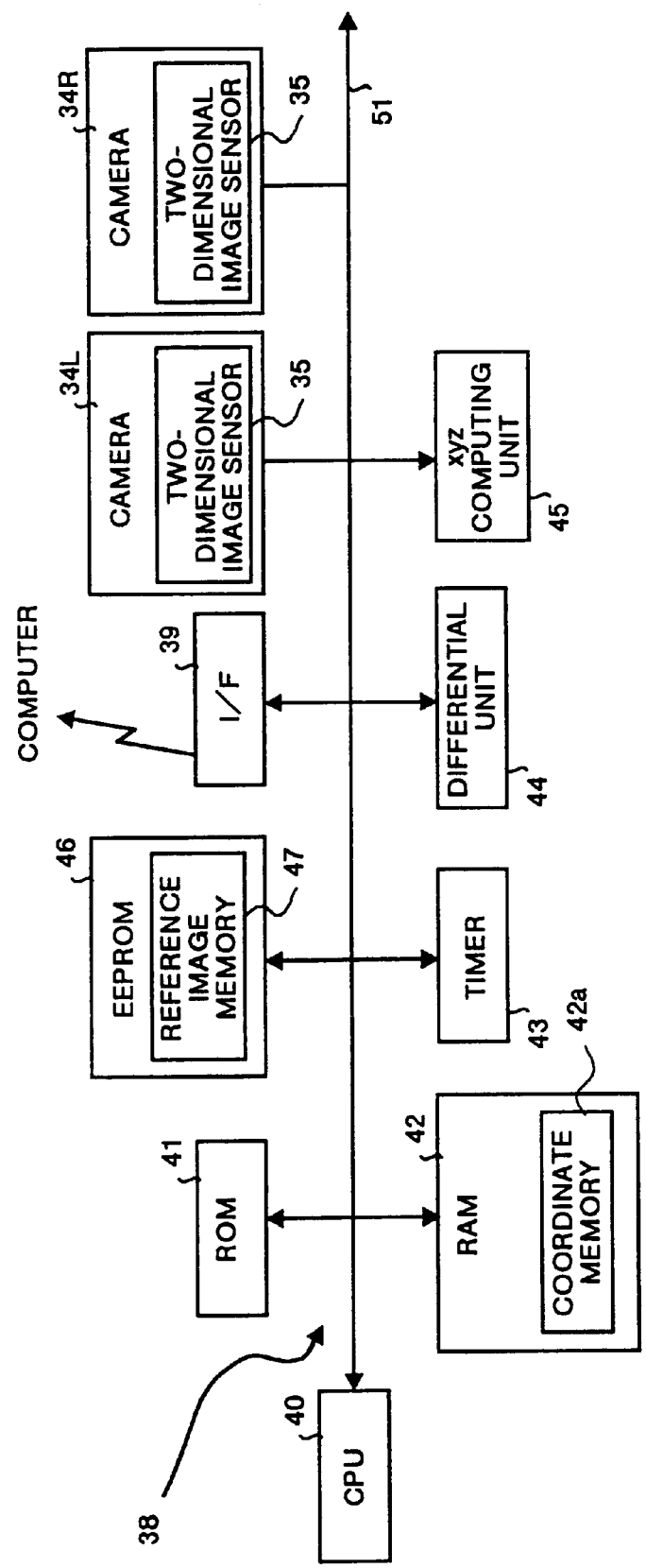
FIG. 17 is a block diagram of the coordinate-position inputting/detecting device according to Embodiment 2 of the present invention.

FIG. 17 is a block diagram of the coordinate-position inputting/detecting device 31 according to Embodiment 2. As shown in FIG. 17, the coordinate-position inputting/detecting device 31 has a microcomputer 38 which provides controls over all the sections of the device. This microcomputer 38 comprises a CPU 40 which provides centralized control over all the sections of the device, a ROM 41 which stores therein fixed data such as a control program, and a RAM 42 which stores therein variable data. Connected to the microcomputer 38 are, in addition to the above mentioned cameras 34L and 34R, a timer 43 for counting a prespecified time, a differential unit 44 for executing the processing of extracting an image of a pointing body as described later, an xyz computing unit 45 for computing coordinates of a three-dimensional position of a pointing body, and an interface (I/F) 39 for connecting the coordinate-position inputting/detecting device 31 to a computer (e.g., a personal computer) through a bus 51.

Further connected to the microcomputer 38 through the bus 51 is an EEPROM 46 as a non-volatile memory. Provided in the EEPROM 46 is a reference image memory 47 for storing therein images, for instance, of a state of the entry area 33 on starting of the device photographed by the cameras 34L and 34R as reference images (Refer to FIG. 21). Provided in the RAM 42 is a coordinate memory 42a for temporarily storing therein coordinates computed by the xyz computing unit 45.

Figure 18:
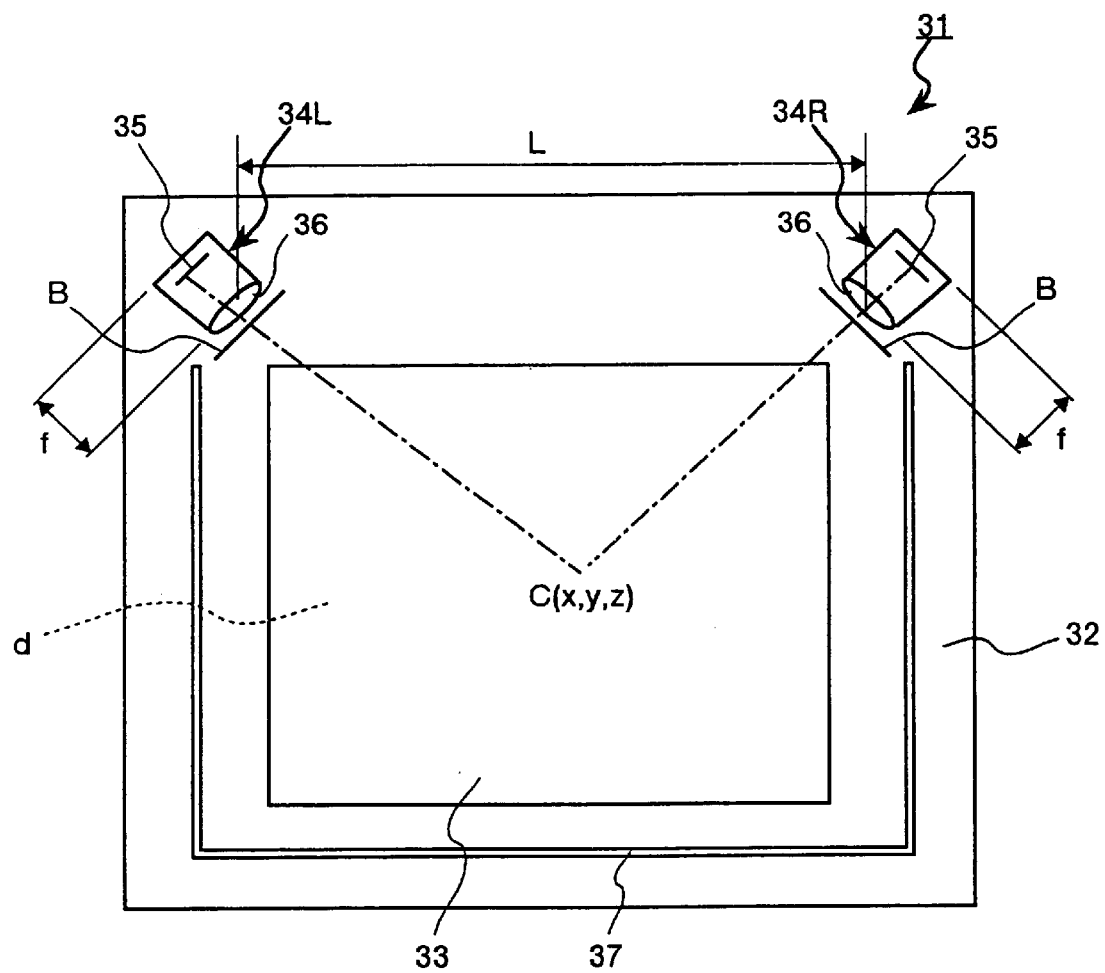
FIG. 18 shows the processing for computing coordinates of a position of a pointing body inserted into the entry area in the coordinate-position inputting/detecting device according to Embodiment 2 of the present invention.
Figure 19:
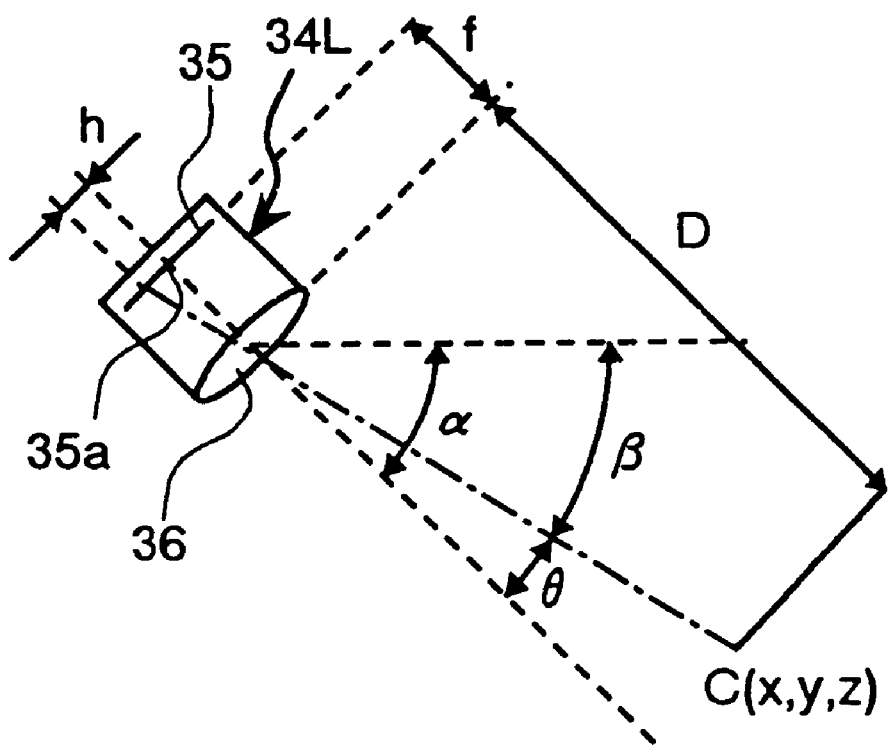
FIG. 19 shows the processing for computing coordinates of a position of a pointing body inserted into the entry area in the coordinate-position inputting/detecting device according to Embodiment 2 of the present invention.

Then, description is made for the processing executed by the microcomputer 38 according to the control program stored in the ROM 41. FIG. 18 and FIG. 19 explain the processing for computing coordinates of a position of a pointing body inserted into the entry area 33. FIG. 18 shows a state where an arbitrary position within the entry area 33 is pointed by a finger C as a pointing body, and FIG. 19 shows a portion of FIG. 18 enlarged to make clear a relation between the camera 34L and the finger C.

As shown in FIG. 18, it is assumed that the finger C is inserted into the entry area 33 of the coordinate-position inputting/detecting device 31 and an arbitrary position (x, y, z) on the display surface d is pointed or touched thereby. Images of the background plate 37 and the finger C are formed on each two-dimensional image sensor 35 of the cameras 34L and 34R through each focusing optical lens 36.

Figure 20:
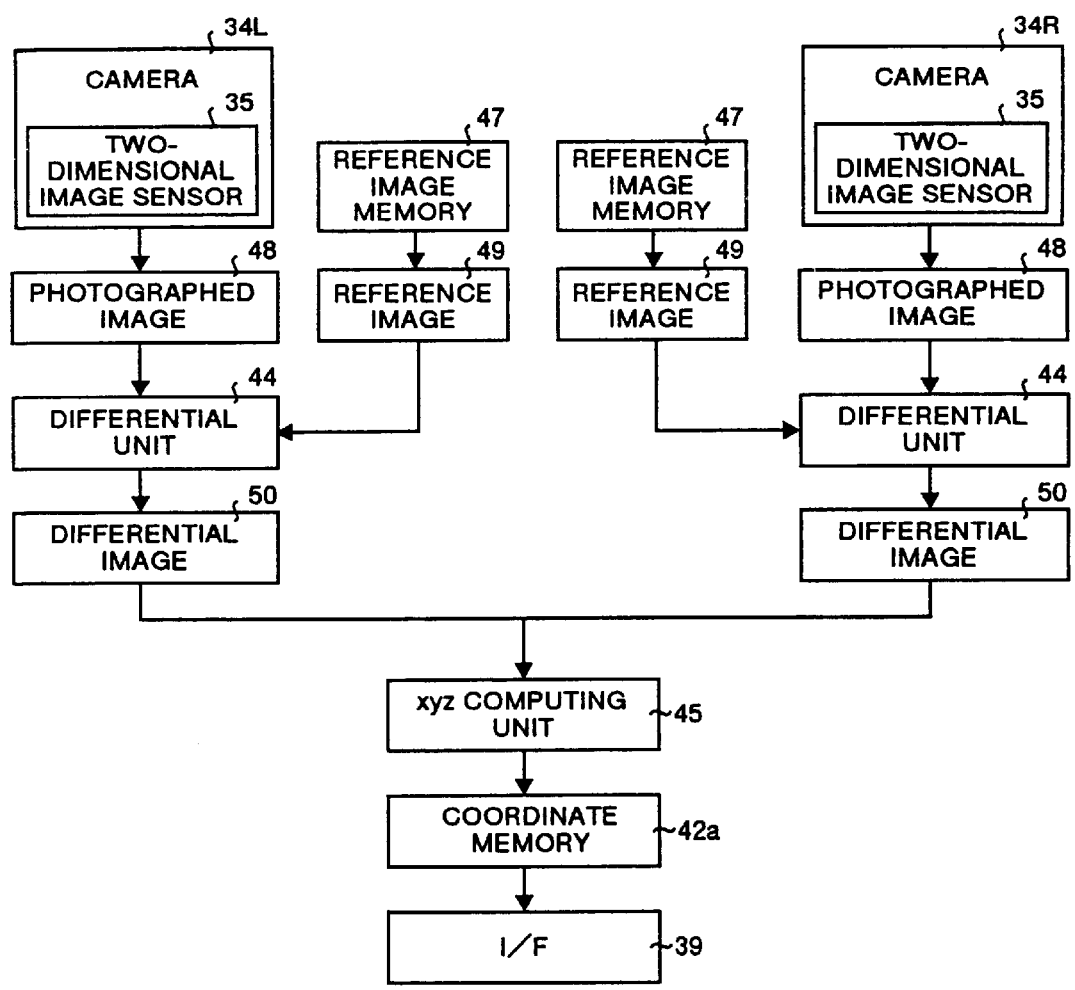
FIG. 20 is an explanatory view showing a flow of the processing for computing coordinates of a position of a pointing body inserted into the entry area in the coordinate-position inputting/detecting device according to Embodiment 2 of the present invention.

As shown in FIG. 20, the images of the background plate 37 and the finger C formed on the two-dimensional image sensors 35 are outputted from the two-dimensional image sensors 35 as photographed images 48. The photographed images 48 outputted from the two-dimensional image sensors 35 of the cameras 34L and 34R and reference images 49 stored in the reference image memories 47 are inputted into the differential units 44, and differential images 50 are extracted respectively.

Figure 21:
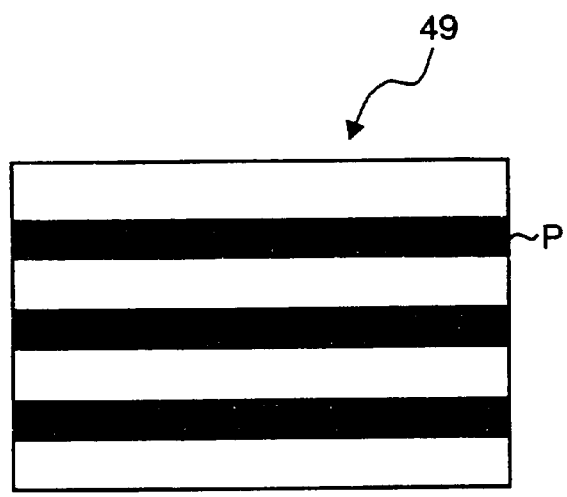
FIG. 21 is an explanatory view showing an example of a reference image shown in FIG. 20.
Figure 22:
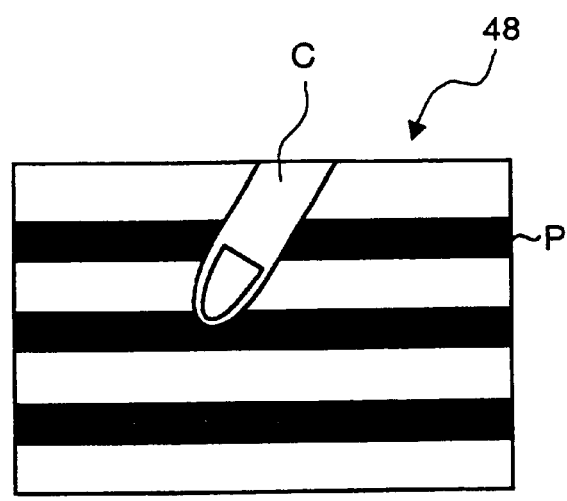
FIG. 22 is an explanatory view showing an example of a photographed image shown in FIG. 20.

FIG. 21 is an explanatory view showing an example of the reference image 49, and FIG. 22 is an explanatory view showing an example of the photographed image 48. The reference image 49 shows the entry area 33 photographed by the cameras 34L and 34R in an initial state such as on starting of the device. Namely, the reference image 49 is the one with only the reference pattern P of the background plate 37 photographed as shown in FIG. 21. While the photographed image 48 is the one with the finger C having been inserted into the entry area 33 photographed in addition to the image of the reference image 49 as shown in FIG. 22.

Figure 23:
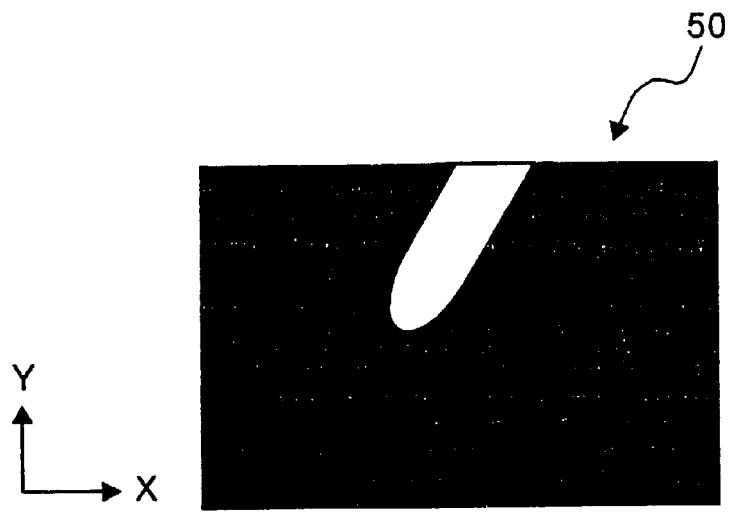
FIG. 23 is an explanatory view showing an example of a differential image shown in FIG. 20.

FIG. 23 is an explanatory view showing an example of a differential image extracted by the differential unit 44. The differential image 50 is a silhouette image consisting of black and white pixels obtained through processing of subtracting the reference image 49 (FIG. 21) from the photographed image 48 (FIG. 22) and setting a pixel brighter than a prespecified threshold value to white and a pixel darker than the prespecified threshold value to black. In this case, the section of the white pixels corresponds to the silhouette of the finger C. Then, as shown in FIG. 20, each of the differential images 50 is inputted in the xyz computing unit 45, and the processing of computing finger-position coordinates (x, y, z). Assuming that the reference pattern is decided as a uniform black pattern for absorbing light described above, there is no need to take a difference between the photographed image 48 and reference image 49, therefore, the silhouette image can also be obtained by digitizing the photographed image 48 with the prespecified threshold value.

Then, specific description is made for the processing of computing coordinates of a three-dimensional position of the finger C by the xyz computing unit 45. At first, the processing for computing coordinates (x, y) of a position will be described herein. The xyz computing unit 45 executes the processing for computing a central point in imaging of the finger C in each of the differential image 50 and also computing a distance h between the computed central point in the imaging and the center 35a of the two-dimensional image sensor 35 (Refer to FIG. 19). Each central point of the finger C in the differential images 50 corresponds to a position of a white pixel (a portion of the silhouette image of the finger C) with a minimum value of the y coordinate. Namely, the minimum point (x, ymin) in the y coordinate of the white pixels is the central point in the image. Then, assuming that the pixel corresponding to the center 35a of the two-dimensional image sensor 35 is x0, the difference x−x0 between the coordinate x of the above mentioned point (x, ymin) and the pixel x0 corresponding to the center 35a of the two-dimensional image sensor 35 is a distance h between the center 35a of the two-dimensional image sensor 35 and the central point of the image.

Further, as shown in FIG. 19, the distance h from the center 35a of the two-dimensional image sensor 35 to the central point of the differential image (silhouette image of the finger C) 50 depends on an angle θ between a central line of the two-dimensional image sensor 35 and a line which links the finger C and the central point in the image. This angle θ can be computed with the following equation.

$$\theta = arctan(h/f) \quad (10)$$

Where f is a distance between the focusing optical lens 6 and the two-dimensional image sensor 35, which in turn corresponds to a focal length of the focusing optical lens 6.

An angle β between the camera 34L and the finger C can be computed with the following equation.

$$\beta = \alpha - \theta \quad (11)$$

Where α is an angle between a reference line which links the cameras 34L and 34R and the central line of the two-dimensional image sensor 35, which in corresponds to an angle at which the camera 34L is attached.

By executing the above processing using the differential image 50 obtained by the camera 34R, an angle β between the camera 34R and the finger C together with the angle β between the camera 34L and the finger C can also be computed. Herein, the angle between the camera 34L and the finger C will be considered as β1 and the angle between the camera 34R and the pen A is considered as β2.

Then, the coordinates (x, y) of the position of the finger C can be computed with the following equation based on the principle of triangulation.

$$x = L \tan \beta2/(\tan \beta1 + \tan \beta2) \quad (12)$$

$$y = x \tan \beta1 \quad (13)$$

Figure 24:
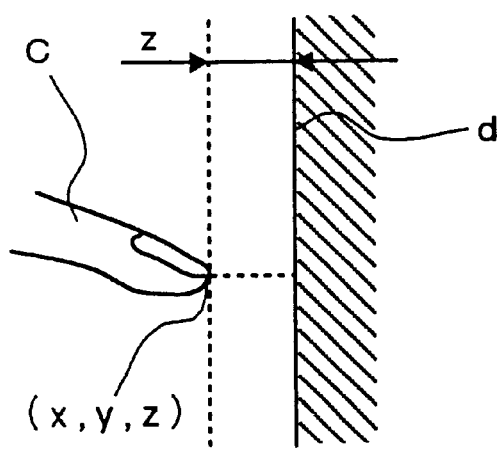
FIG. 24 is an explanatory view showing how a point in the entry area is pointed with a finger in the coordinate-position inputting/detecting device according to Embodiment 2 of the present invention.

Then, description is made for the processing of computing the z-coordinate of a position. FIG. 24 is an explanatory view m showing how a point in the entry area 33 is pointed with a finger C. As shown in FIG. 24, the z-coordinate of a position is a p distance between the tip of the finger C and the display surface d (each optical axis of the cameras 34L and 34R). However, the distance between the central point of a differential image (silhouette image of the finger C) 50 in the Z direction formed on the two-dimensional image sensor 35 of the camera 34L (and 34R) and the center 35a of the two-dimensional image sensor 35 varies according to the distance D between the camera 34L (and 34R) shown in FIG. 19 and the finger C.

Figure 25:
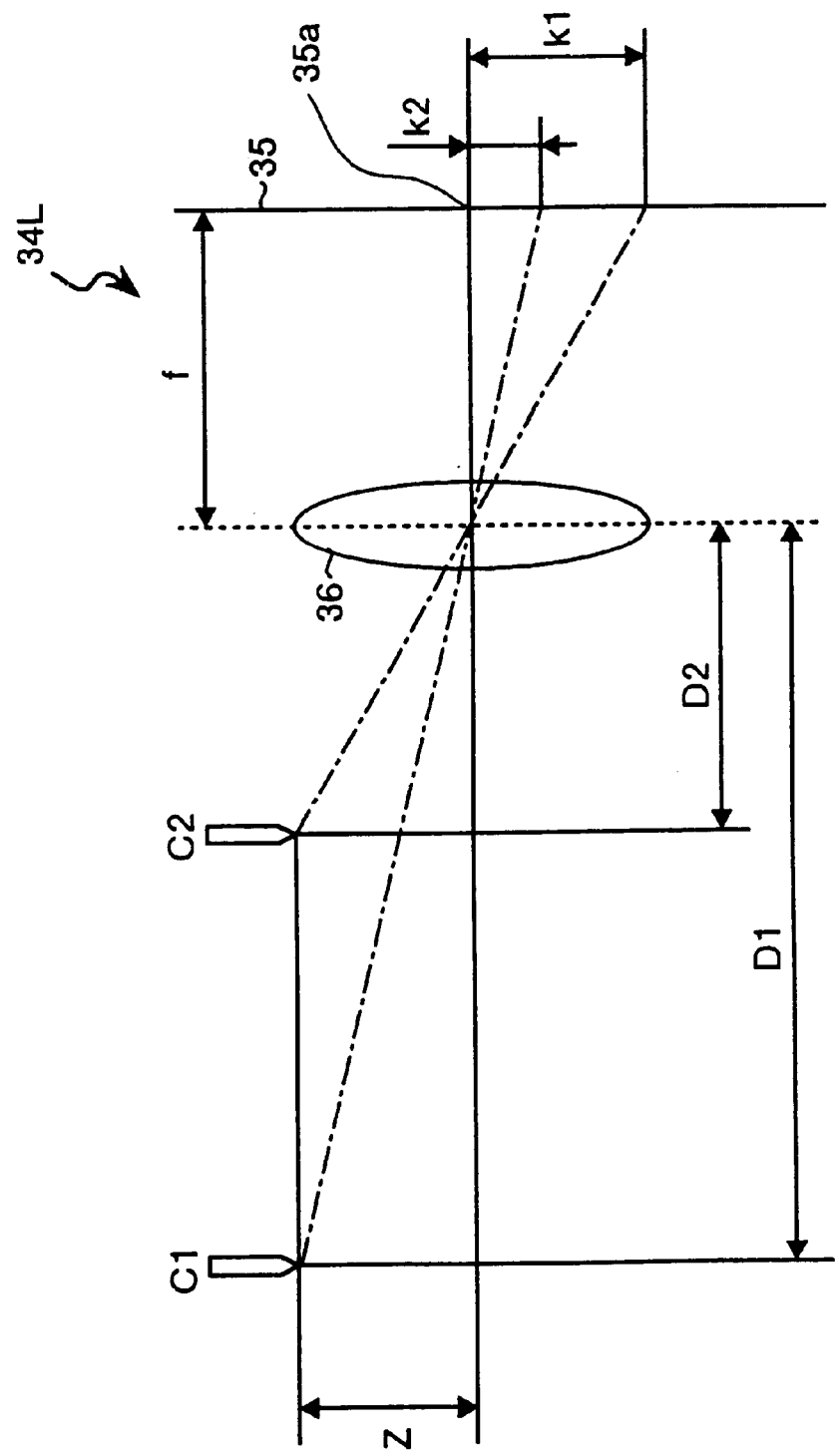
FIG. 25 is an explanatory view showing a relation between a central point of an image of a differential image in the Z direction formed in a two-dimensional image sensor and a distance D in the coordinate-position inputting/detecting device according to Embodiment 2 of the present invention.

FIG. 25 is an explanatory view showing a relation between a central point of a differential image in the Z direction formed in the two-dimensional image sensor 35 and a distance D. As shown in FIG. 25, when the finger C is inserted into a point having a height Z from the display surface d, assuming that the distance between the camera 34L (34R) and the finger C (finger C1 herein) is D1 then image of the finger C is formed at a position separated by the distance k1 from the center 35a of the two-dimensional image sensor 35. Assuming that the distance between the camera 34L (34R) to the finger C (finger C2 herein) is D2 then image of the finger C is formed at a position separated by the distance k2 from the center 35a of the two-dimensional image sensor 35. Namely, it is clear that, even when the finger C is positioned at the same height Z from the display surface d (each optical axis of the cameras 34L and 34R), a position k of the finger in the image is different depending on a distance D between the camera 34L (34R) and the finger C. Therefore, the z-coordinate of a position of the finger C can be computed with the following equation according to the distance D computed based on the coordinates (x, y) of the position of the finger C and the angle α described above.

$$z = D(k/f) \quad (14)$$

By detecting the coordinate (z) of the position of the finger C as described above, it is possible to easily identifying any of the pen-up/pen-down states or even a double click.

Figure 26A:
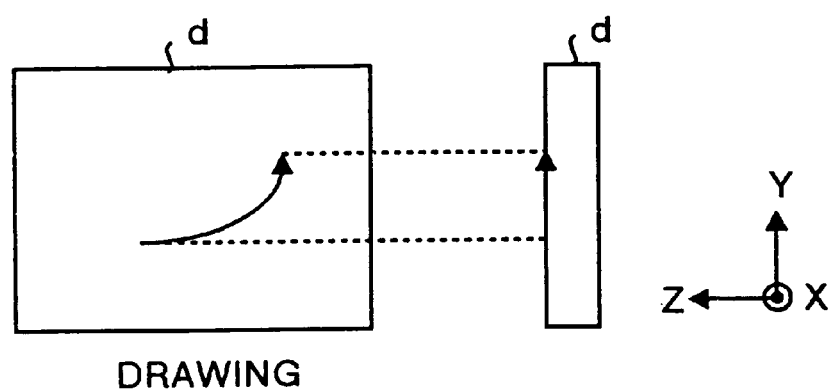
FIG. 26A and FIG. 26B are explanatory views showing a drawing and a gesture command usable in the coordinate-position inputting/detecting device according to Embodiment 2 of the present invention.
Figure 26B:
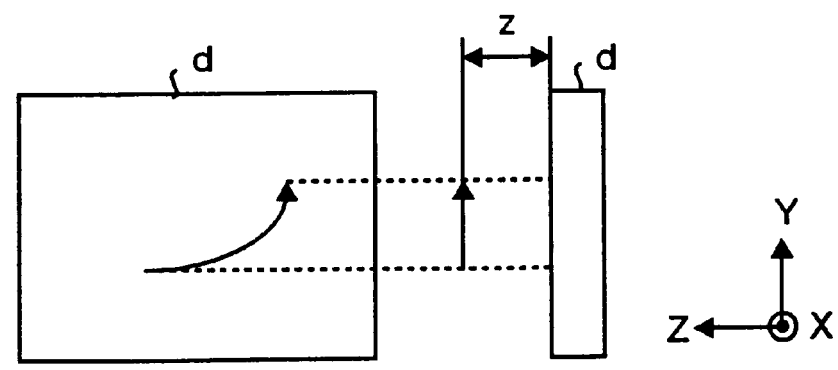

When a gesture command according to an operation of a pointing body such as the finger C is previously stored in the ROM 41 or a storage device for a computer, the microcomputer 38 or the computer can determine whether movement of the finger C is for a drawing or for the gesture command according to the z-coordinate of a position. FIG. 26A and FIG. 26B show examples of a drawing and a gesture command respectively. As shown in FIG. 26A and FIG. 26B, movements of the finger C for drawing and for the gesture command defined herein are the same in the X-Y direction, but there is a difference in the Z direction. As described above, by combining movements in the X-Y direction with each position in the Z direction, gesture commands based on the movements of the finger C can be built up. As a command allocated to the gesture command shown in FIG. 26B, there is "turn a page" as one of examples.

The above mentioned Equations (10) to (14) can previously be stored in the ROM 41 as a portion of the control program.

The coordinates (x, y, z) of the position of the finger C computed by the xyz computing unit 45 are temporarily stored in the coordinate memory 42a and then transferred to the computer through the I/F 39. More specific description is made for the processing in this case with reference to FIG. 10. The microcomputer 38 makes, when the coordinates (x2, y2, z2) of a position of the finger C are computed by the xyz computing unit 45, namely when the pen-down state is detected (Yes in step S1), the timer 22 start counting a prespecified time (step S2).

In the next step, the microcomputer 38 determines whether the coordinates (x2, y2, z2) of the computed position are coincident with the coordinates (x1, y1, z1) of the position stored in the coordinates memory 42a or not (step S3). When it is determined that the coordinates of the two positions are not coincident (No in step S3), the microcomputer 23 updates the coordinates of the position stored in the coordinate memory 42a to the newly computed coordinates (x2, y2, z2) of the position, and clears the counting by the timer 22 (step S4). Then, the microcomputer 38 transfers the coordinates of the position in the coordinates memory 42a to a computer (step S5) and the system control is returned to step S1 where the microcomputer 38 waits for new detection of a pen-down. The computer executes the processing in response to movement of the pen A according to the transferred coordinates of the position. For example, the computer executes the processing for drawing characters and graphics on a display.

On the other hand, when it is determined that the coordinates of the two positions are coincident (Yes in step S3), the microcomputer 38 waits for computation of coordinates (x3, y3, z3) of a new position which are different from the coordinates of the position stored in the coordinates memory 42a by the xyz computing unit 45 during the period of time until the prespecified time is counted by the timer (step S6, step S7, step S3). More specifically, the microcomputer 38 waits for computation of the coordinates of a new position by the xyz computing unit 45 (detection of the pen-down state), and when the, coordinates of the new position are computed (Yes in step S7) the system control is shifted to step S3 where the microcomputer 38 determines whether the coordinates of the computed position is coincident with the coordinates of the position in the coordinates memory 42a or not. Then, when it is determined that the coordinates of the two positions are not coincident (No in step S3), the microcomputer 38 executes the processing in step S4 and step S5 as described above. On the other hand, when it is determined that the coordinates of the two positions are coincident (Yes in step S3), the microcomputer 17 shifts the system control again to step S6.

Then, the microcomputer 38 executes, when it is determined that the prespecified time has passed (Yes in step S6), the error processing (step S8) and the system control is returned to step S1 where is waits for new detection of a pen-down. Namely, when non coincident coordinates can be obtained (step S3) until the prespecified time passes, it is considered that there is no movement of the finger C. Therefore, the coordinates of the computed position by the xyz computing unit 45 are regarded as a position of, for instance, dust or something deposited on the display surface d, and the error processing is executed in step S8. As this error processing, the microcomputer 38 does not update the coordinates of the position stored in the coordinates memory 42a, but discards the coordinates of the position computed in step S1 so that the coordinates of the position in the coordinates memory 42a will not be transferred to the computer.

In addition, the microcomputer 38 stores a photographed image 48 as a source of detecting the coordinates of the position to be abandoned in the reference image memory 47 of the EEPROM 46 as a new reference image 49. With this operation, even when dust or something exists in the entry area 33, the image of the dust is recognized as a portion of the reference image 49, thus, erroneous recognition of dust as a pointing body can be prevented.

As described above, with the coordinate-position inputting/detecting device 31 according to Embodiment 2, images of the entry area 33 photographed by the cameras 34L and 34R are stored as reference images respectively, and then, by extracting the images of the entry area 33 photographed by the cameras 34L and 34R and each difference of the corresponding reference images respectively, images of a pointing body inserted into the entry area 33 are extracted, each position of the images of the pointing body formed on each of the CCDs 5 is computed according to the extracted images of the pointing body, and coordinates of the position of the pointing body are identified by using the computed position of each imaging, which allows coordinates of a position in an entry area pointed with an arbitrary pointing body such as a finger tip or an ordinary pen to be identified without using any particular pointing body, therefore, operability of the coordinate-position inputting/detecting device can be enhanced.

In the coordinate-position inputting/detecting device 31 according to Embodiment 2, although the two-dimensional CCD image pickup element is used as the two-dimensional image sensor 35 (two-dimensional image pickup element) for each of the cameras 34L and 34R, the sensor is not limited to the above sensor, but a plurality of one-dimensional CCD image pickup elements may be used. When a color two-dimensional image sensor (two-dimensional image pickup element) is used, not only coordinates (x, y, z) of a position but also data for color added to a pointing body (e.g., a color soft-point pen) can be transferred to a personal computer.

Furthermore, in the coordinate-position inputting/detecting device 31 according to Embodiment 2, although two cameras 34L and 34R are used, number of cameras is not limited to two. Namely, at least two cameras may be required. Location where the cameras 34L and 34R are attached are not limited to the upper side of the entry area 33, but the cameras 34L and 34R can be attached to any arbitrary location.

In Embodiment 2, although the coordinate-position inputting/detecting device 31 is attached to the front side of the display, the location is not limited to the front side thereof, the device may also be attached to a display board. In addition, the coordinate-position inputting/detecting device 31 according to Embodiment 2 may be integrated with a display by using a frame of the display. Furthermore, by using a frame of the display board, the coordinate-position inputting/detecting device 31 according to Embodiment 2 may also be integrated with the display board.

As Embodiment 3 of the present invention, a display board system using the coordinate-position inputting/detecting device described in Embodiments 1 and 2 will be described. The display board system according to Embodiment 3 will be described hereinafter in detail in the order of:
1. System configuration,
2. Operation, and
3. Effects.

1. System Configuration

Figure 27:
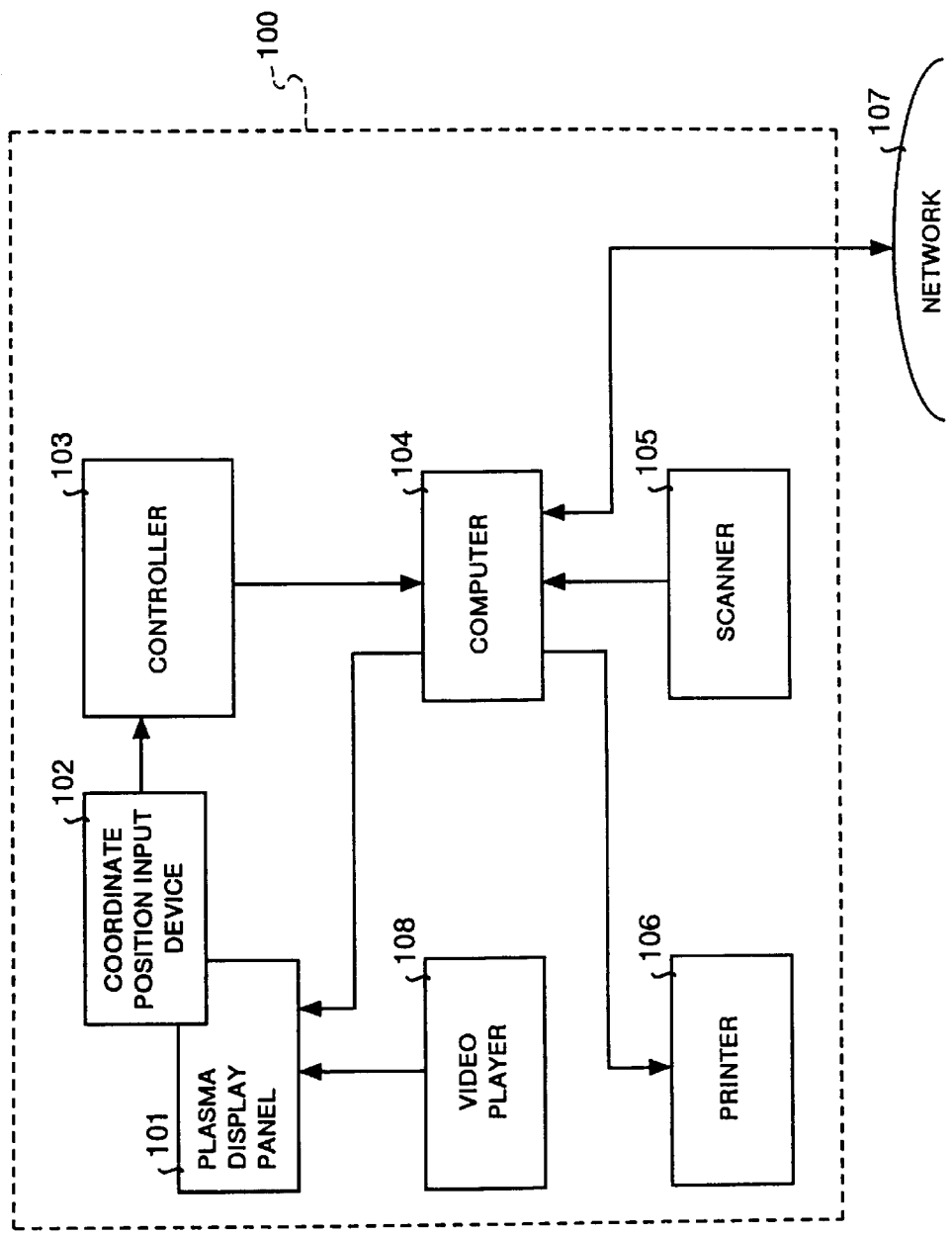
FIG. 27 is a block diagram of a display board system according to Embodiment 3 of the present invention.

FIG. 27 is a block diagram showing the display board system according to Embodiment 3. The display board system 100 shown in FIG. 27 principally comprises a plasma display panel (Described "PDP" hereinafter) 101 for displaying the images. A coordinate-position input device 102 is provided on the front surface of the PDP 101 with an entry area (Refer to FIG. 1) used as a touch surface (writing surface) for inputting characters and graphics written with a fingertip or a pen through the touch surface (which corresponds to the coordinate-position inputting/detecting device described in Embodiments 1 to 3). A controller 103 is provided for performing an operation of calculation of a position of coordinates on the touch surface when touched with a fingertip or a pen. A computer 104 (a personal computer) is provided for receiving positional information for coordinates from the controller 103 and providing controls over the system as a whole such as processing for illustrating characters and graphics inputted through the coordinate-position input device 102 onto the PDP 101.

Various types of peripheral equipment can be connected to the computer 104 of the display board system 100. As an example, FIG. 27 shows a scanner 105 for reading images of a document and a printer 106 for outputting image data onto a recording paper connected to the computer 104. Furthermore, the display board system 100 can be connected to a network 107 through the computer 104. This allows data prepared by other computers that are connected on the network 107 to be displayed on the PDP 101 or data prepared by the display board system 100 to be transferred to other computer.

Furthermore, a video input terminal and a speaker are provided in the PDP 101 although they are omitted from the figure. By connecting various types of information equipment and AV equipment such as a video player 108, a laser disk player, a DVD player, or a video camera, the PDP 101 can be used as a large sized screen monitor.

Herein, a 40-inch or 50-inch large sized screen usable as a display board is used as the PDP 101. A plasma display is employed as a display in Embodiment 3 because the plasma display has characteristics such that the display can be upsized, has high brightness so that it is not required to darken the room as required when a projector is used, and that a view field angle is wider as compared to that of a liquid crystal display and further moving images can smoothly be reproduced. As described above, as the plasma display is used, the display unit according to Embodiment 3 can be made thinner (downsized). However, although it is assumed that the PDP 101 is used herein, it is needless to say that some other display unit such as a CRT or a crystal liquid display can be used instead of the PDP 101.

As the coordinate-position input device 102, the coordinate-position inputting/detecting device described in Embodiments 1 and 2 is used as already described above. Therefore, in Embodiment 3, description of the coordinate-position input device 102 is omitted. The controller 103 inputs an operation performed on the touch surface of the coordinate-position input device 102 to a computer as positional information for coordinates. This controller 103 corresponds to the microcomputer 17, the xy computing unit 23, and the shadow correcting section 27 or the like in Embodiment 1 and also corresponds to the microcomputer 38 and xyz computing unit 45 or the like in Embodiment 2. It should be noted that the computer 104 executes various processing described later such that a mouse cursor is displayed at the position where a user touches the touch surface of the PDP 101 according to positional information for coordinates inputted from the controller 103.

Figure 28:
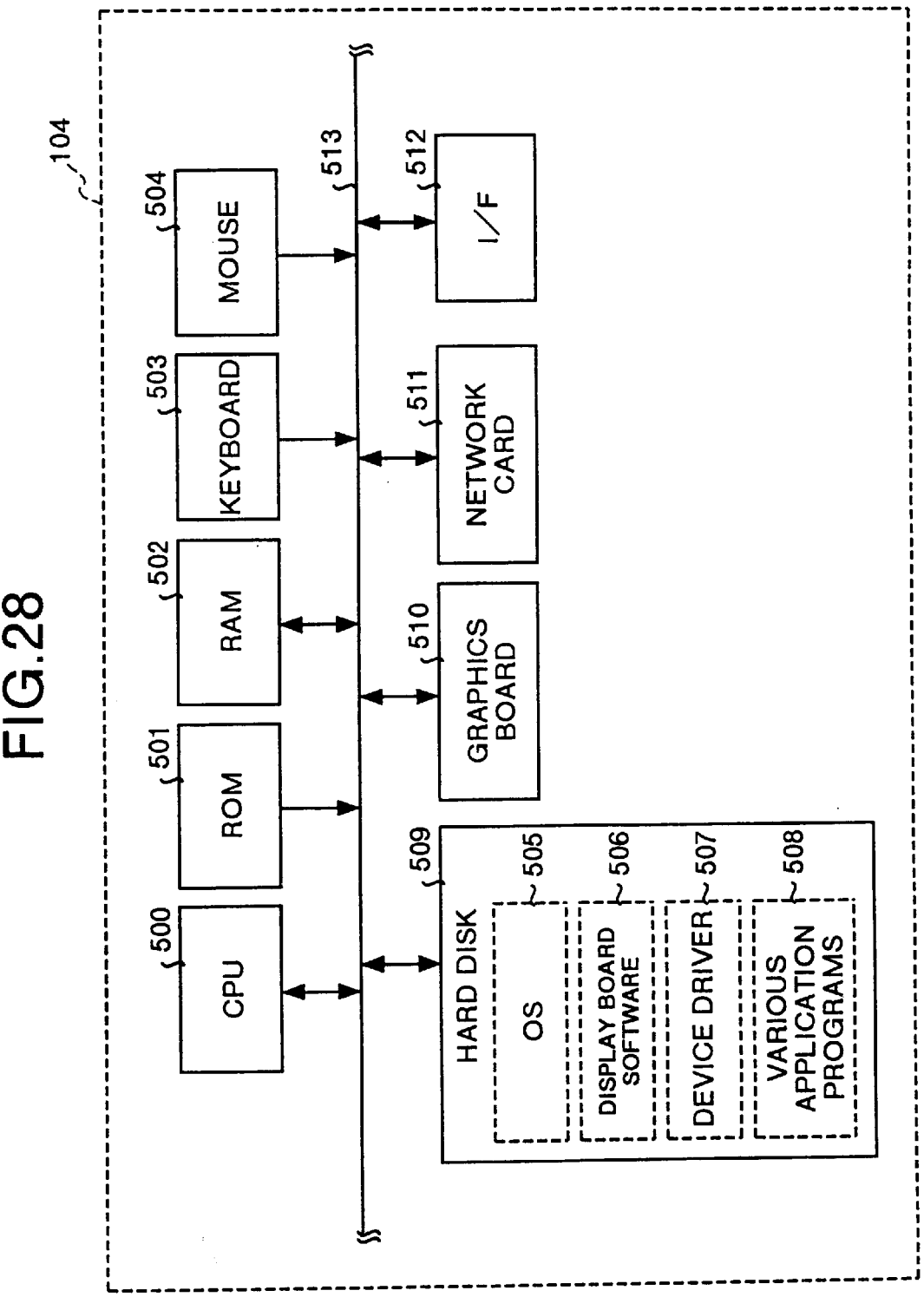
FIG. 28 is a block diagram of a computer (personal computer) of a display board system according to Embodiment 3 of the present invention.

A general configuration of the computer 104 shown in FIG. 27 will be described below. FIG. 28 is a block diagram of the computer 104. The computer 104 shown in FIG. 28 is a personal computer which comprises a CPU 500 which provides controls over the entire system. A ROM 501 is provided for storing therein a boot program or the like. A RAM 502 is utilized as a work area of the CPU 500. A keyboard 503 is utilized for inputting characters, numerical values, and various instructions or some other data. A mouse 504 is provided for moving a cursor and selecting an area. A hard disk 509 stores therein an operating system (OS) 505, display board software 506 for making the display board system 100 function as a display board, a device driver 507 for making the coordinate-position input device 102 and controller 103 operate on the computer 104, and various application programs 508 such as word processor and spreadsheet software. A graphics board 510 connected to the PDP 101 provides controls over display of images on to the PDP 101. A network card 511 (or may be a modem) is provided for connecting the display board system 100 to the network 107 through the computer 104. An interface (I/F) 512 is provided for connecting thereto the controller 103, scanner 105 and printer 106. A bus 513 is utilized for connecting the above mentioned component devices to each other.

Although the interface for connecting peripheral equipment to the computer 104 is shown as one block indicated by the I/F 512 in FIG. 28 for convenience, I/F 512 actually comprises a serial interface such as RS-232C for connecting thereto the controller 103, a parallel interface such as Centronics for connecting thereto the printer 106, and a SCSI for connecting thereto the scanner 105.

It should be noted that, as shown in FIG. 27, the controller 103 is configured independently from the computer 104, however, the controller 103 may be integrated with the computer 104, and the function of the controller 103 may be added to the computer 104 itself. Although not shown in FIG. 28, a floppy disk drive, a CD-ROM drive, and a MO drive can be incorporated in the computer 104.

The component devices constituting the display board system 100 as described above are accommodated in the frame unit in an integrated form, and downsizing of a system as a whole, operability, adaptability for handling and convenience can be improved. The display board system 100 is accommodated in the frame unit as described above is because, a wide space for installation thereof is required if the component devices are discretely managed and a long time is required for moving the whole device from one place to another as the display board system 100 comprises a plurality of component devices as shown in FIG. 27.

Figure 29:
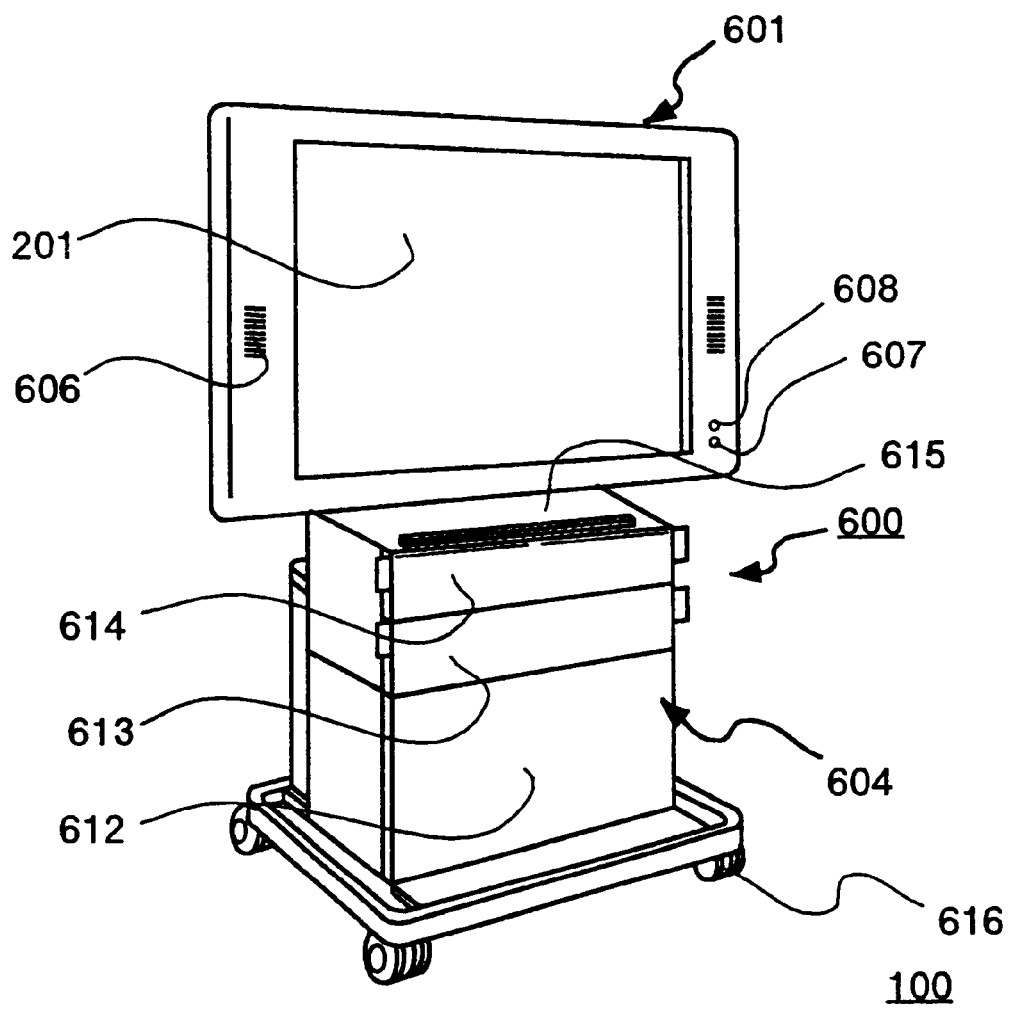
FIG. 29 is a perspective front view of a frame unit with the display board system according to Embodiment 3 of the present invention accommodated therein.
Figure 30:
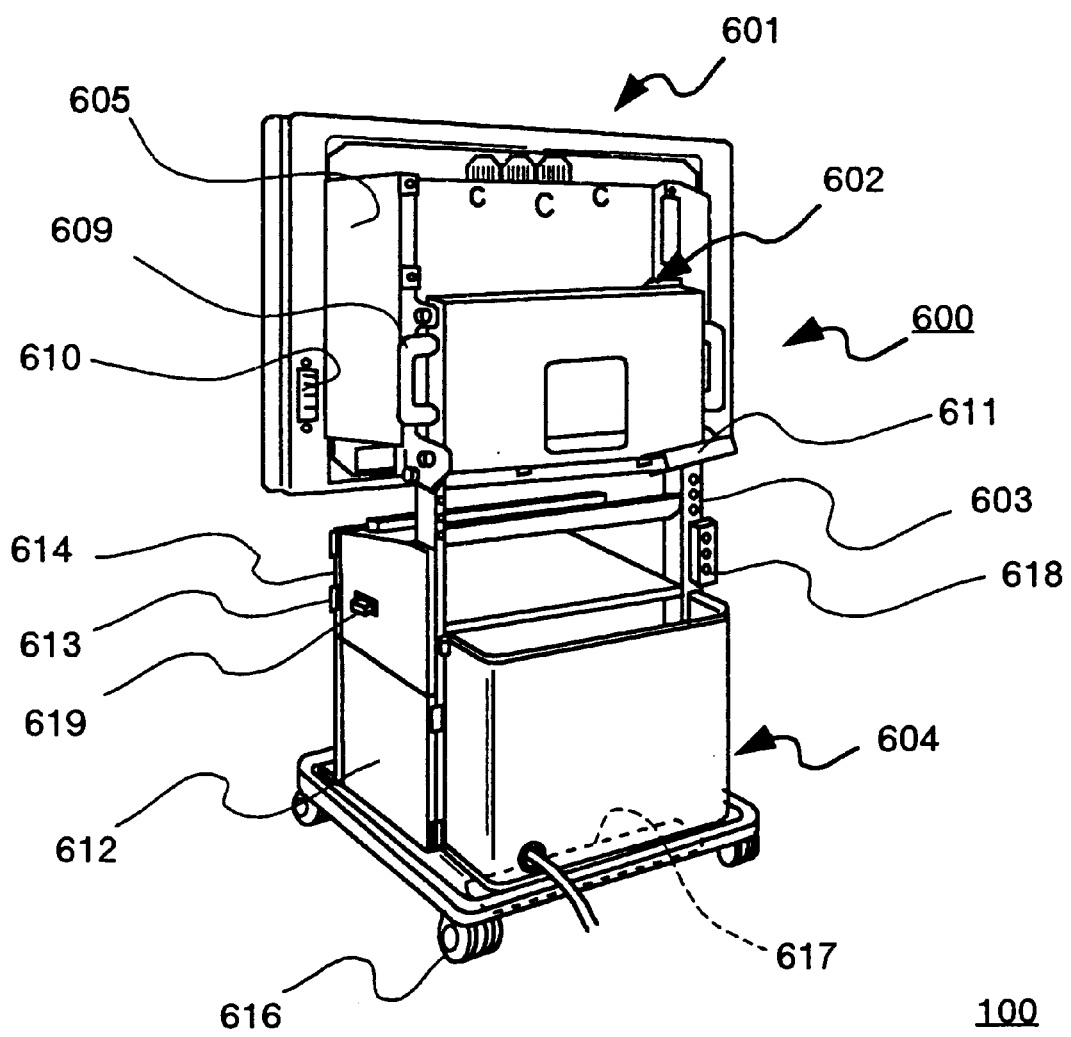
FIG. 30 is a perspective rear view of the frame unit with the display board system according to Embodiment 3 of the present invention accommodated therein.

FIG. 29 is a perspective view of the frame unit with the display board system 100 accommodated therein viewed from the front side thereof, and FIG. 30 is a perspective view thereof viewed from the rear side thereof. The frame unit 600 shown in FIG. 29 and FIG. 30 comprises a panel section 601 for accommodating the PDP 101 and coordinate-position input device 102 therein. A controller accommodating section 602 accommodates the controller 103 therein. A stand 603 supports the panel section 601 and the controller accommodating section 602 at a specified height. Finally, an equipment accommodating section 604 accommodates the computer 104, scanner 105, printer 106, and a video player 108 or the like therein.

The PDP 101 and coordinate-position input device 102 are integrated so that the coordinate-position input device 102 is positioned in front of the PDP 101, and as shown in FIG. 29, the coordinate-position input device 102 is accommodated in the panel section 601 so that the touch surface 201 of the coordinate-position input device 102 is positioned in the front section of the panel section 601. As described above, the panel section 601 accommodates therein the PDP 101 and coordinate-position input device 102, and constitutes a display surface and a writing surface (touch surface 201) of the display board.

Furthermore, the controller 103 is accommodated, as shown in FIG. 30, in the controller accommodating section 602 provided on the rear side of the panel section 601. The panel section 601 is mounted on the stand 603 of the equipment accommodating section 604 through a stay 605 to be supported so that the image display surface of the PDP 101 and the touch surface 201 of the coordinate-position input device 102 are positioned at a specified height. The controller accommodating section 602 is also similarly mounted on the stand 603.

It should be noted that, in the front side of the panel section 601 shown in FIG. 29, the reference numeral 606 indicates a speaker and the reference numeral 607 indicates a power lamp of the PDP 101. Furthermore, in the display board system 100 according to Embodiment 3, although detailed description is omitted herein, switching of output sources of images from the PDP 101 to the computer 104 or the video player 108 and the like and adjustment of volume can be performed using a remote control unit, and the reference numeral 608 corresponds to a remote control light receiving section for receiving light from a remote control unit.

Designated at the reference numeral 609, on the rear side of the panel section 601 shown in FIG. 30, is a handle for moving the display board system 100. 610 is a control panel for setting brightness and contrast or the like of the PDP 101, and 611 is an angle adjusting lever for adjusting the angle of the panel section 601 described later. Furthermore, a connector panel for connecting the computer 104 or video player 108 and the like to the PDP 101 or the controller 103 and the like is provided on the bottom side of the controller accommodating section 602 although it is not shown in the figure.

Namely, an image output cable and an audio output cable for the computer 104 are connected to the PDP 101 through this connector panel, and the computer 104 and the controller 103 are connected to each other through this connector panel. Furthermore, various types of information equipment and AV equipment such as the video player 108 and the like are also connected to the PDP 101 through this connector panel.

The equipment accommodating section 604 of the frame unit 600 comprises a computer accommodating section 612 for accommodating the computer 104 therein. There is a video accommodating section 613 for accommodating various information equipment and AV equipment such as the video player 108, a laser disk player, or a DVD player. A printer accommodating section 614 accommodates the printer 106. The computer accommodating section 612, video accommodating section 613 and printer accommodating section 614 are provided in this order from bottom to top. As described, by arranging the devices in the order of the heaviest one in the bottom and lighter ones in the top in the vertical direction, stability of the frame unit 600 at the time of movement and installation thereof can be insured even if there is the board section 601 having the PDP 101 and coordinate-position input device 102 in the upper side. Although an accommodating section for accommodating the scanner 105 shown in FIG. 27 is not provided in the equipment accommodating section 604, the accommodating section for the scanner 105 may be provided therein on condition that the devices are arranged in the order of the heaviest one at the bottom and the lighter ones at the top of the heavier ones.

The computer accommodating section 612 has doors on both sides thereof, through which a floppy disk or a CD-ROM can be inserted thereinto. The video accommodating section 613 has a door on the front side thereof, through which a video tape or a laser disk or the like can be inserted into. Furthermore, the printer accommodating section 614 has a door on the front side thereof, through which a printer can be operated, and there is a place on this door so that a pen (not shown in the figure) used for touching the touch surface 201 of the coordinate-position input device 102 can be accommodated therein. In addition, the rear surface of the printer accommodating section 614 is not covered with the frame, therefore, the printer 106 can be accommodated such that the paper feed tray of this printer is positioned in the outside of the frame unit 600 (Refer to FIG. 31), and operability can be enhanced.

It should be noted that, in the front side of the equipment accommodating section 604 shown in FIG. 29, the reference numeral 615 indicates a keyboard base for placing thereon a keyboard 503 for the computer 104 so that it can be used at any time. Further, the reference numeral 616 indicates casters for moving the display board system 100 with the entire frame unit 600. Designated at the reference numeral 617, in the rear surface of the equipment accommodating section 604 shown in FIG. 30, is a power tap for supplying power to the PDP 101, the controller 103, and the-computer 104. 618 is a cable guide for wiring various cables, and 619 is a main power switch for the display board system 100.

As described above, by accommodating the display board system 100 in the frame unit 600, the display board system 100 can easily be moved and installed only by moving the frame unit 600. Furthermore, stability of the frame unit 600 when it is moved and installed can be insured because the devices are arranged in the order of the heaviest one to a lighter one from the bottom in the direction of gravity (vertical direction) in the equipment accommodating section 604 of the frame unit 600.

Furthermore, taking into consideration that, for instance, light of a fluorescent tube directly enters the display surface of the PDP 101, which may cause an image appearing on the PDP 101 to be difficult to be seen, an angle adjusting mechanism section for adjusting an angle of the board section 601 (a display surface and a writing surface of a display board) is provided in the frame unit 600 described above. An example of configuration of this angle adjusting mechanism section is described below.

Figure 31:
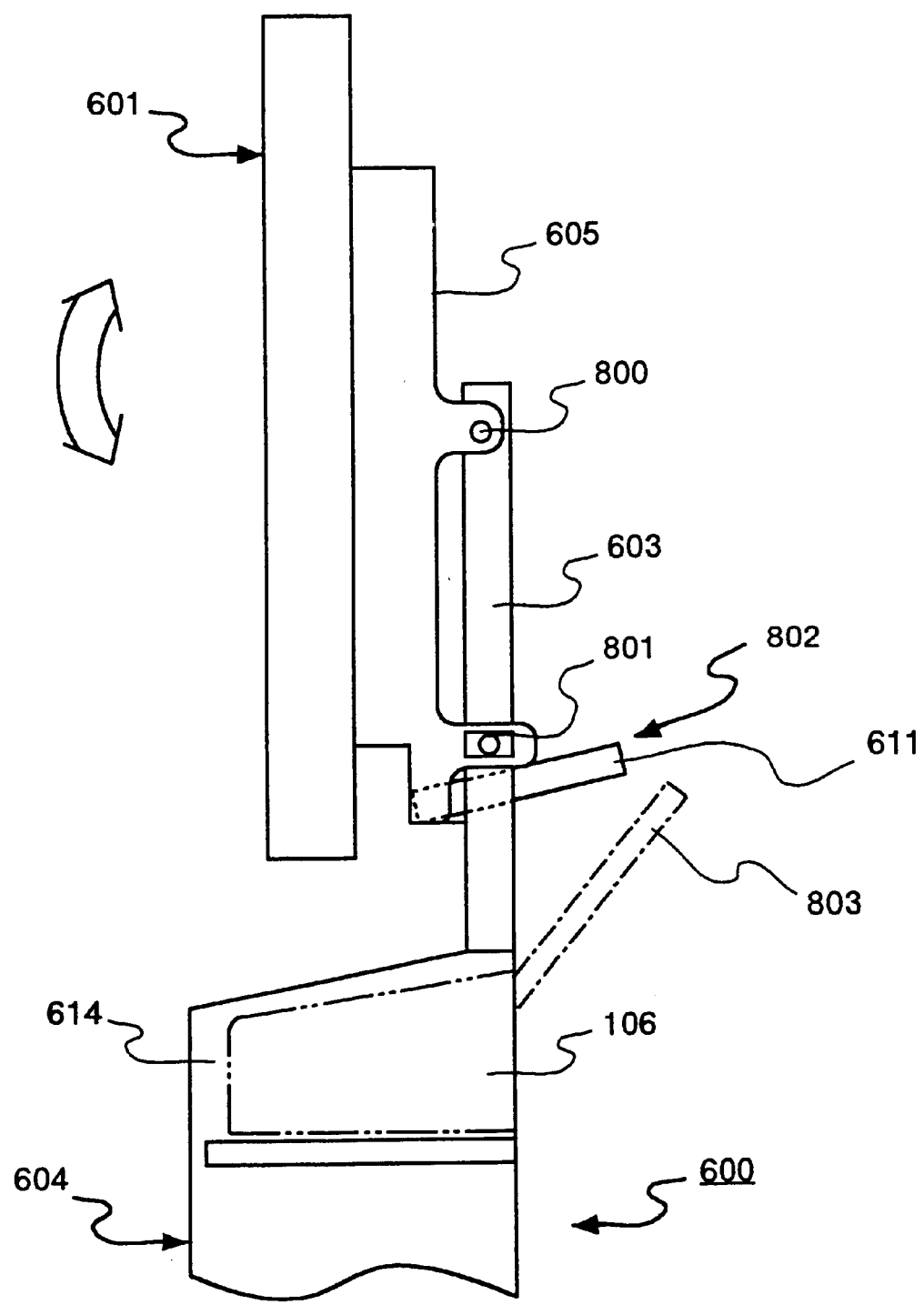
FIG. 31 is a side view of the frame unit according to Embodiment 3 of the present invention viewed from the right side thereof.

FIG. 31 is a side view of the frame unit 600 viewed from the right side thereof. In FIG. 31, the reference numeral 800 indicates a pivotal supporting point, and the reference numeral 801 indicates a pivotal guide. The board section 601 is pivotally mounted on the stand 603 existing on both sides of the frame unit 600 around the pivotal supporting point 800 through the stay 605. Namely, the board section 601 can be rotated in the direction indicated by the arrow in FIG. 31 around the pivotal supporting point 800 just like nodding so that an angle at which light of a fluorescent tube is not reflected into the PDP 101 can be adjusted. Herein the pivot guide 801 restricts the angle of the board section 601 pivoting around the pivotal supporting point 800, and the angle adjusting lever 611 pivots the board section 601 through a mechanism described later to adjust an angle thereof.

In Embodiment 3, it is assumed that the angle of the board section 601 can be adjusted in a range from zero degree (the board section 601 in an upright position) to five degrees (the board section 601 in a downward-slanting position) by operating the angle adjusting lever 611. It is also assumed that the angle adjusting mechanism section 802 comprises the pivotal supporting point 800, pivot guide 801, angle adjusting lever 611, and each component member described below.

It should be noted that, in FIG. 31, the reference numeral 803 indicates a tray of the printer 106 that is accommodated in the printer accommodating section 614. As shown in FIG. 31, the angle adjusting lever 611 for adjusting an angle of the board section 601 is provided at such a position that it does not hinder the feeding of recording paper to the tray 803.

Figure 32:
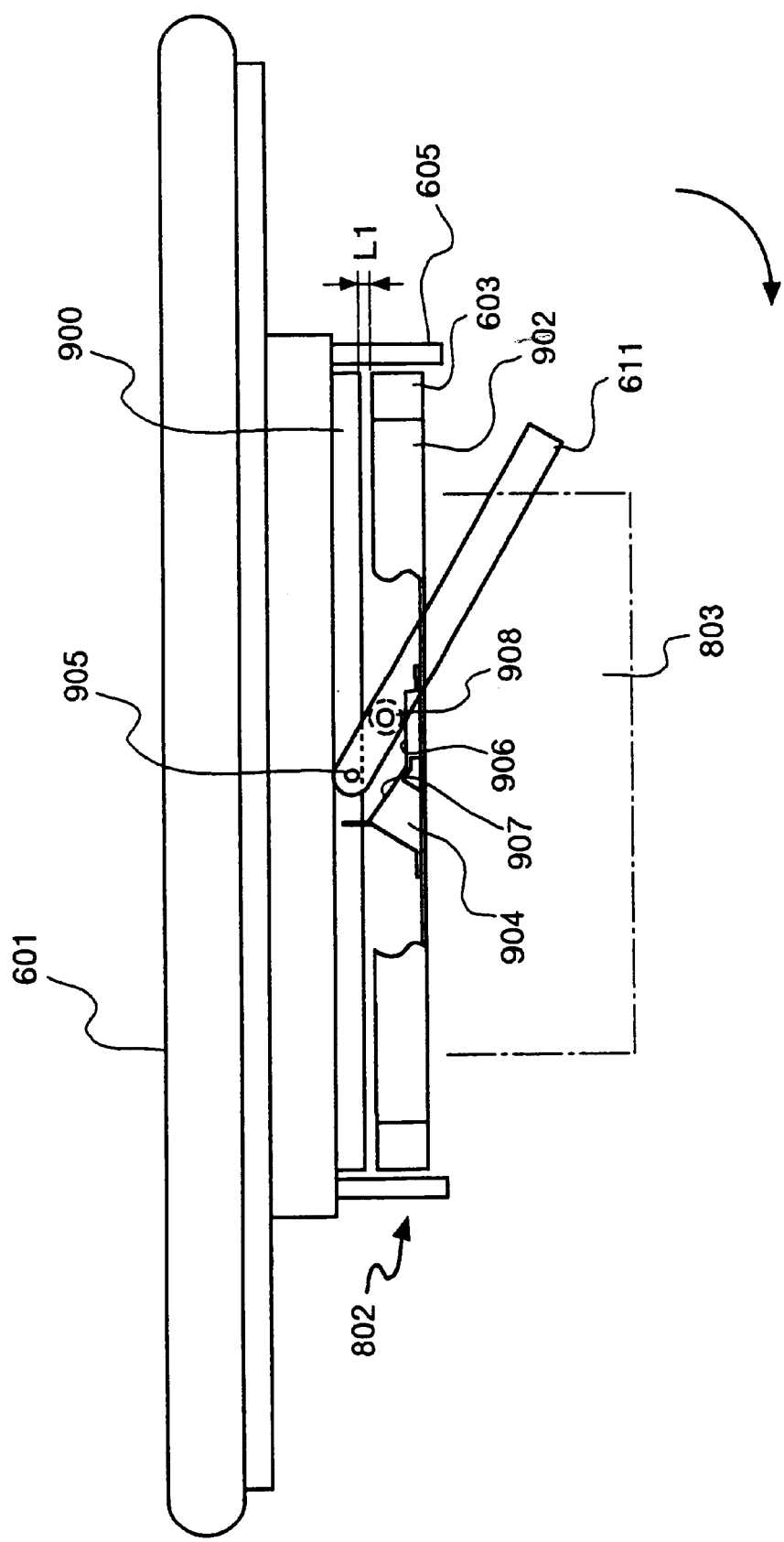
FIG. 32 shows the configuration of an angle adjusting mechanism section according to Embodiment 3 of the present invention viewed from the upper side of the frame unit (angle of the board section is five degrees)
Figure 33:
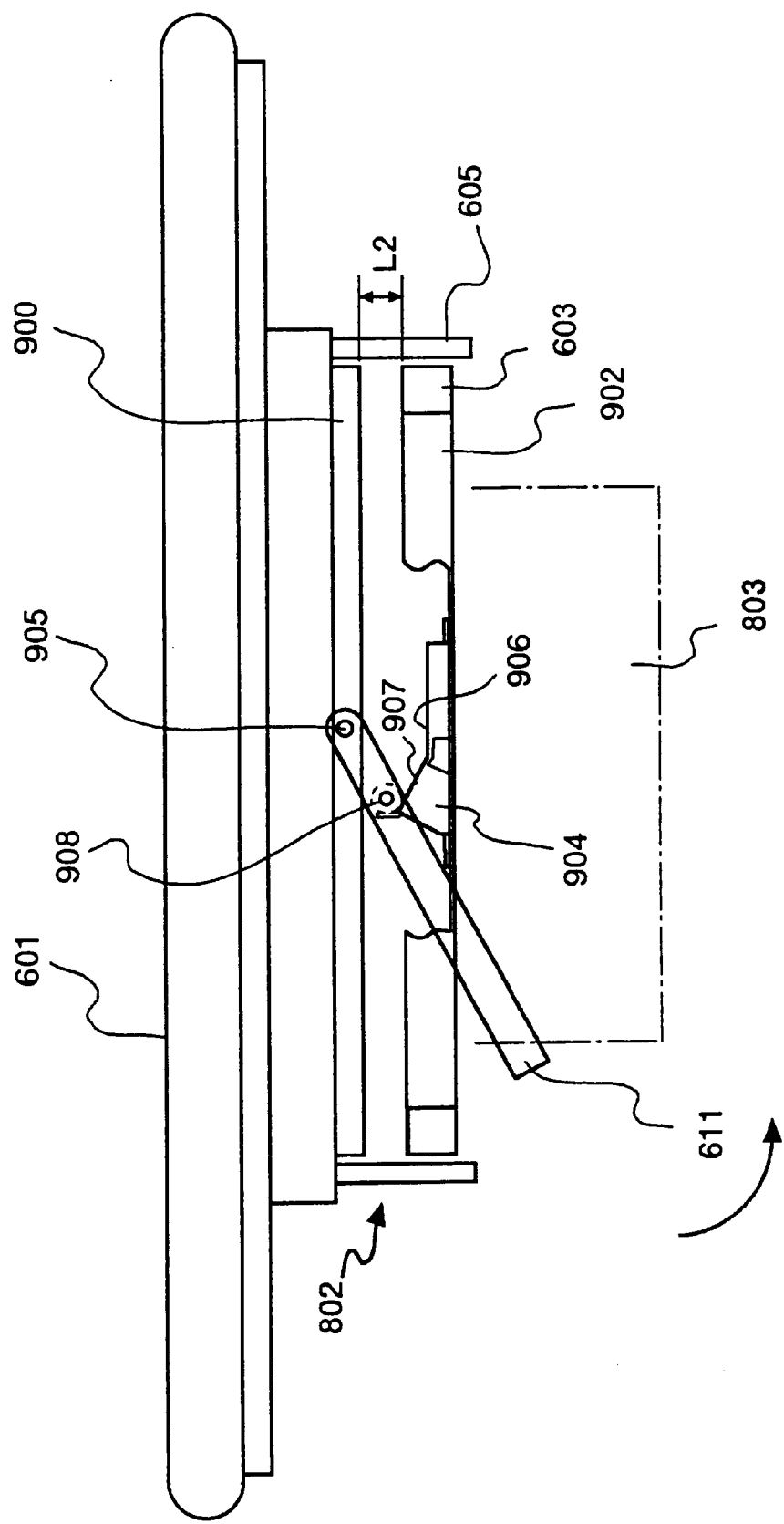
FIG. 33 shows the configuration of the angle adjusting mechanism section according to Embodiment 3 of the present invention viewed from the upper side of the frame unit (angle of the board section is zero degree)
Figure 34:
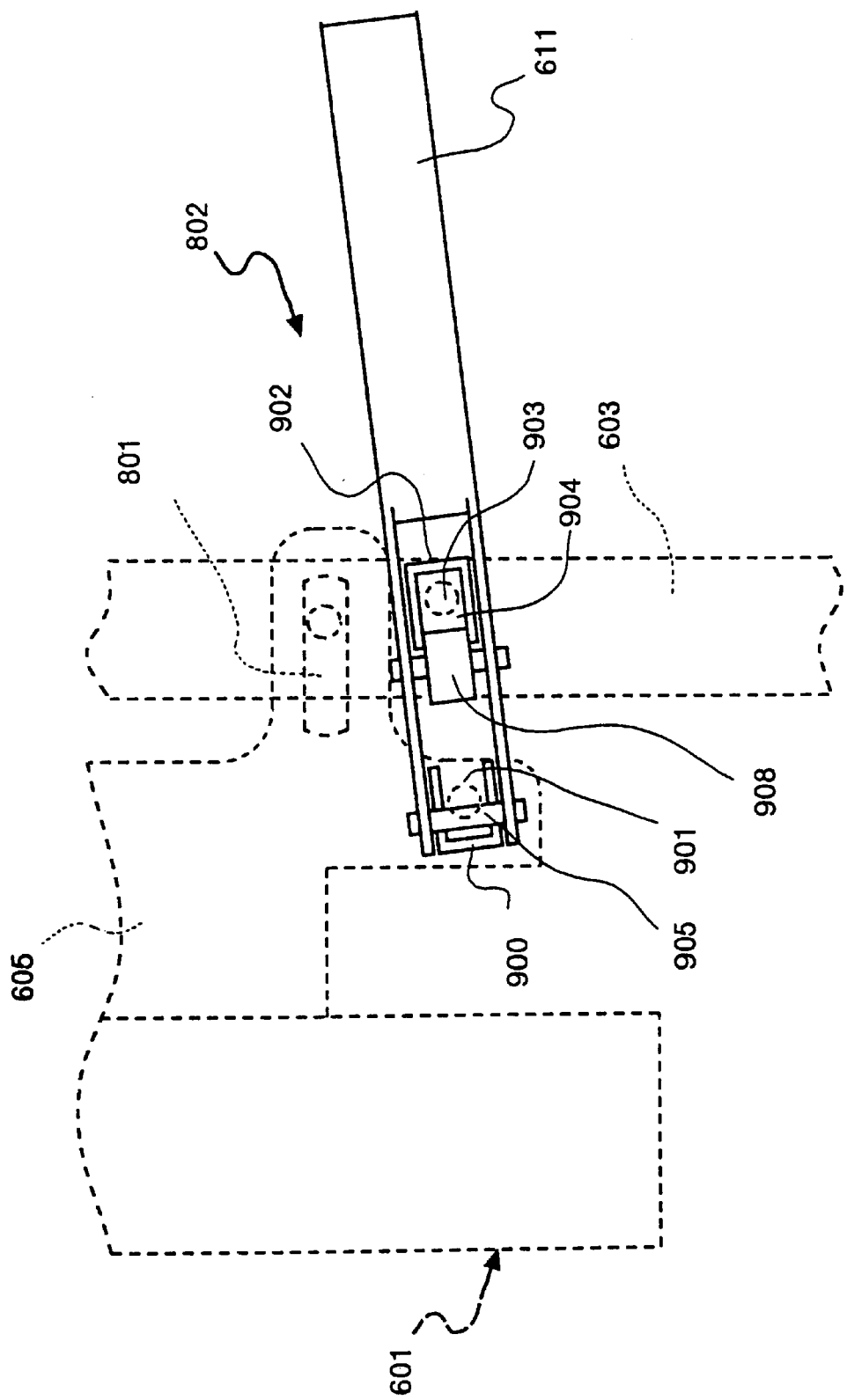
FIG. 34 shows the configuration of the angle adjusting mechanism section according to Embodiment 3 of the present invention viewed from the side of the frame unit.

FIG. 32 and FIG. 33 show configuration of the angle adjusting mechanism section 802 viewed from the upper side thereof. FIG. 32 shows the board section 601 positioned at an angle of five degrees and FIG. 33 shows the board section 601 positioned at an angle of zero degree. Furthermore, FIG. 34 is a view showing configuration of the angle adjusting mechanism section 802 shown in FIG. 32 and FIG. 33 viewed from the side thereof. FIG. 34 corresponds to the board section 601 shown in FIG. 33 positioned at an angle of zero degree.

In FIG. 32 to FIG. 34, the reference numeral 900 indicates a PDP angle pivotally mounted between the stays 605 with a PDP supporting point 901. The reference numeral 902 indicates a stand stay pivotally mounted between the stands 603 with a stand supporting point 903 and with a lever bearer 904 used for angle adjustment of the board section 601 together with the angle adjusting lever 611 mounted thereon.

The angle adjusting lever 611 has such a shape that it can sandwichably hold the PDP angle 900 and the stand stay 902 therebetween and is pivotally mounted on a lever supporting point 905 in the side of the PDP angle 900. In addition, provided in the angle adjusting lever 611 is a bearing 908 contacting a flat section 906 as well as a slant section 907 of the lever bearer 904 mounted on the stand stay 902 for rotating in association with pivot of the angle adjusting lever 611.

Herein, it is assumed that the angle adjusting mechanism section 802 is in a state shown in FIG. 32 and the board section 601 is positioned at an angle of five degrees. When a user operates the angle adjusting lever 611 to the left direction (to the direction indicated by the arrow in the FIG. 32), the angle adjusting lever 611 pivots around the lever supporting point 905, the bearing 908 of the angle adjusting lever 611 moves along the flat section 906 of the lever bearer 904 in association with the pivot and also moves upward along the slope of the slant section 907, and as a result, a force that pushes the PDP angle 900 forward is generated. Namely, the lever bearer 904 is fixed to the stand 603 through the stand stay 902, and the PDP angle 900 is mounted on the stays 605 pivotally supporting the board section 601 at the pivotal supporting points 800 and the pivot guides 801, therefore, the board section 601 can pivot together with the PDP angle 900 (the lower edge of the board section 601 can be pushed forward) by operating the angle adjusting lever 611.

Through this operation of the angle adjusting lever 611, the angle adjusting mechanism section 802 is changed from the state shown in FIG. 32 to that shown in FIG. 33, and the angle of the board section 601 can be changed from five degrees to zero degree. Namely, as shown in FIG. 32 and FIG. 33, by increasing the distance between the PDP angle 900 and the stand stay 902 from L1 to L2, the angle of the board section 601 can be changed from five degrees to zero degree.

Similarly, when a user operates the angle adjusting lever 611 from the state shown in FIG. 33 to the right direction (to the direction indicated by the arrow in the FIG. 33), the angle of the board section 601 can be changed from zero degree to five degrees.

It should be noted that the angle of the angle adjusting lever 611 shown in FIG. 34 is changed in association with changing of the angle of the board section 601 although it is not shown in the figure. However, each of the PDP angle 900 and the stand stay 902 is pivotally fixed, therefore, both of these sections are not affected even by a change in the angle of the board section 601.

Figure 35:
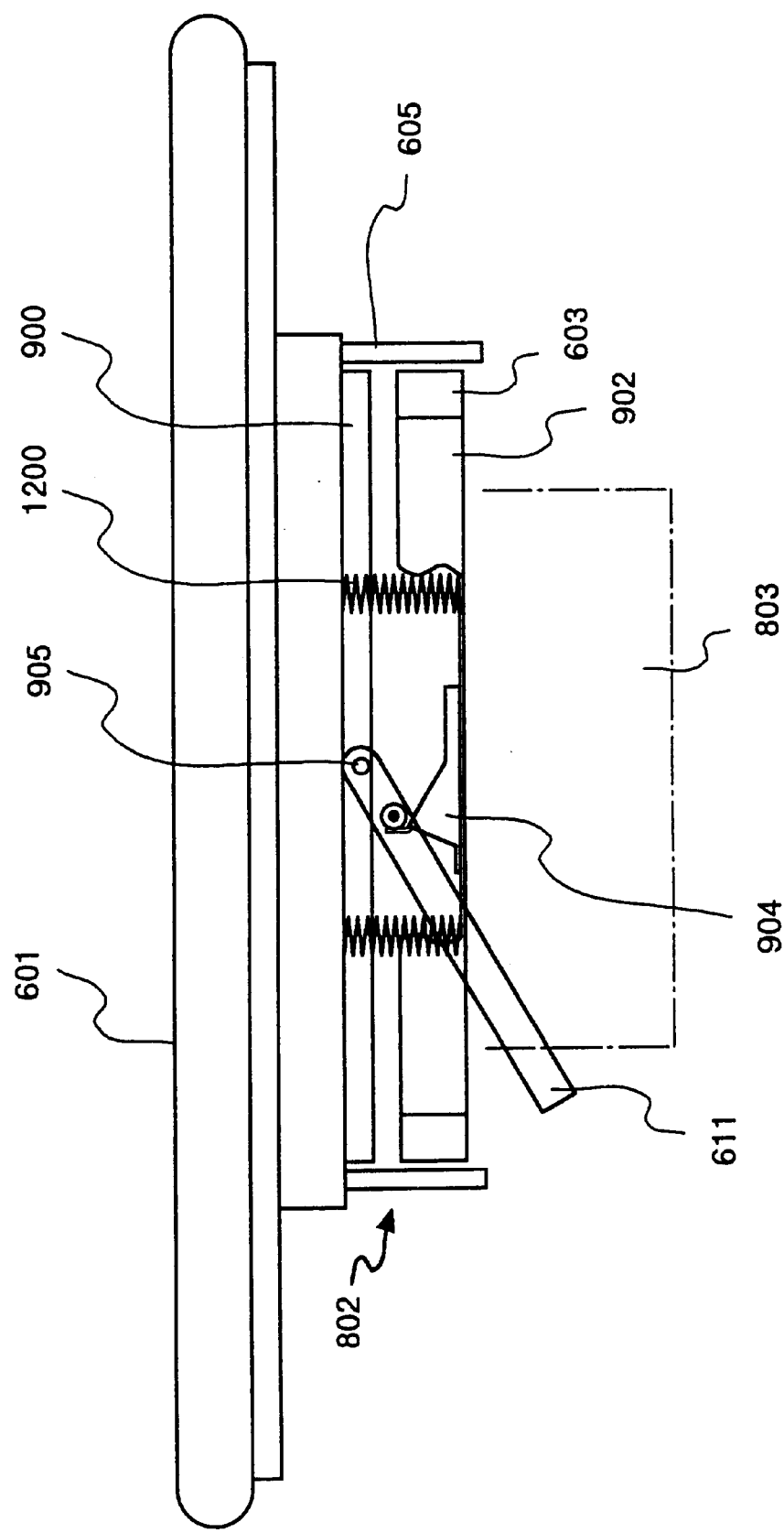
FIG. 35 shows a modification of the angle adjusting mechanism section according to Embodiment 3 of the present invention.

As shown in FIG. 35, by providing one or a plurality of springs 1200 between the PDP angle 900 and stand stay 902, operability of the angle adjusting lever 611 can be enhanced. This configuration is obtained based on the consideration that the operation of the angle adjusting lever 611 may be heavy depending on the weight of the board section 901 and the length of the angle adjusting lever 611. Therefore, number of springs 1200 and their force are adjusted according to the weight of the board section 601, which allows operability to be further enhanced.

Also the lever bearer 904 is fixed to the stand stay 902 with, for instance, a screw, and a hole (not shown) on the stand stay 902 into which the screw is put is preferably a rectangular hole. As a result, a fixing position of the lever bearer 904 can be changed to meet the user's need, therefore, the adjustable range of the angle of the board section 601 can be changed.

Figure 36:
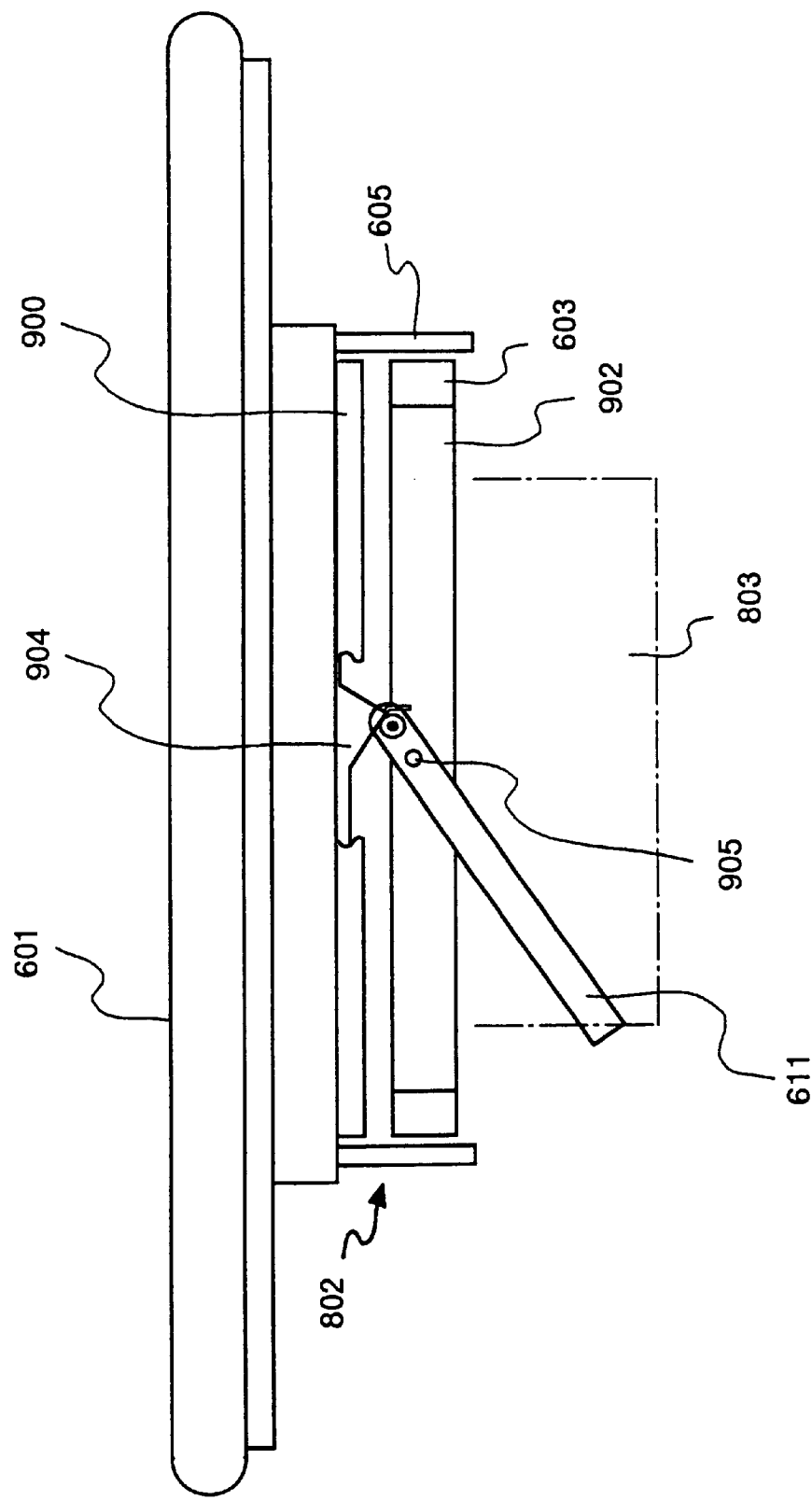
FIG. 36 shows another modification of the angle adjusting mechanism section according to Embodiment 3 of the present invention.

Furthermore, even when the lever bearer 904 is provided on the PDP stay 900 as shown in FIG. 36 with the lever supporting point 905 provided on the stand stay 902 and the configuration is reverse to that of the angle adjusting mechanism section 802 shown in FIG. 32 to FIG. 35, the angle of the board section 601 can also be adjusted.

The configuration of the angle adjusting mechanism section 802 described above is only one of the examples, and it is clear that various designs and modifications are possible. For example, a component member of the angle adjusting lever 611 may be provided in the upper side of the board section 601 and the pivotal supporting point 800 and the pivot guide 801 may be reversibly positioned.

As described above, by providing an angle adjusting mechanism section 802 for adjusting an angle of the board section 601 in the frame unit 600, incoming interference light into the PDP 101, especially, light from lighting equipment such as a fluorescent tube provided on the ceiling can be avoided. Therefore, an image on the screen can easily be seen and convenience of the display board system 100 can be improved.

2. Operation

Next, description is made for an operation of the display board system 100 having the same configuration as described above in the order of:

(1)　　　Outline,
(2)　　　Case of using the system as a display board,

-continued

| | |
|---|---|
| (3) | Case of using the system as a computer, |
| (4) | Adjustment of a coordinate-position input device, |
| (5) | Use of AV equipment, and |
| (6) | Connection to a network. |

(1) Outline

The display board system 100 according to Embodiment 3 can be considered as a communication tool applicable to a conference, a meeting or similar occasions by merging the PDP 101 having a large-sized screen with the coordinate-position input device 102, and enabling free writing onto a large-sized screen such as a projector with a fingertip or a pen and clear view of computer data thereon.

More specifically, when a user writes characters and draws graphics on the touch surface 201 of the coordinate-position input device 102 with a user's fingertip or a pen, the characters and graphics can be displayed on the PDP 101 as they are. Furthermore, a screen of word processor or spreadsheet program may be captured, and it is possible to write characters and graphics onto the captured screen and underline a part of the written data on the screen with a pen tool.

In the system, a screen displayed on the PDP 101 is set to one page, and written information is managed as page units, therefore editing processing such as displaying a list of whole pages, sorting the pages, adding pages thereto, and deleting pages therefrom can be performed. Each created page can be saved as a file, and used by calling it any number of times when a conference on the same subject is held several times. The called file can be processed, and the called file can be reused for preparing a new material.

A file prepared using a presentation software on other computer may be read in through the network 107, and a presentation can also be performed using the read-in file. As presentation can be performed using data in a file, an OHP film required for presentation using a projector is not needed. As described above, during the presentation, marking can be made onto certain data using the coordinate-position input device 102 on the screen on which any file prepared with the presentation software is open, therefore more effective presentation can be carried out.

Furthermore, the system is applicable as an ordinary computer, and can also be utilized for an educational activity on a computer operating method or the like using the large-sized PDP 101.

(2) Case of Using the System as a Display Board

Description is made hereinafter for the case of using the display board system 100 as a display board in the order of:

| | |
|---|---|
| 1) | Display board software, |
| 2) | Write-in of freehand characters and graphics, |
| 3) | Deletion of freehand characters and graphics, |
| 4) | Drawing of graphics, |
| 5) | Creation of a new page, |
| 6) | Operation for opening a previously prepared file, |
| 7) | Operation for capturing a screen of word processor, a spreadsheet program, or presentation software, |
| 8) | Operation for displaying pages in creation in a list form, |
| 9) | Operation for saving created pages, |
| 10) | Printing, and |
| 11) | Other. |

1) Display Board Software

The display board system 100 can be operated as a display board by executing the display board software 506 shown in FIG. 28 using the CPU 500. This display board software 506 is one of the application programs operating under the control by the OS 505 in the same manner as the various types of application program 508 such as the word processor and the spreadsheet program or the like. In Embodiment 3, it is preferable from the viewpoint of workability to set the sequence of execution of the program such that, in response to turning ON the main power switch 619 of the system shown in FIG. 30, the OS 505 is started and then the display board software 506 is immediately started. However, the next sequence may be allowable in which a desktop screen provided by the OS 505 is displayed on starting the system, one of the icons appearing on the desktop screen is selected, and the display board software 506 is started.

Figure 37:
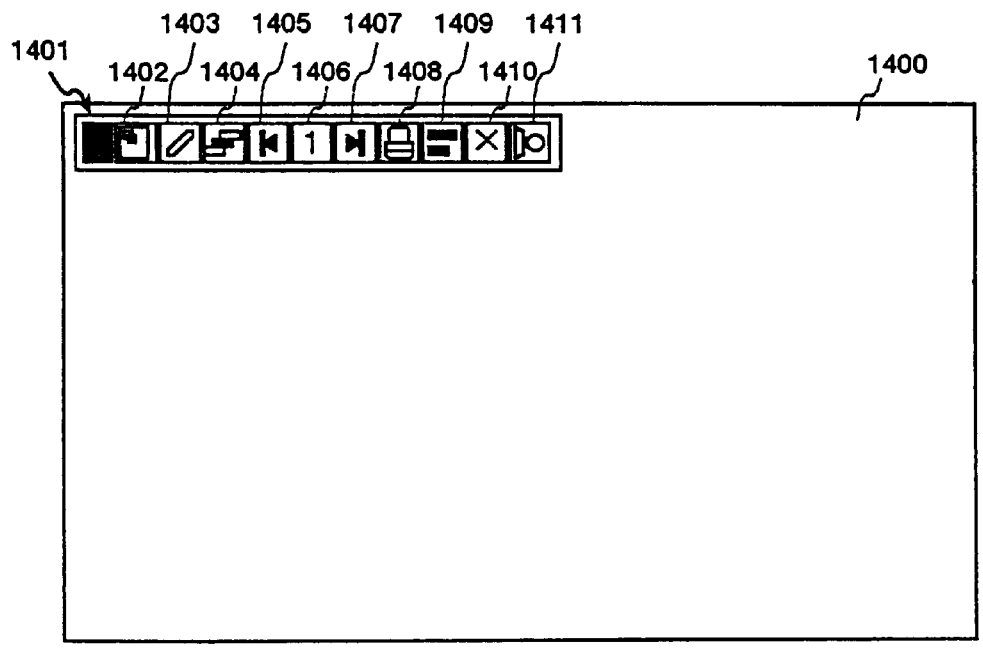
FIG. 37 shows an example of the screen of the display board and a toolbar displayed on the PDP in the display board system according to Embodiment 3 of the present invention.

When the display board software 506 is started, a display board screen 1400 as shown in FIG. 37 appears on the PDP 101. This display board screen 1400 corresponds to, for instance, a writing surface of a whiteboard. When a user draws characters and graphics with his or her fingertip or a pen on the touch surface 201 of the coordinate-position input device 102 positioned in the front side of the PDP 101 that displays this display board screen 1400, the characters and graphics created by the user on the touch surface 201 appear on the display board screen 1400 of the PDP 101 through the coordinate-position input device 102, controller 103, and computer 104 as they are as if the characters and graphics were created on a whiteboard with a pen.

The display board software 506 is designed so as to manage information in units of pages, and the display board screen 1400 corresponds to an information writing area of one page managed by the display board software 506. A user can create a plurality of pages by operating the display board software 506, and an arbitrary page of the pages can be displayed as the display board screen 1400.

Furthermore, the display board software 506 displays a toolbar 1401 including a plurality of buttons corresponding to various operations on the display board screen 1400 as shown in FIG. 37. Description is made herein for an outline of functions assigned to the buttons in the toolbar 1401. It should be noted that, in addition to the toolbar 1401, an extension toolbar (Refer to FIG. 38) and a graphics drawing toolbar (Refer to FIG. 39) are prepared in the toolbar appearing on the display board screen 1400 as described later.

With the computer screen button 1402 a display on the PDP 101 can be switched to a screen for a computer (a desktop screen or a screen for other application program).

With the pen button 1403 characters and lines can be drawn freehand on the PDP 101 (use of a pen tool is specified).

With the eraser button 1404 characters and lines drawn freehand can be deleted.

With the previous page button 1405 a previous page can be displayed.

In the page number window 1406 a page number of a page currently displayed as a display board screen 1400 is displayed.

With the next page button 1407 a next page can be displayed.

With the print button 1408 a page or pages in creation can be printed.

With the thumbnail button 1409 pages constituting a file in preparation can be displayed in a list form.

With the end button 1410 the display board software 506 can be terminated.

Figure 38:
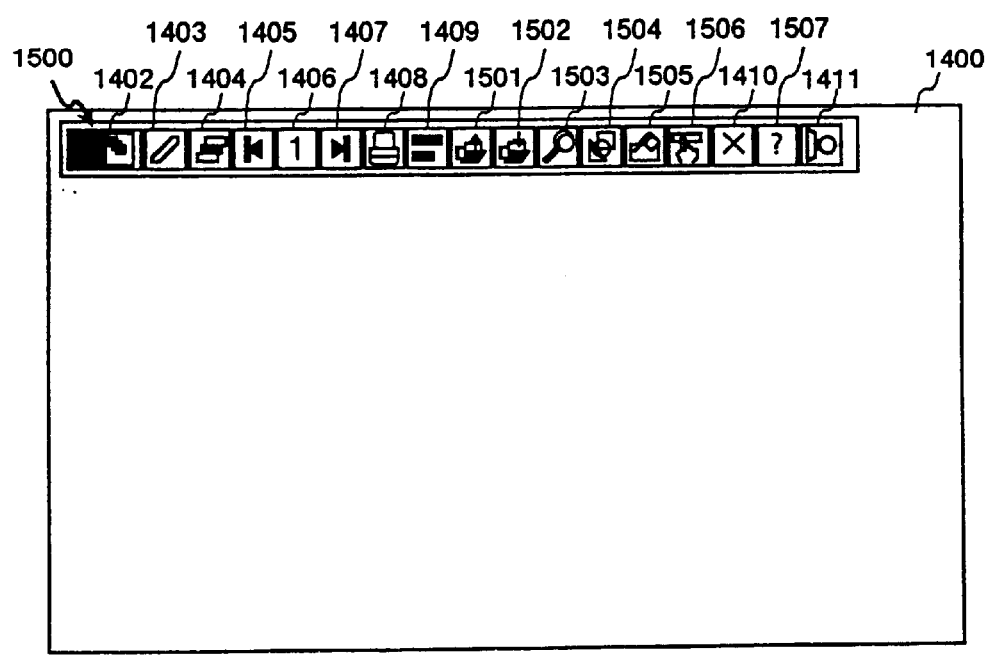
FIG. 38 shows an example of an extension toolbar displayed on the PDP in the display board system according to Embodiment 3 of the present invention.

With the extension button 1411 the extension toolbar 1500 shown in FIG. 38 can be displayed. When the extension button 1411 in the extension toolbar 1500 is touched, the extension toolbar is returned to the toolbar 1401 shown in FIG. 37.

The functions assigned to the buttons in the extension toolbar 1500 that is displayed when the extension button 1411 is touched will be described with reference to FIG. 38. It should be noted that, the same reference numerals are assigned to the buttons corresponding to those in the toolbar 1401 shown in FIG. 37 and description thereof is omitted herein.

With the file button 1501 a new page or a previously prepared file can be opened.

With the save button 1502 a file under preparation can be saved.

With the display button 1503 switching to any of thumbnail display, full display, or to window display, and zoom (enlarged) display can be set.

Figure 39:
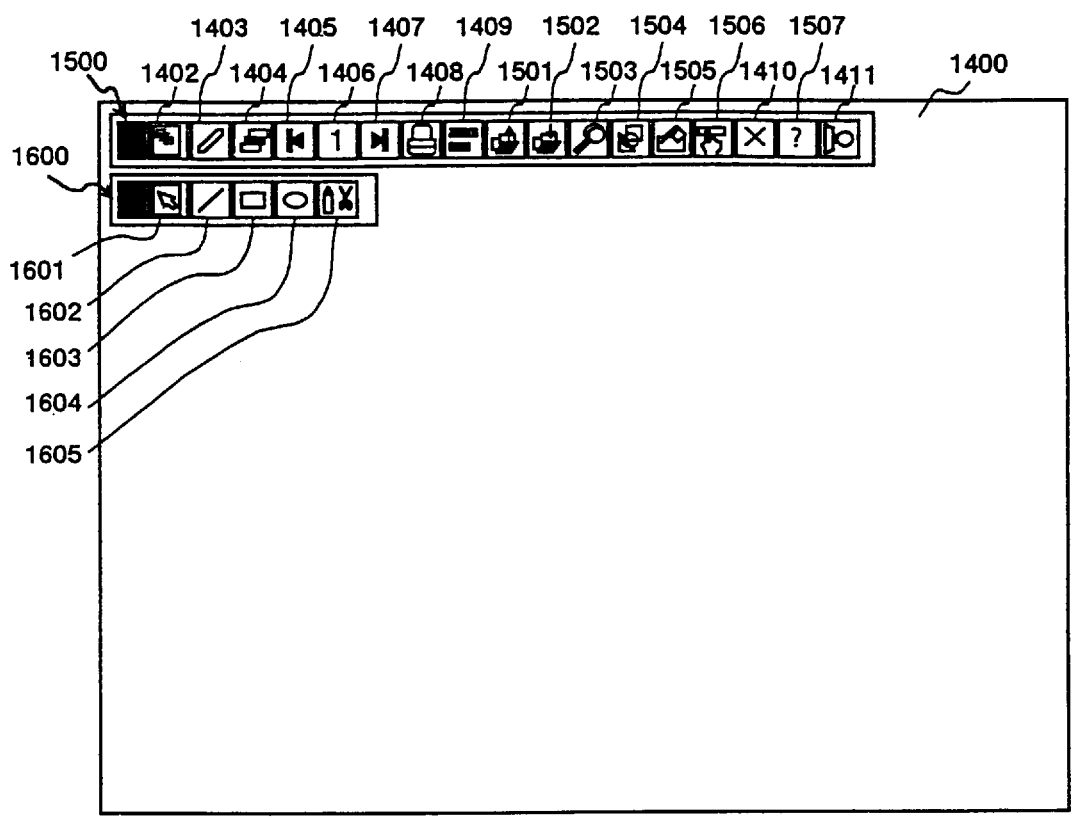
FIG. 39 shows an example of a drawing toolbar together with the extension toolbar displayed on the PDP in the display board system according to Embodiment 3 of the present invention.

With the graphics drawing button 1504 the graphics drawing toolbar 1600 shown in FIG. 39 is displayed, and lines, rectangles, ellipses can be created (Use of Graphics drawing tool is specified). Each button in the graphics drawing toolbar 1600 is described later.

With the background setting button 1505 a background color of the display board screen 1400 displayed on the PDP 101 can be set.

With the option button 1506 display of the display board software 506 when power is ON and processing is ended and insertion of a page when other screen is captured can be set, which is described later. Furthermore, change of work folders can be set.

With-the help button 1507 a help screen with operations and instruction of functions described thereon can be displayed.

Furthermore, functions assigned to buttons in the graphics drawing toolbar 1600 displayed when the graphics drawing Button 1504 is touched will be described with reference to FIG. 39.

With the select button 1601 when created graphics is to be edited, that graphics to be edited can be selected.

With the line button 1602 a line can be drawn.

With the rectangle button 1603 a rectangle can be drawn.

With the ellipse button 1604 an ellipse can be drawn.

With the edit button 1605 created graphics can be edited.

It should be noted that, in the display board software 506, it can be found which of the buttons a user has touched according to positional information for coordinates inputted from the controller 103.

Also the user may touch a specified position of each of the toolbars shown in FIG. 37 to FIG. 39 with his fingertip and move the fingertip as it is, in order to move the toolbar to a desired place.

Furthermore, the display board screen 1400 shown in FIG. 37 is displayed on the whole display area of the PDP 101 in a display format so-called full screen display. The user touches the display button 1503 in the extension toolbar 1500 and carries out a specified operation, and the display board screen 1400 can be switched to window display. Furthermore, as the display board software 506 is one of the application programs operating on the OS 505, by touching the computer screen button 1402 in the toolbar 1401 (or extension toolbar 1500) as described later, the display of the PDP 101 can easily be switched from the display board screen 1400 to a desktop screen or a display screen of the word processor or the like.

Furthermore, an operation of the coordinate-position input device 102 (a touch to the touch surface 201) may be performed with any tool, in addition to a fingertip and a pen, on condition that it can block a light beam. Therefore, even if expression of, for instance, "touch with a fingertip" is found in the description below, the same operation can be carried out by touching the touch surface with a pen or some other object.

2) Writing of Freehand Characters and Graphics

Description is made for various operations using the display board software 506 one after another. Herein, description is made for a method of writing in characters and drawing a freehand graphics.

Figure 40:
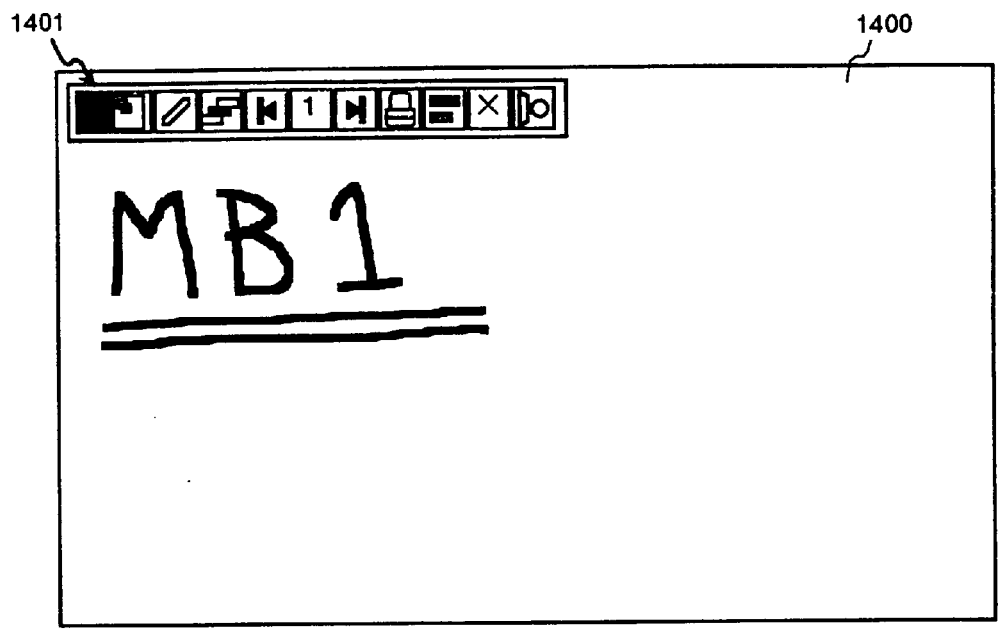
FIG. 40 shows an example of how a result of freehand characters and lines on the touch surface is displayed on the screen of the display board on the PDP in the display board system according to Embodiment 3 of the present invention.

Prepared in the display board software 506 is a pen tool for writing characters and drawing freehand graphics on the display board screen 1400 using a user's fingertip just like a real pen. This pen tool is made available when a user touches the pen button 1403 in the toolbar 1401 (or extension toolbar 1500). The user writes a character or a line with his fingertip on the touch surface 201 as when a character is written freehand on a blackboard or a whiteboard, which makes it possible to display the corresponding character and line on the display board screen 1400. In a case of this pen tool, the user's fingertip works like a real pen, and it is also possible to set characters which can be written with the fingertip, a color of graphics and a thickness of a line. FIG. 40 is an explanatory view showing one example of how a result of writing characters and lines freehand is displayed on the display board screen 1400 on the PDP 101.

Herein, simple description is made for processing of displaying a character on the display board screen 1400 with reference with FIG. 27 and FIG. 28. When the user writes a character with his fingertip on the touch surface 201, the controller 103 obtains positional information for coordinates corresponding to a trail of the fingertip through the coordinate-position input device 102, and the obtained positional information for coordinates is successively inputted into the computer 104. In the computer 104, the display board software 506 and the OS 505 generate drawing information for drawing a line with the preset color and thickness of the line when receiving the positional information for coordinates from the controller 103, and write the generated information in a video memory (not shown) of the graphics board 510 matching a position of corresponding coordinates. The graphics board 510 transmits an image signal to the PDP 101 according to the contents of the video memory, and provides controls for the processing of displaying the same character as that written on the touch surface 201 by the user on the PDP 101.

In simple words, the computer 104 recognizes the coordinate-position input device 102 and the controller 103 as a pointing device such as a mouse, therefore, the same processing as that when a character is written with a mouse on the drawing software is executed in the computer 104. It should be noted that, the processing is executed in the steps described above also in the processing for deleting a character and creating graphics described below.

3) Deletion of Freehand Drawn Characters and Graphics

Figure 41:
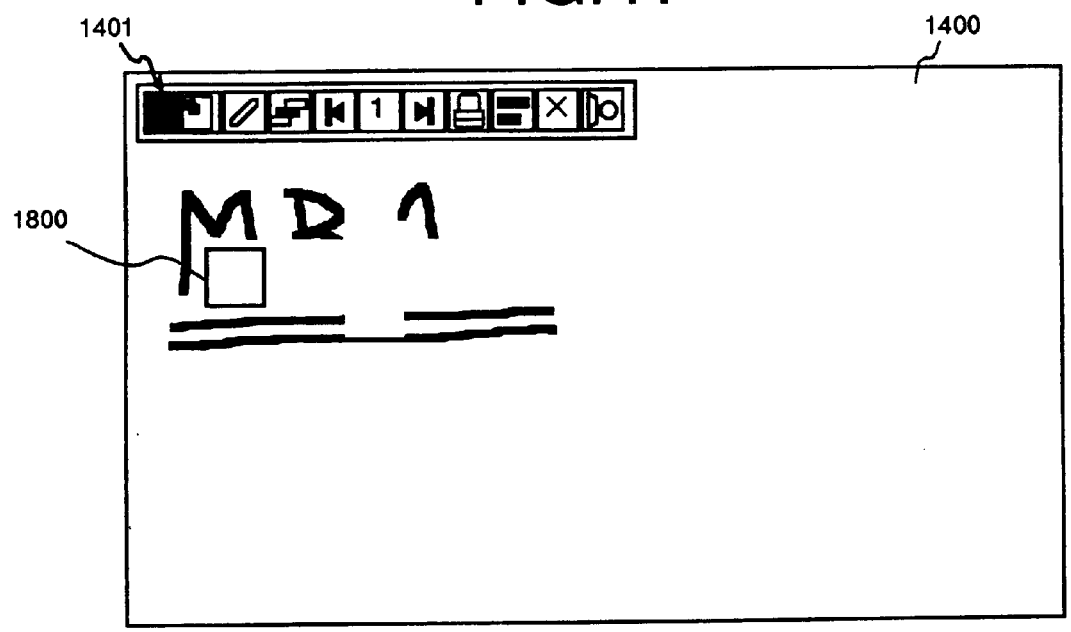
FIG. 41 shows an example of how the freehand characters and lines displayed on the screen of the display board are deleted with an eraser in the display board system according to Embodiment 3 of the present invention.

A user can delete freehand characters written and graphics drawn on the display board screen 1400 by touching the eraser button 1404 like deleting them with an eraser. When the eraser button 1404 is touched, the user's fingertip or a pen can be used like a real eraser, and a size of the eraser, namely an area in which characters and graphics are to be deleted in one operation can freely be set. FIG. 41 is an explanatory view showing how the freehand characters and lines shown in FIG. 40 are deleted with an eraser 1800.

Figure 42:
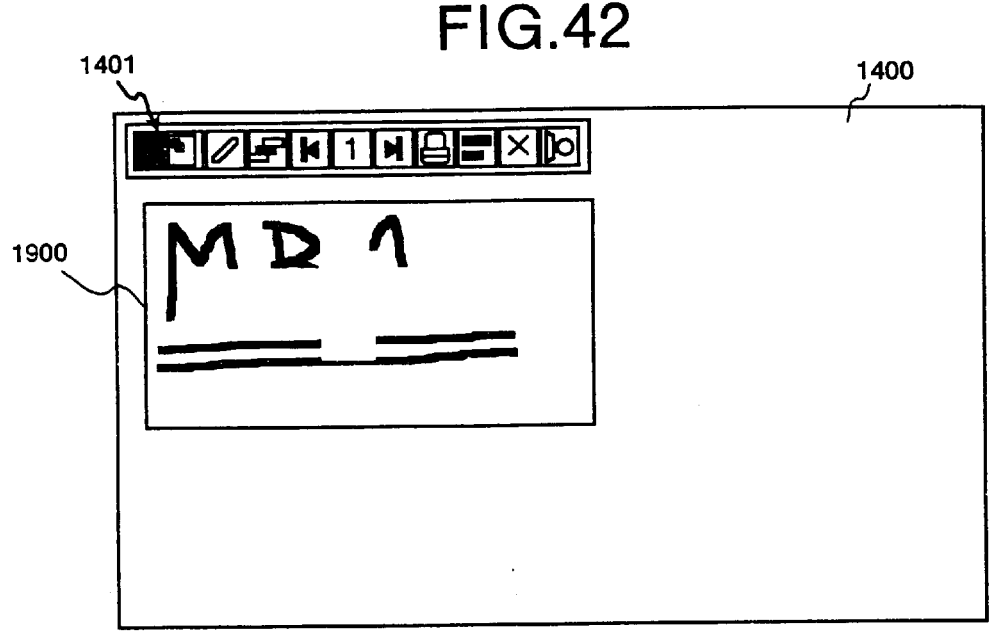
FIG. 42 shows an example of how the freehand characters and lines displayed on the screen of the display board are enclosed with a box and the characters and lines in the box are deleted in one operation in the display board system according to Embodiment 3 of the present invention.

In this mode of deleting freehand characters, as shown in FIG. 42, freehand characters and lines to be deleted may be enclosed within a box 1900 and the characters and lines in the box 1900 may be deleted in one operation (data enclosed and deleted).

4) Drawing of Graphics

In the display board software 506 graphics drawing tools for drawing graphics such as lines, rectangles and ellipses are made available. The graphics drawing tools can be used through the drawing toolbar 1600 shown in FIG. 39. The user touches the extension button 1411 in the toolbar 1400 (Refer to FIG. 37) and gets the extension toolbar 1500 displayed (Refer to FIG. 38), and then touches the graphics drawing button 1504 in the extension toolbar 1500, so that the drawing toolbar 1600 shown in FIG. 39 can be displayed on the display board screen 1400.

① Drawing of a Line

Figure 43:
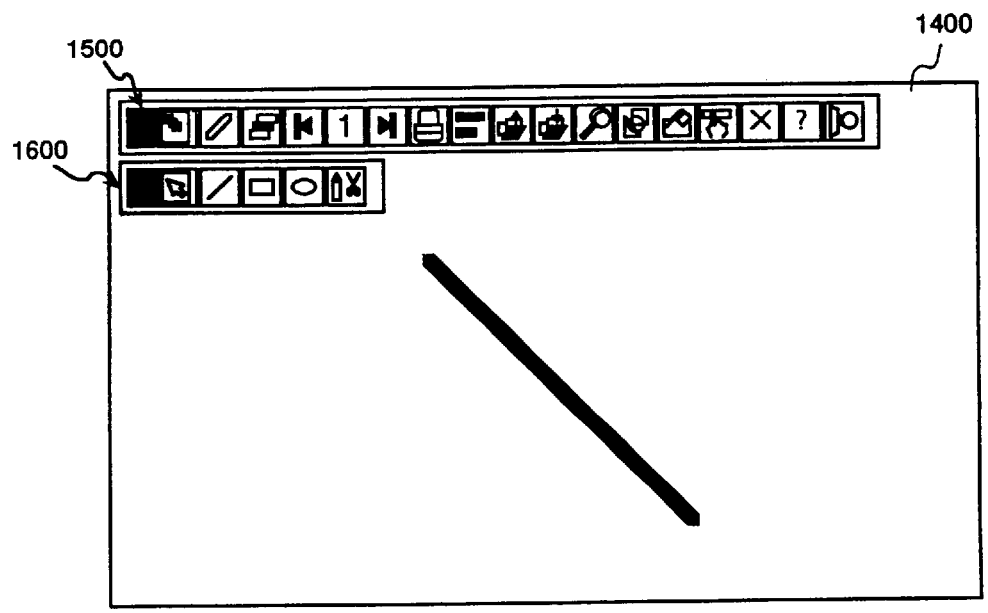
FIG. 43 shows a line drawn on the screen of the display board in the display board system according to Embodiment 3 of the present invention.

When a line is to be drawn, the user may perform operations of touching the line button 1602 in the drawing toolbar 1600 with his or her fingertip, touching an arbitrary place on the touch surface 201 as a starting point of the line with the fingertip, moving the fingertip kept in its state as far as a place which is the end point, and moving the fingertip off the touch surface 201. As a result, as shown in FIG. 43, a line is created on the display board screen 1400.

② Drawing of a Rectangle

Figure 44:
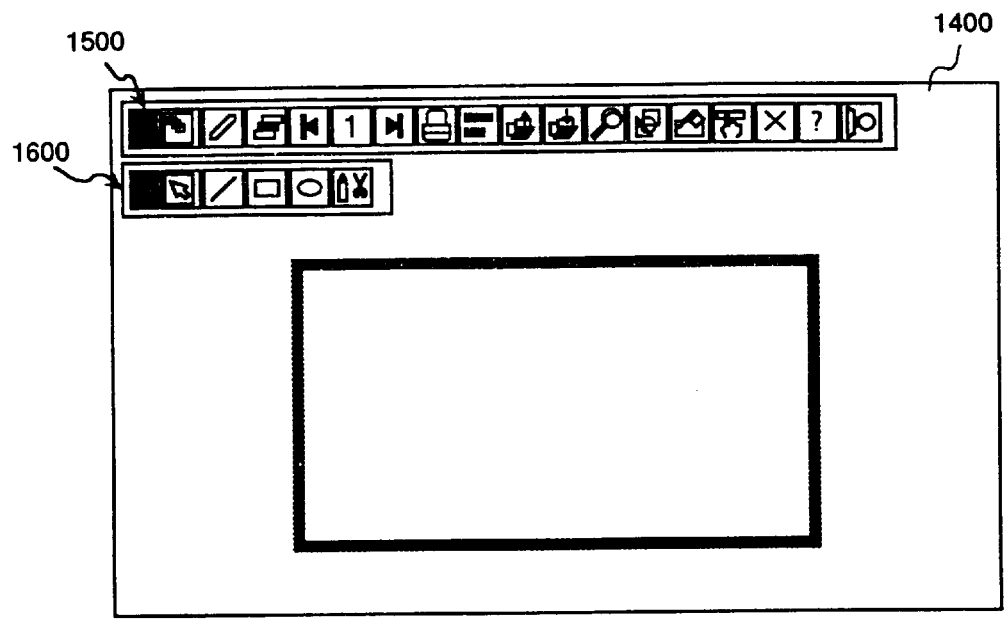
FIG. 44 shows a rectangle drawn on the screen of the display board in the display board system according to Embodiment 3 of the present invention.

When a rectangle is to be created, the user may perform operations of touching the rectangle button 1603 in the drawing toolbar 1600 with his fingertip, touching an arbitrary place on the touch surface 201 with the fingertip, moving the fingertip kept in its state in an arbitrary direction, and moving the fingertip off the touch surface 201. As a result, as shown in FIG. 44, a rectangle is created on the display board screen 1400.

Furthermore, in the display board software 506, a function enabling easy creation of a table using the rectangle created as described above is made available. At first, there is performed setting of touching the background setting button 1505 in the extension toolbar 1500 to display a setting screen (not shown), and displaying a grid on the background of the display board screen 1400. In that case, longitudinal and lateral distance of a grid, and a left-start position and a upper-start position can be specified. In addition, for convenience of use when a table is created with a grid, there is prepared a setting that a created rectangle is displayed so as to match the grid.

Figure 45:
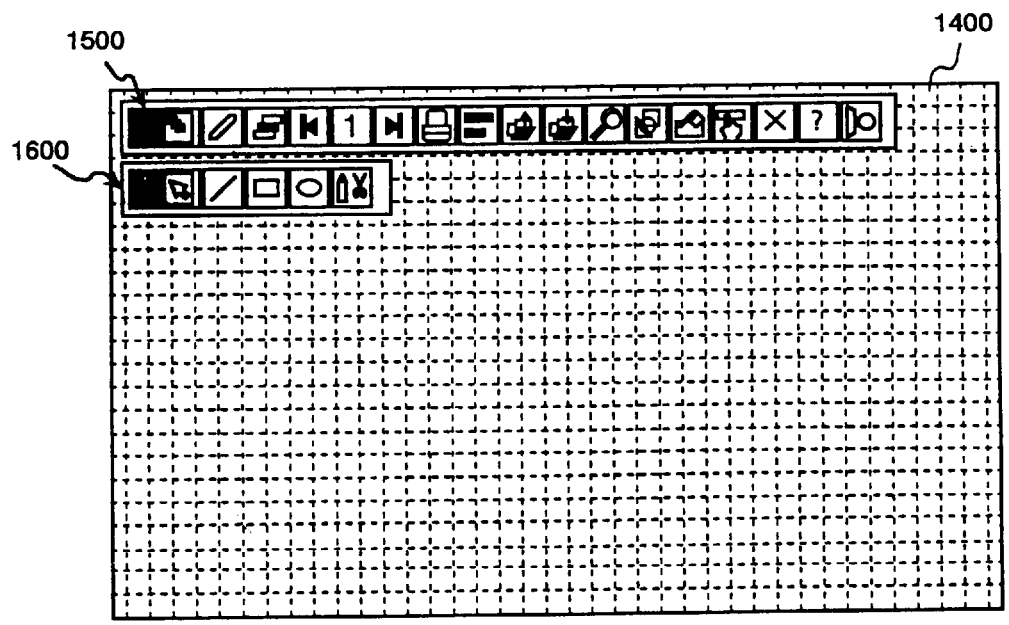
FIG. 45 shows a grid pattern displayed as a background of the screen of the display board in the display board system according to Embodiment 3 of the present invention.
Figure 46:
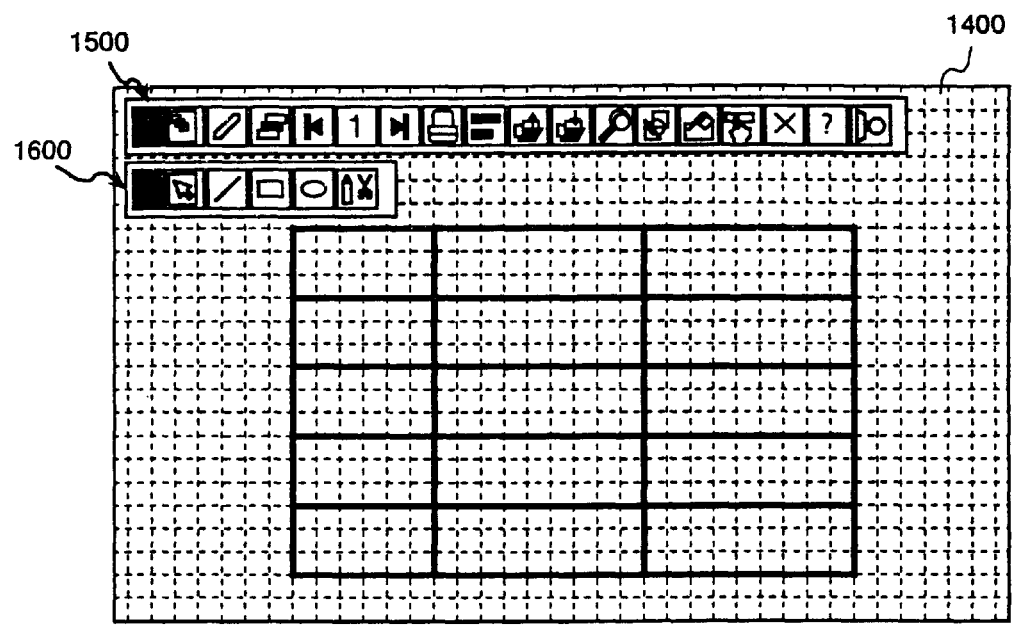
FIG. 46 shows a table created on the screen of the display board in the display board system according to Embodiment 3 of the present invention.

When setting for the grid is ended, the grid appears on the display board screen 1400 as shown in FIG. 45. By repeatedly drawing a rectangle as described above the table as shown in FIG. 46 can be created. It should be noted that, if a setting that a created rectangle is displayed so as to match the grid is executed when a grid is to be set, the display board software 506 executes the processing of drawing rectangles along the grid.

③ Drawing of an Ellipse

Figure 47:
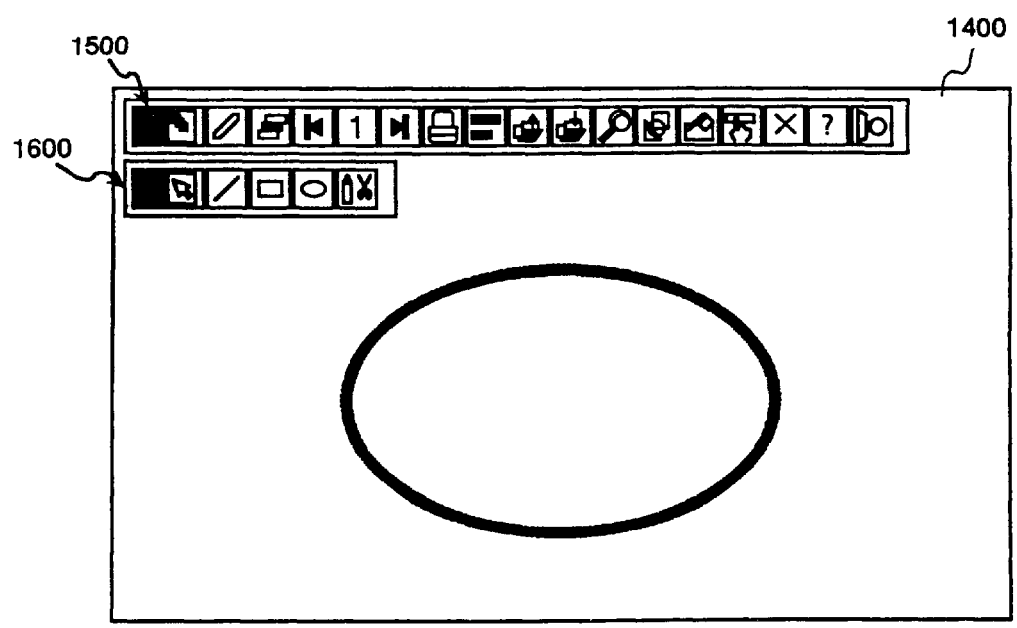
FIG. 47 shows an ellipse created on the screen of the display board in the display board system according to Embodiment 3 of the present invention.

When an ellipse is to be created, the user may perform operations of touching the ellipse button 1604 in the drawing toolbar 1600 with his or her fingertip, touching an arbitrary place on the touch surface 201 with the fingertip, moving the fingertip kept in its state in an arbitrary direction, and moving the fingertip off the touch surface 201. As a result, as shown in FIG. 47, an ellipse is created on the display board screen 1400.

④ Modification of a Created Graphics

Figure 48A:
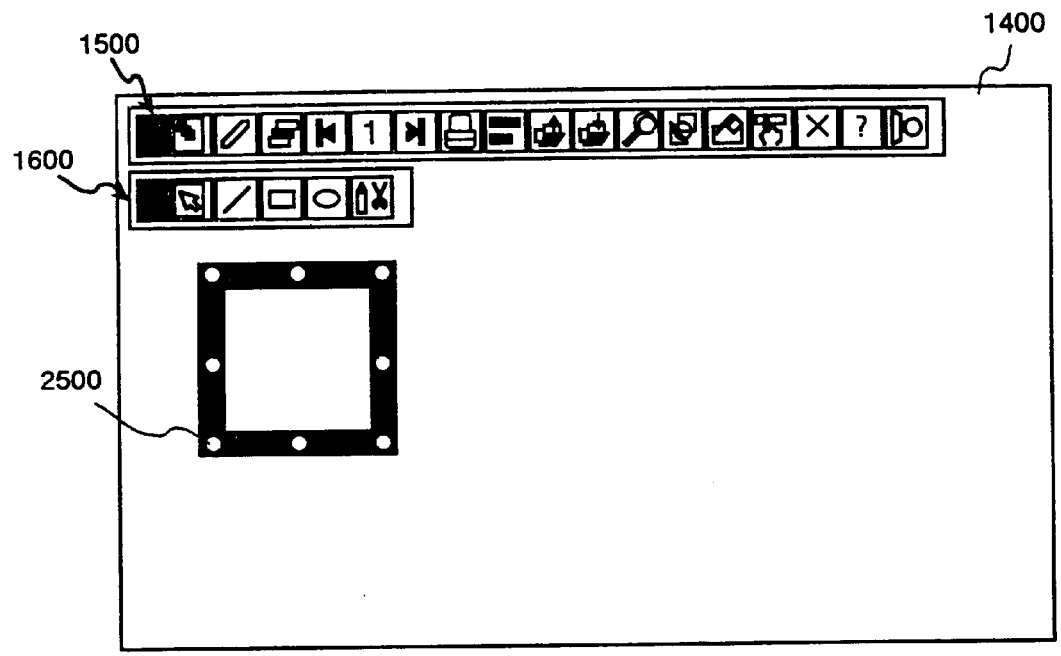
FIG. 48A shows selection of a graphics as an object for modification and FIG. 48B shows the graphics after its modification in the display board system according to Embodiment 3 of the present invention.

When a created graphics is to be modified, the user touches the select button 1601 in the drawing toolbar 1600 with his fingertip, touches any part of a line of the graphics to be modified, and selects the graphics. As a result, as shown in FIG. 48A, a rectangular mark (handle) 2500 surrounding the selected graphics is displayed.

Figure 48B:
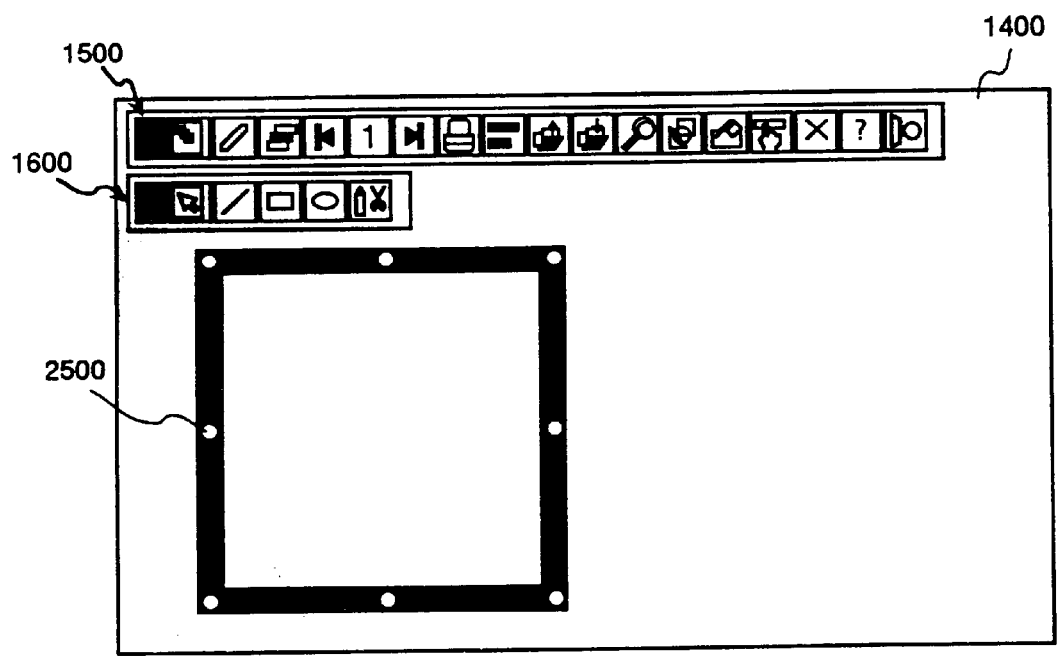

Then, the user touches any part of the handle 2500 with his or her fingertip, and moves the fingertip kept in its state, so that a size and a shape of the graphics can be changed in association with its movement. FIG. 48B shows how the graphics is enlarged by moving the part of the handle 2500 in the right lower side of the handle 2500 shown in FIG. 48A.

⑤ Movement of a Created Graphics

Figure 49A:
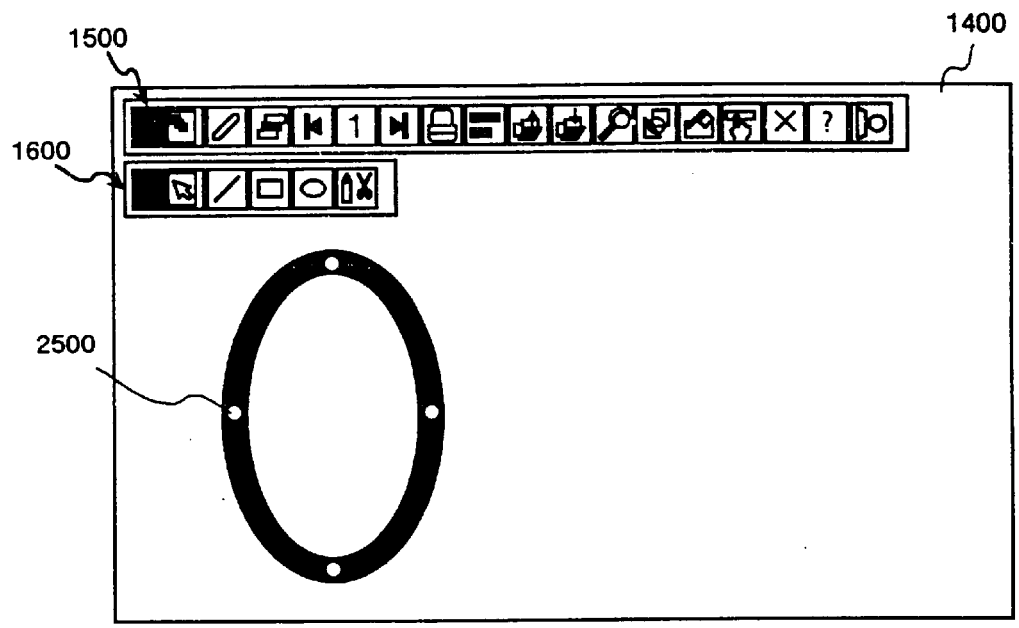
FIG. 49A shows selection of a graphics as an object to be moved.

When an already created graphics is to be moved, the user touches the select button 1601 in the drawing toolbar 1600 with his or her fingertip, touches any part of a line of the graphics to be moved, and selects the graphics. As a result, as shown in FIG. 49A, a handle 2500 surrounding the selected graphics is displayed.

Figure 49B:
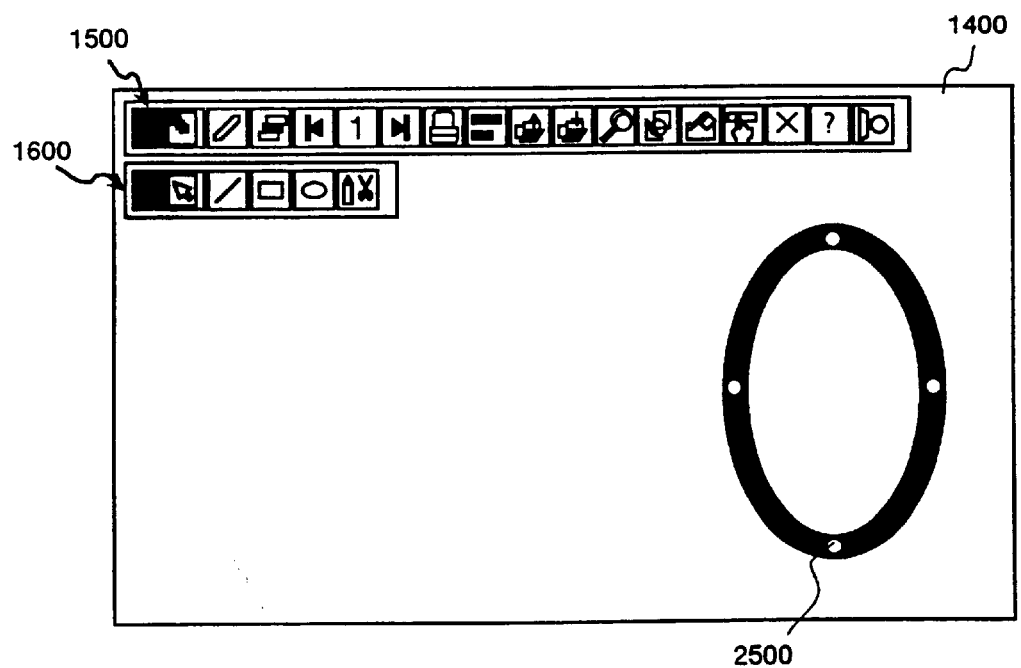
FIG. 49B shows the graphics after its movement in the display board system according to Embodiment 3 of the present invention.

Then, the user touches any part of a line of the graphics with his fingertip, and moves the fingertip kept in its state, so that the graphics can be moved in association with its movement. FIG. 49B shows how the graphics shown in FIG. 49A has been moved in the right direction.

⑥ Edition of a Created Graphics

Figure 50:
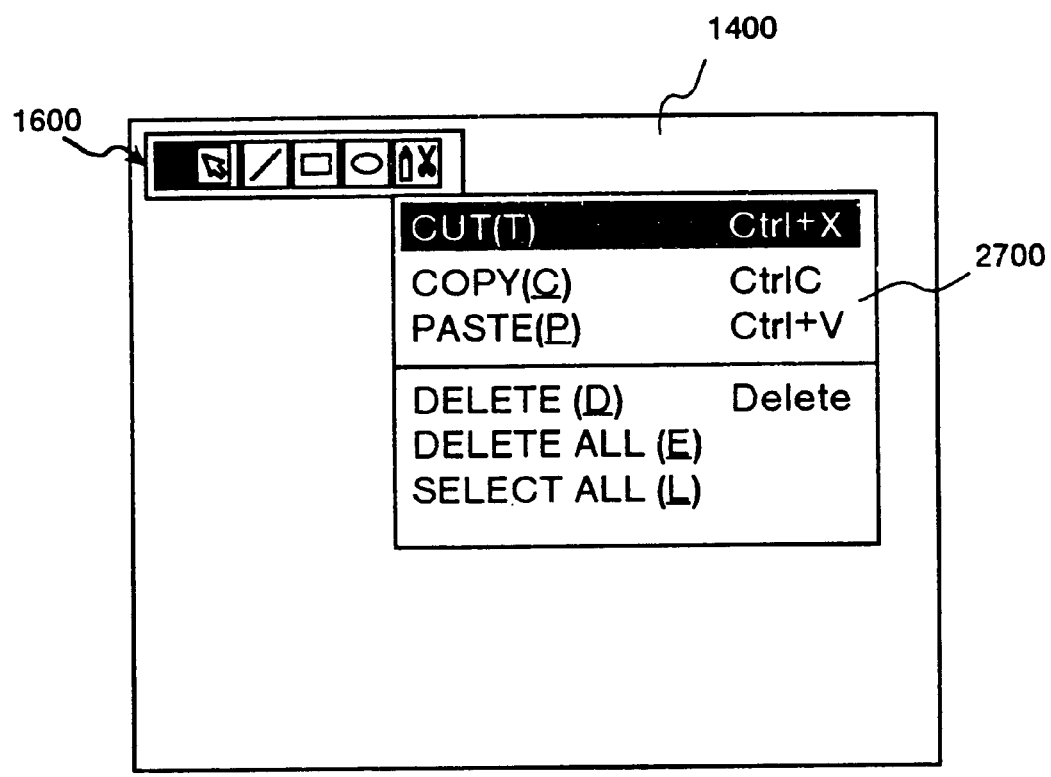
FIG. 50 shows an example of a edit menu displayed when an already created graphics is to be edited in the display board system according to Embodiment 3 of the present invention.

Herein, edition of a created graphics indicates cut or copy of the graphics or the like. At first, when a created graphics is to be cut out and pasted at an arbitrary position, the user touches the select button 1601 in the drawing toolbar 1600 with his or her fingertip, and touches any part of a line of the graphics to be cut out to select the graphics. Then, when the edit button 1605 in the drawing toolbar 1600 is touched with the fingertip, an edit menu 2700 shown in FIG. 50 is displayed on the display board screen 1400. When the user touches "cut" in the edit menu 2700, the selected graphics is cut-out.

In order to paste the cut-out graphics, the edit menu 2700 is displayed again and "paste" is touched, and when an arbitrary place on the display board screen 1400 is touched, the cut-out graphics is pasted at the touched place.

However, when the cut-out graphics is to be pasted not in a currently displayed page but in another page, the user may perform operations of touching the previous page button 1405 or the next page button 1407 in the extension toolbar 1500, displaying a desired page, and pasting the graphics as described above.

When a created graphics is to be copied and pasted in an arbitrary place, the same operation as those in the case of "cut" may be performed except touching "copy" in the edit menu 2700.

Next description is made for a case of deleting a created graphics. As described in the operation for cutting a graphics, a graphics to be deleted is selected and the edit menu 2700 is displayed. When "delete" in the edit menu 2700 is touched, the selected graphics is deleted.

It should be noted that, when a user wants to select all of the created graphics and cut, copy, or delete it, "select all" in the edit menu 2700 is touched, so that all of the created graphics is selected and the operation of cut, copy, or delete can be carried out to all the graphics. It should be noted that, if "select all" is touched, a handle surrounding all the graphics is displayed, and all the graphics can be moved with the fingertip.

5) Creation of a New Page

When a new page other than a page currently displayed as the display board screen 1400 is to be created, the user may touch the next page button 1407 in the toolbar 1401 (or the extension toolbar 1500). When the next page button 1407 is touched, the display board software 506 generates a new page and display it as display board screen 1400.

It should be noted that, if a plurality of pages are currently created, the next page button 1407 is touched to display the final page, and by touching the next page button 1407 again, a new page can be created.

Furthermore, when a previous page is to be opened, the user may touch the previous page button 1405 in the toolbar 1401 (or the extension toolbar 1500). When the previous page button 1405 is touched, the display board software 506 displays a corresponding page as a display board screen 1400.

6) To Open a Previously Prepared File

Figure 51:
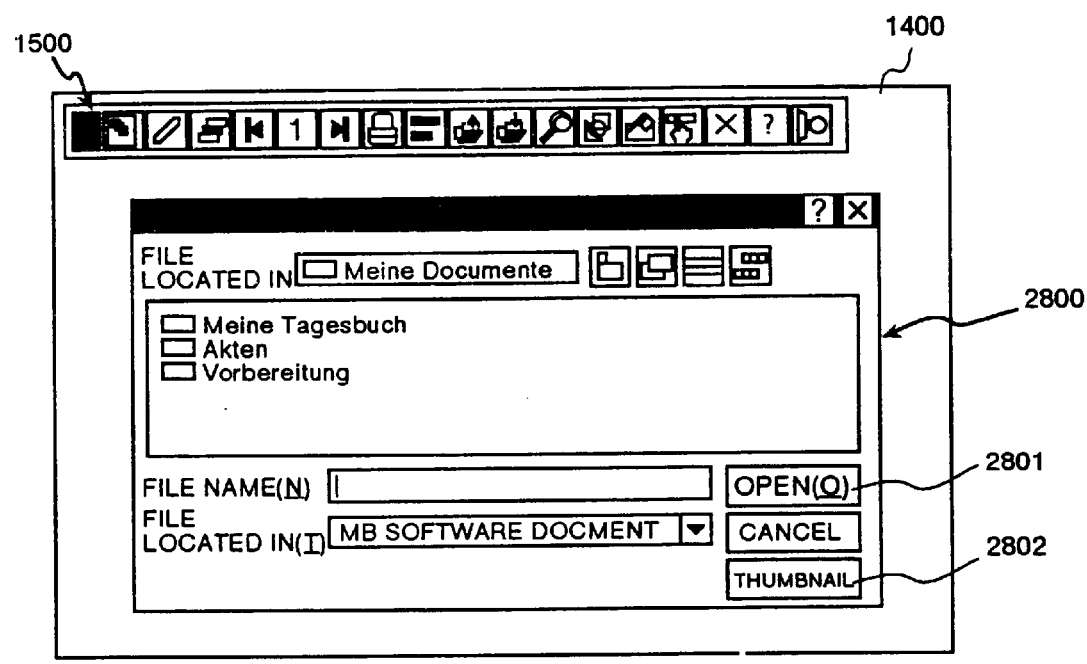
FIG. 51 shows the processing for opening an already generated file in the display board system according to Embodiment 3 of the present invention.

In order to open a previously prepared file, the file button 1501 in the extension toolbar 1500 is touched to display a file menu (not shown), and "open" in the file menu is touched to display a dialog box 2800 shown in FIG. 51. Then, a desired file name is touched for selection, and an "open" button 2801 is touched, so that a page of a corresponding file is displayed as the display board screen 1400. It should be noted that a file can be opened also by touching a file name twice in a row (described "double touch" hereinafter) like so-called "double click".

Figure 52:
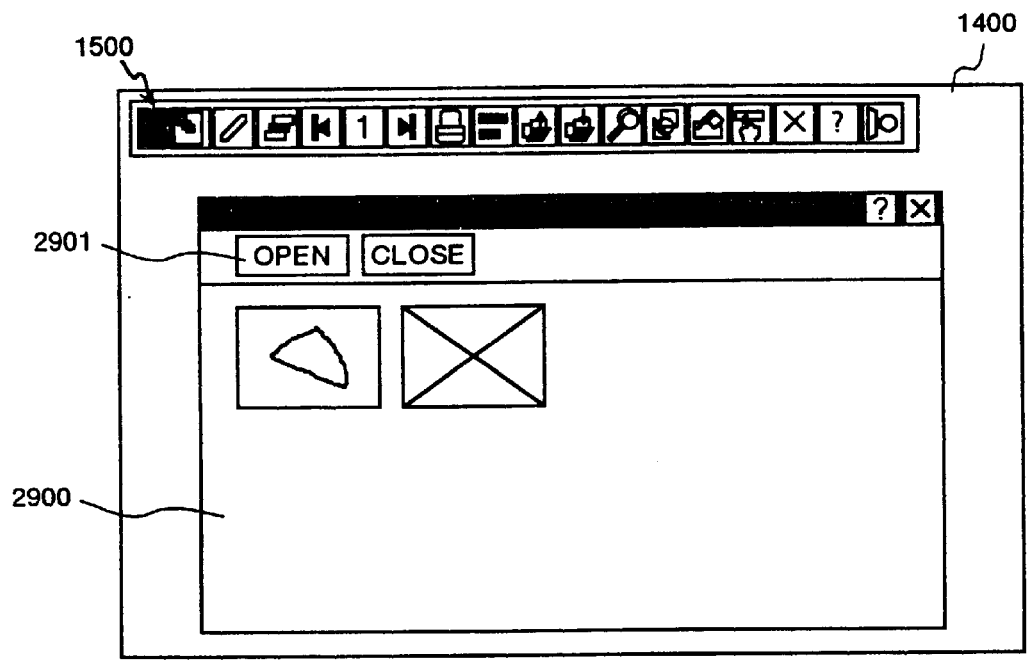
FIG. 52 shows the processing for opening an already generated file using thumbnail images in the display board system according to Embodiment 3 of the present invention.

When the contents of previously prepared file is not clear, operations of displaying a list of the files by using a file thumbnail function, confirming the contents, and opening the target file can be performed. To use the file thumbnail function, a "thumbnail" button 2802 in the dialog box 2800 is touched to display the thumbnail dialog box 2900 as shown in FIG. 52, and a list of the files is displayed in the thumbnail form in the box. Thumbnail images to be displayed here are header pages of the files respectively. Then, a desired thumbnail is touched to be selected, and "open" button 2901 is touched, or the desired thumbnail image is double-touched, so that a page of a corresponding file is displayed as the display board screen 1400.

It should be noted that in order to create a new file, the file button 1501 in the extension toolbar 1500 is touched to display the file menu (not shown), and when "new file" in the file menu is touched, a new page is displayed on the display board screen 1400.

7) Capturing a Screen of a Word Processor, a Spreadsheet Program or a Presentation Software (Capturing Function)

The display board software 506 has a "capture" function for capturing the contents of a file created with the word processor, a spreadsheet program, or presentation software as a background of the display board screen 1400. Description is made hereinafter for the processing of capturing the screen of word processor, spreadsheet program, or presentation software by using this capturing function.

Figure 53:
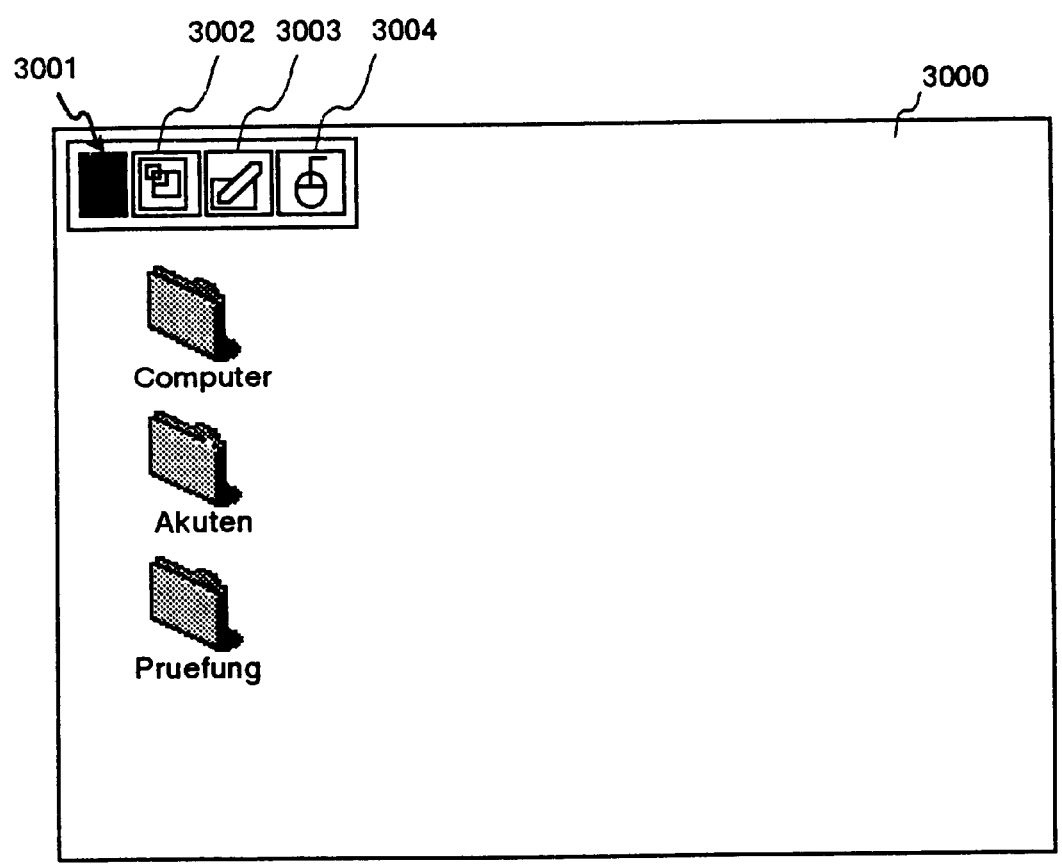
FIG. 53 shows an example of a screen of the computer and a capture toolbar displayed on the PDP in the display board system according to Embodiment 3 of the present invention.

At first, by touching the computer screen button 1402 in the toolbar 1401 (or the extension toolbar 1500) by a user, the display of the PDP 101 is switched from the display board screen 1400 to a computer screen 3000 as shown in FIG. 53. In FIG. 53, the reference numeral 3001 indicates a capture toolbar displayed when the display is switched to the computer screen 3000. Functions allocated to the buttons in the capture toolbar 3001 are as follows.

With the display board screen button 3002 display can be switched from the computer screen 3000 to the display board screen 1400.

With the capture button 3003 a screen displayed on the computer screen 3000 can be captured.

With the mouse button 3004 in an environment where a right button of a two-button type of mouse is usable (e.g., when Windows (trademark) of Microsoft is used as OS), functions assigned to the right button of the mouse become available.

Then, in the computer screen 3000 shown in FIG. 53, the user touches (double touch) an icon of a desired application program or an icon of a desired file to start a corresponding application program, and also touches the capture button 3003 after displaying the target file on the PDP 101. As a result, the display board software 506 captures the currently displayed screen and switches the display on the PDP 101 to the display board screen 1400, as shown in FIG. 54, to display the captured screen as a background of the display board screen 1400.

Figure 55:
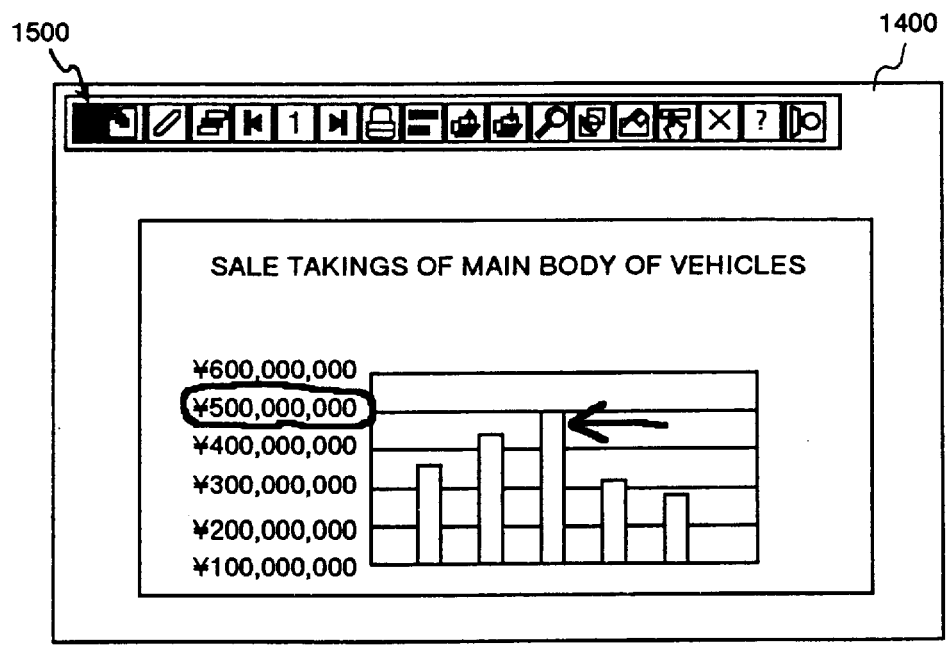
FIG. 55 shows an example of how a screen of a captured application program is displayed as a background of the screen of the display board and how the characters or the like are written on the screen in the display board system according to Embodiment 3 of the present invention.

Then, as shown in FIG. 55, the user can write characters and graphics on the display board screen 1400 utilizing the method as described above. As the screen of word processor, a spreadsheet program, or presentation software or the like can easily be captured as a background of the display board screen 1400 as described above, effective presentation can be carried out by using the display board system 100.

Figure 54:
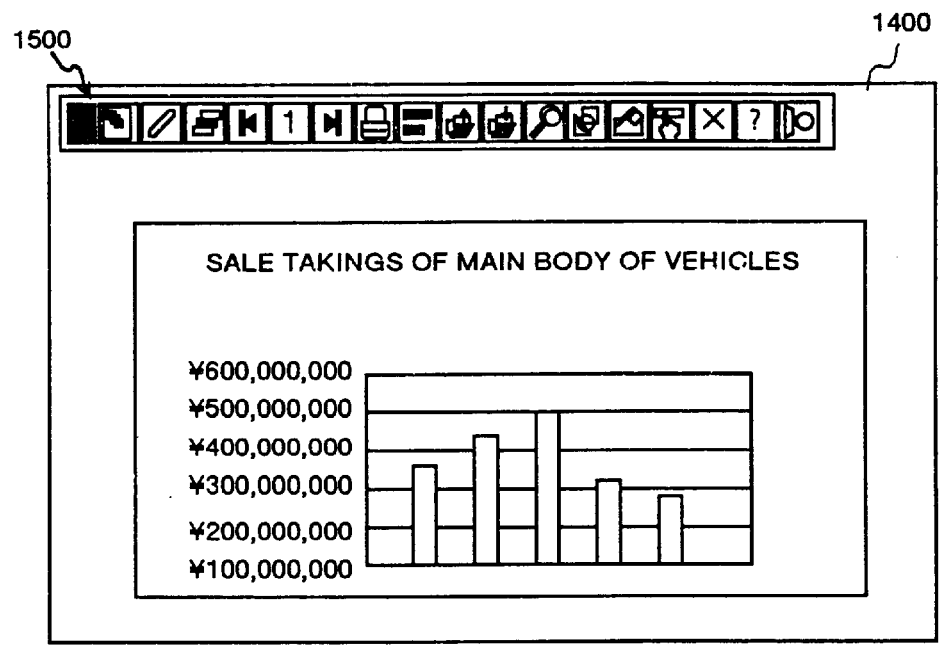
FIG. 54 shows an example of how a screen of a captured application program is displayed as a background of the screen of the display board in the display board system according to Embodiment 3 of the present invention.

Namely, while presentation is being carried out by using presentation software on the display board system 100, if a user wants to write something on the screen to describe it, the current screen is captured as soon as the capture button 3003 is touched to switch to the display board screen 1400 as shown in FIG. 54, and the user can write a desired topic on the screen. Then, when the user wants to return to the presentation software, the screen is switched to the screen of the presentation software (computer screen 3000) in response to touching the computer screen button 1402 by the user. The captured screen with characters or the like written thereon can be saved as described later.

It should be noted that, description has been made here for the method of displaying the computer screen 3000 first, starting the application program, and then capturing a desired screen. However, by directly specifying a file of the word processor or spreadsheet program from the display board software 506, a corresponding application program is started directly from the display board screen 1400 and a specified file can be opened. When the user wants to capture the screen of the application program, the same operations as those described above may be carried out. Furthermore, when other screen of the application program is captured, touching the next page button 1407 allows the screen of the application program to be displayed again on the PDP 101.

8) Operation for Displaying Pages in Creation in a List Form

Figure 56:
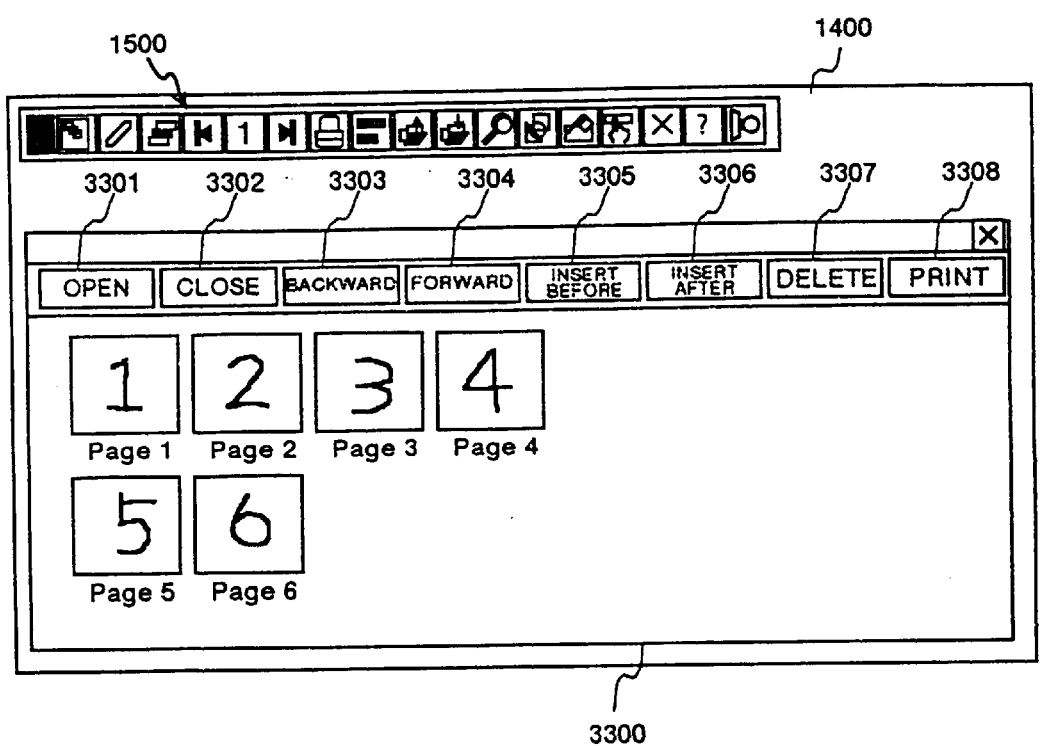
FIG. 56 shows how a thumbnail display dialog box for displaying the pages in creation in a list form is displayed in the display board system according to Embodiment 3 of the present invention.

In the display board software 506, all of the pages in creation can be displayed in a thumbnail form. When the pages are to be displayed in a list form with thumbnails, a user touches the thumbnail button 1409 in the toolbar 1401 (or the extension toolbar 1500). The display board software 506 displays, when the thumbnail button 1409 is touched, a thumbnail display dialog box 3300 for displaying pages in creation in a thumbnail form on the display board screen 1400 as shown in FIG. 56.

In this thumbnail display dialog box 3300 the reference numeral 3301 indicates an open button, 3302 indicates a close button, 3303 indicates a backward button, 3304 indicates a forward button, 3305 indicates an insert before button, 3306 indicates an insert after button, 3307 indicates a delete button, and 3308 indicates a print button respectively.

When the thumbnail display dialog box 3300 is displayed, the user can perform operations described below.

① Operation for Specifying and Opening a Page

A desired thumbnail (page) in the thumbnail display dialog box 3300 is touched and selected, and the open button 3301 is touched in order to display the selected page as the display board screen 1400. Similarly, a desired page may be double-touched in order to display the page as the display board screen 1400.

② Movement of a Page

A page to be moved in the thumbnail display dialog box 3300 is touched and selected, and when the page is to be moved backward from the current page, the backward button 3303 is touched, and the forward button 3304 is touched when the page is to be moved forward from the current page. By moving the page as described above, an operation for replacing pages can be carried out.

③ Operation for Inserting a New Page

A previous page or a next page of a page to be inserted anew in the thumbnail display dialog box 3300 is touched and selected, and when the page is to be inserted before the selected page, the insert before button 3305 is touched, and the insert after button 3306 is touched when the page is to be inserted after the selected page. By operating as described above, a new page can be inserted in a desired position.

It should be noted that, by selecting the final page and touching the insert after button 3306, the same operation as that for creating a new page by touching the above mentioned next page button 1407 can be performed.

④ Operation for Deleting a Page

A page to be deleted in the thumbnail display dialog box 3300 is touched and selected, and the delete button 3307 is touched, so that the selected page can be deleted.

⑤ Operation for Printing a Page

A page to be printed in the thumbnail display dialog box 3300 is touched and selected, and the print button 3308 is touched, so that the selected page can be printed. It should be noted that, various settings can be performed when printing is executed. Print setting will be described later.

9) Operation for Saving Created Pages

As described above, a page created on the display board software 506 can be saved as a file. For saving, the save button 1502 in the extension toolbar 1500 is touched, and either "save (overwrite)" or "save as . . . " is selected. When "save as . . . " is selected, the display board software 506 provides current date/month/year and file names having serial numbers on the date as a default. The user inputs a file name and specifies a folder as required, and instructs to save them, and then a created page can be saved as a file. It should be noted that, a file name can be entered through the keyboard 503 (Refer to FIG. 28).

On the other hand, when "save (overwrite)" is selected, the display board software 506 overwrites a corresponding file and saves it.

It should be noted that the display board software 506 divides the display board screen 1400 into a plurality of layers for management. They are, for instance, a background layer for managing a background of the display board screen 1400 (which includes a captured screen: bitmap data), a grid layer for managing the grid lines (vector data), a graphics layer for managing the graphics created with graphics drawing tools (vector data), and a freehand layer for managing the freehand characters and graphics (vector data). When the "save as . . . " is selected, the display board software 506 generates a file with these layers maintained as they are. Therefore, when the file is read out again, the contents of each page thereof can easily be processed. In addition, depending on a setting, data for the plurality of layers is integrated as one bitmap data, which can be saved as a bitmap file.

10) Printing

Figure 57:
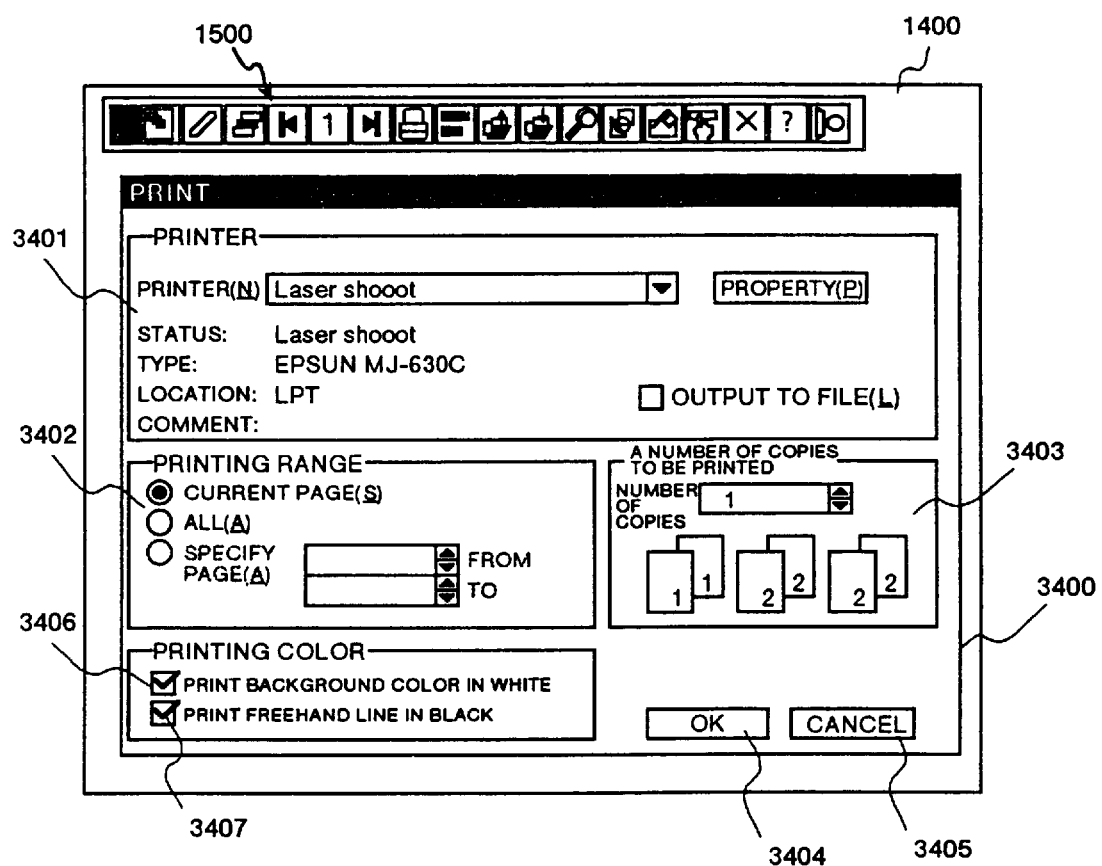
FIG. 57 shows how a printing dialog box for printing the pages in creation is displayed in the display board system according to Embodiment 3 of the present invention.

When pages in creation are to be printed, a user touches the print button 1408 in the toolbar 1401 (or the extension toolbar 1500), and touches "print" in the print menu (not shown). The display board software 506 displays a print dialog box 3400 shown in FIG. 57 according to the operation by the user. The user specifies an area to be printed and a number of copies to be printed in a printer specification column 3401, a print-area setting column 3402, and a number of copies setting column 3403 in this print dialog box 3400, and when the OK button 3404 is touched, printing is carried out by the preset printer (printer 106). It should be noted that, a cancel button 3405 is touched for stopping the printing.

Here, a background color of the display board screen 1400 can also be set to blank and printed. When such a processing of printing is to be executed, the user may perform operations for touching a check box 3406 "print background color in white" to select it, and touching the OK button 3404. The display board software 506 executes, when the check box 3406 "print background color in white" is selected, the processing of printing regarding the background color of the display board screen 1400 as blank. The provision of the setting described above allows consumption of ink or toner for the printer to be reduced.

A freehand line can also be printed in black. When such a processing of printing is to be executed, the user may perform operations for touching a check box 3407 "print freehand line in black" to select it, and touching the OK button 3404. The display board software 506 executes, when the check box 3406 "print freehand line in black" is selected, the processing of printing regarding the freehand line as black.

It should be noted that a size or a margin of recording paper for printing can be set and a printed image can be displayed although detailed description thereof is omitted herein.

11) Other Functions

It is possible to set a display magnification of characters or the like displayed on the display board screen 1400 and a method of displaying the display board screen 1400 in a window form by touching the display button 1503 in the extension toolbar 1500 to open a menu.

It is also possible to set a background color of the display board screen 1400 using a color pallet by touching the background setting button 1505 in the extension toolbar 1500 to open a menu.

Furthermore, it is also possible to set a work folder in which files to be used for the display board software 506 are stored as a unit by touching the option button 1506 in the extension toolbar 1500 to open a menu.

(3) Case of Using the System as a Computer

In order to use the display board system 100 as a computer, like in a case of using the capture function, the screen is switched to the computer screen 3000 as shown in FIG. 53 by touching the computer screen button 1401 on the display board screen 1400 or ending the display board software 506. By switching the display on the PDP 101 to the computer screen 3000 the display board system 100 can be used as a computer. As the display board system 100 has a large-sized PDP 101, it is possible to make an effective use of the system for educational activities of operating a computer or the like.

Furthermore, the coordinate-position input device 102 is usable as a pointing device like a mouse, therefore various applications can be operated on the screen. Furthermore, by touching the mouse button 3004 shown in FIG. 53, the functions assigned to the right button of the mouse can be used with a fingertip or a pen in an environment where the right button of a two-button type of mouse is usable.

(4) Adjustment of a Coordinate-Position Input Device

In the device driver 507 shown in FIG. 28, a tool for matching a display position of a mouse cursor on the PDP

101 with a touch position obtained by touching the touch surface 201 with the fingertip or the pen is available. Description is made hereinafter for an operation of positional correction for matching a display position of a mouse cursor with a touch position.

Figure 58:
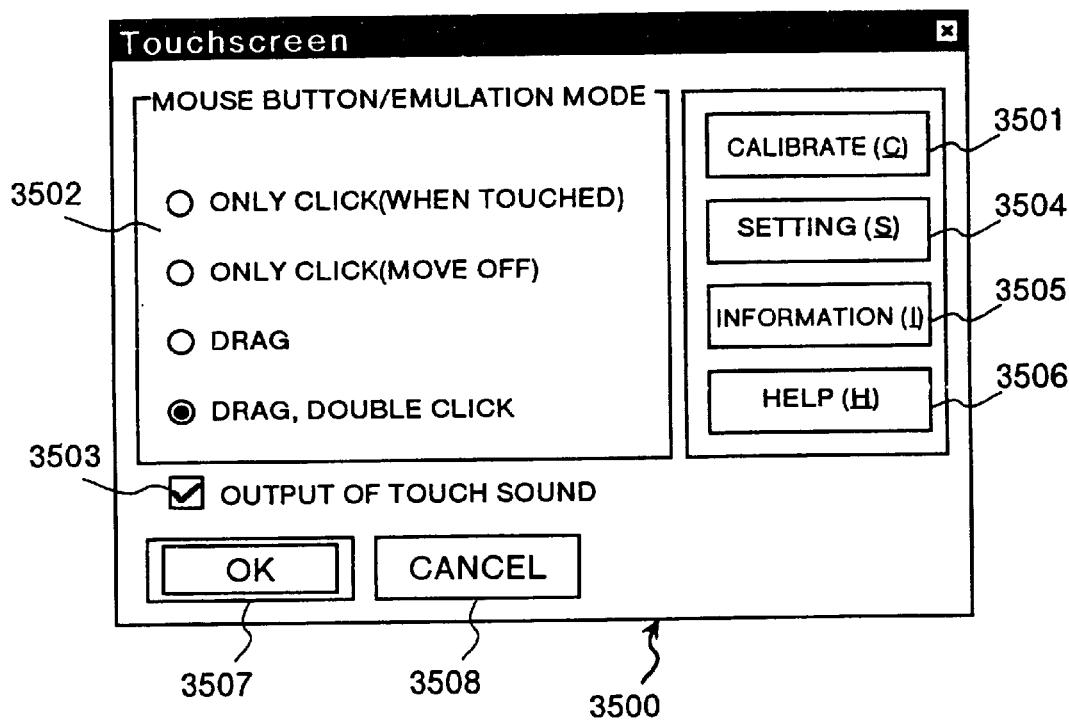
FIG. 58 shows an example of a setting screen for coordinate-position input device in the display board system according to Embodiment 3 of the present invention.

FIG. 58 is an explanatory view showing one example of a setting screen of the coordinate-position input device 102. When a calibrate button 3501 in the setting screen 3500 shown in FIG. 58 is touched, a display screen of the PDP 101 and a correction screen for adjusting coordinates of the touch surface 201 in the coordinate-position input device 102 appear on the PDP 101. This display screen displays, for instance, three correction points on the upper left side, upper right side, and lower right side of the PDP 101. The user may touch the three points on the PDP 101 with his fingertip or the pen.

When any of the three correction points are touched by the user, the device driver 507 executes positional correction processing for matching the display position of the mouse cursor with the touch position according to the touched position. The result of positional correction is saved in a prespecified file.

However, the operation for positional correction is previously performed when the display board system 100 is actually shipped as a product, therefore, a user need not perform the procedure for positional correction unless resolution of the PDP 101 or the like is changed.

It should be noted that, description is made for an outline of other setting items in the setting screen 3500. The reference numeral 3502 indicates a mouse button/emulation mode setting column, which is used for setting which processing is to be executed when the touch surface 201 is touched with the fingertip or the pen. In the mouse button/ emulation mode setting column 3502, for instance, the following settings can be carried out:

① Setting so as to regard when the touch surface 201 is touched with a fingertip or a pen as a click, ② Setting so as to regard when a fingertip or a pen having touched the touch surface 201 is moved off as a click, ③ Setting so as to regard when a fingertip or a pen touching the touch surface 201 is moved along the surface in its touched state as drag, and ④ Setting so as to regard when the touch surface 201 is touched twice in a row with a fingertip or a pen (double touch) as a double click as well as to regard when a fingertip or a pen touching the touch surface 201 is moved along the surface in its touched state as drag (this setting is required when the display board software 506 is used).

Furthermore, the reference numeral 3503 indicates an output setting check box for touch sound, and when this check box 3503 is checked, a beep is outputted each time when the touch surface 201 is touched. The reference numeral 3504 indicates a setting button, and when the setting button 3504 is touched, a screen for setting a method of connecting the controller 103 appears. Furthermore, designated at the reference numeral 3505 in the figure is an information button for displaying information on the controller 103 as well as on the device driver 507. 3506 is a help button for displaying a help screen. 3507 is an OK button for validating an item or items set in the setting screen 3500, and 3508 is a cancel button for invalidating an item or items set in the setting screen 3500 respectively.

(5) Use of AV Equipment

Connected to the PDP 101 in the display board system 100, as shown in FIG. 27, are various types of information equipment and AV equipment such as a video player 108, a laser disk player, a DVD player, and a video camera to enable reproduction of video and audio. In addition, an external speaker can be connected to the PDP 101 through an amplifier, which allows a user to enjoy a powerful sound with a large-sized display. Signals inputted from the information equipment, AV equipment, or the computer 104 to the PDP 101 can easily be switched using a remote control or the like which is not shown.

As described above, various types of information equipment and AV equipment can be connected to the PDP 101 and operated without using the computer 104, so that the PDP 101 can be used as a large-sized screen monitor. Thus allows operability, adaptability for handling, and convenience of the display board system 100 to be improved without requiring other equipment such as a television to be prepared.

(6) Connection to a Network

Figure 59:
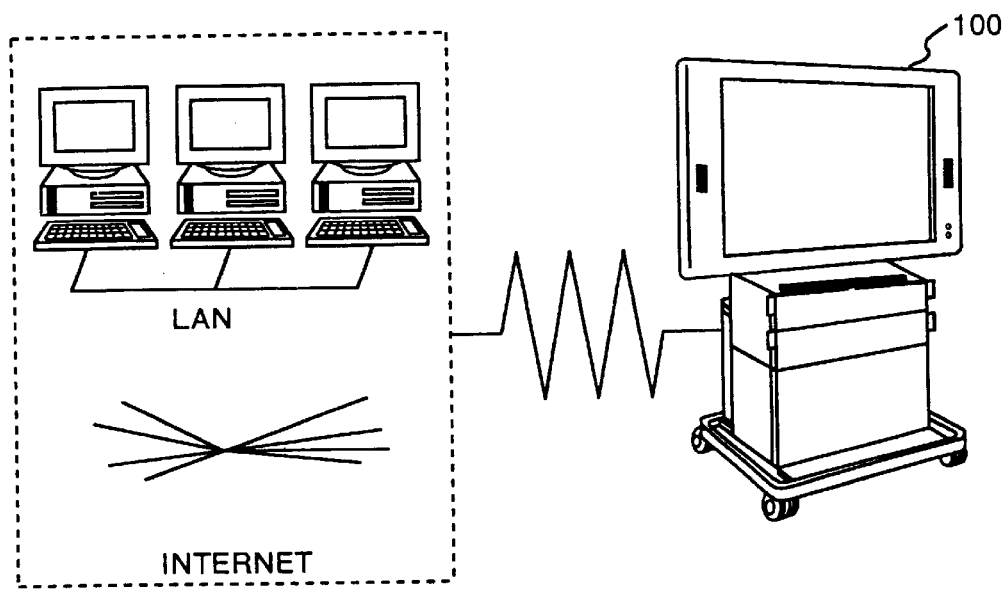
FIG. 59 shows the network connection of the display board system according to Embodiment 3 of the present invention.

Furthermore, as shown in FIG. 59, the display board system 100 can be connected to a network such as a LAN or the Internet. Therefore, applicability of the display board system 100 can be widened to the extent of: transmitting materials or the like for a conference prepared with the display board software 506 to other computer, reading in data prepared by other computer and using it in a conference, teleconferencing by connecting a plurality of display board systems 100 to each other, and applying the display board system 100 in a video conference system or some other occasions. In addition, the display board system 100 can be connected to a network using the radio signals from a Personal Handyphone System.

3. Effects

As described above, with the display board system according to Embodiment 3, as the coordinate-position input device described in Embodiments 1 and 2 is used, operability and reliability when input is performed to the display board system can be improved.

The display board system 100 is configured with the frame unit 600 comprising the board section 601 forming a display surface and a writing surface of a display board with the PDP 101 and coordinate-position input device 102 and the equipment accommodating section 604 in which the computer 104, video player 108, and printer 106 are accommodated in the vertical direction from the bottom. Therefore, movement and installation of the system can easily be performed only by moving the frame unit 600. As the devices are arranged in the order of the heaviest one at the bottom and the lighter ones above the heavier ones in the direction of gravity (vertical direction), stability of the frame unit 600 when it is moved and installed can be insured. Namely, with the display board system 100 according to Embodiment 3, it is possible to enhance downsizing and integration of the display board system 100 as a whole and also improve operability, adaptability of handling, and convenience thereof.

In addition, the display board system 100 has an angle adjusting mechanism section 802 for adjusting an angle of the board section 601 with the PDP 101 and coordinate-position input device 102 accommodated therein, so that incoming interference light into the display surface of the PDP 101, especially, light from lighting equipment such as a fluorescent tube provided on the ceiling can be avoided. Therefore, an image on the screen can easily be seen and convenience of the display board system 100 can be improved.

Furthermore, the PDP 101 can be used as a large-sized screen monitor by using a plurality of connecting terminals for connecting various types of information equipment and AV equipment such as a digital camera, a DVD player, and a video equipment to the system. Therefore, it is possible to provide a display board system 100 for enabling connection and operation of the various types of information equipment and AV equipment without using the computer 104.

Next, as Embodiment 4, another display board system applicable to the above mentioned display board system 100 according to Embodiment 3 will be described.

When the size of a screen of a display unit such as the PDP 101 according to Embodiment 3 is about 100 inches wide across the corners, for example, it will be difficult for a presenter standing at the left side of the screen to directly point to a place (touch the touch surface 201) at the upper right corner. Therefore, in Embodiment 4, description is made for a display board system which allows a presenter to perform a pointing operation to an image displayed on the large-sized screen in his natural posture toward the audience.

The display board system according to Embodiment 4 displays an icon for selecting a create a point-operating area with the icon such as a press button at some corner of the display screen. When a presenter selects the create a point-operating area with this icon and specifies a position where the point-operating area is created, a pointer area creating section creates a rectangular point-operating area in an instructed position on an image display unit and displays the area. The presenter confirms the displayed point-operating area and points to a position corresponding to a display point on the display screen within the point-operating area instead of directly pointing to the display point on the display screen. When the presenter points to a position corresponding to a display point on the screen within the point-operating area, a pointer moving section moves a pointer (mouse cursor) on the display screen to the display point and points to the display point. Thus, the presenter can easily and accurately point to a display point on a large screen which the presenter can not reach.

Figure 60:
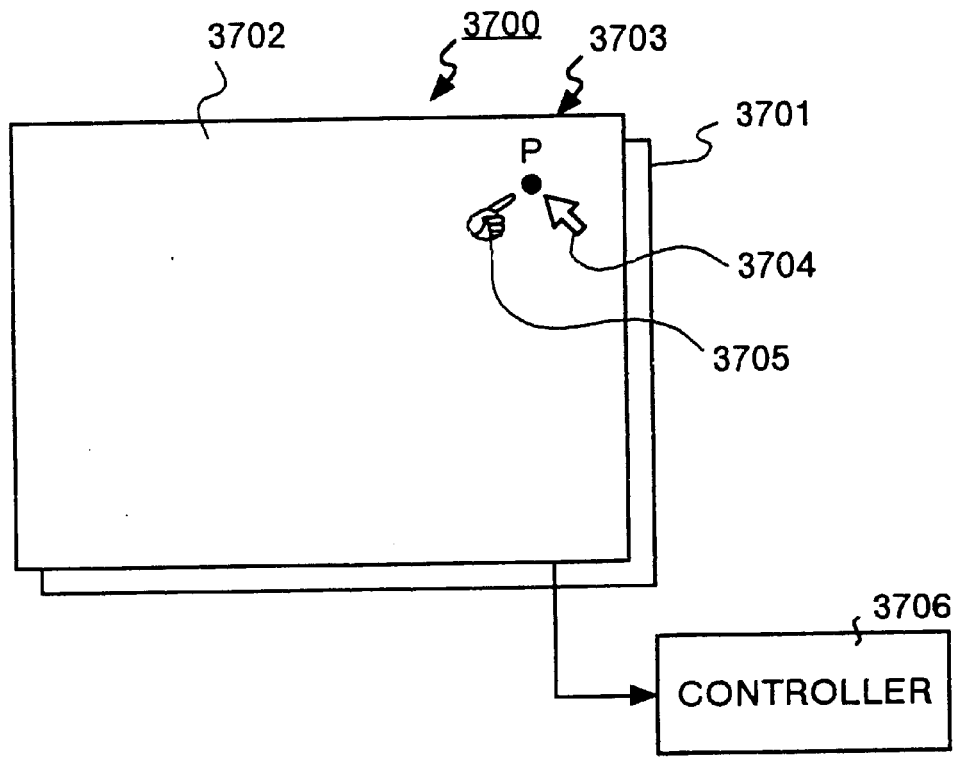
FIG. 60 shows the configuration of a display unit of a display board system according to Embodiment 4 of the present invention.

FIG. 60 is a view of a display unit forming the display board system according to Embodiment 4. The image display unit 3700 shown in FIG. 60 is a large-sized screen display comprising an image display section 3701 (corresponding to the PDP 101 in Embodiment 3) and a coordinate-position input device 3702 (corresponding to the coordinate-position input device 102 in Embodiment 3) provided on the surface of the image display section 3701. In FIG. 60, the reference numeral 3706 corresponds to the controller 103 in Embodiment 3 (Refer to FIG. 27).

Figure 61:
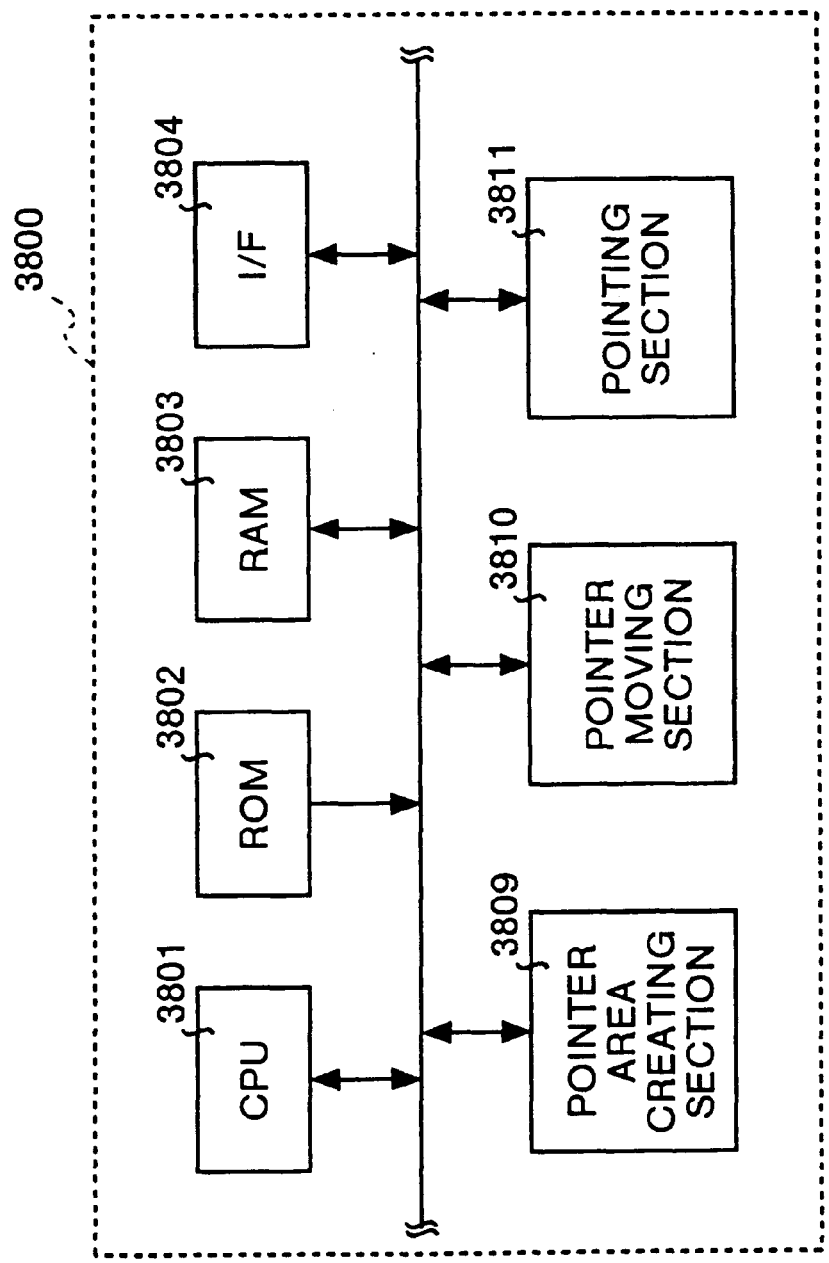
FIG. 61 is a block diagram showing a main control section of the display board system according to Embodiment 4 of the present invention.

FIG. 61 is a block diagram showing a main control section of the display board system according to Embodiment 4 of the present invention. The main control section 3800 comprises a CPU 3801, a ROM 3802, a RAM 3803, an I/F 3804 with the image display unit 3700 and coordinate-position input device 3702 connected thereto, a pointer area creating section 3809, a pointer moving section 3810 and a pointing section 3811. It should be noted that, the main control section 3800 corresponds to the computer 104 in Embodiment 3.

Figure 62:
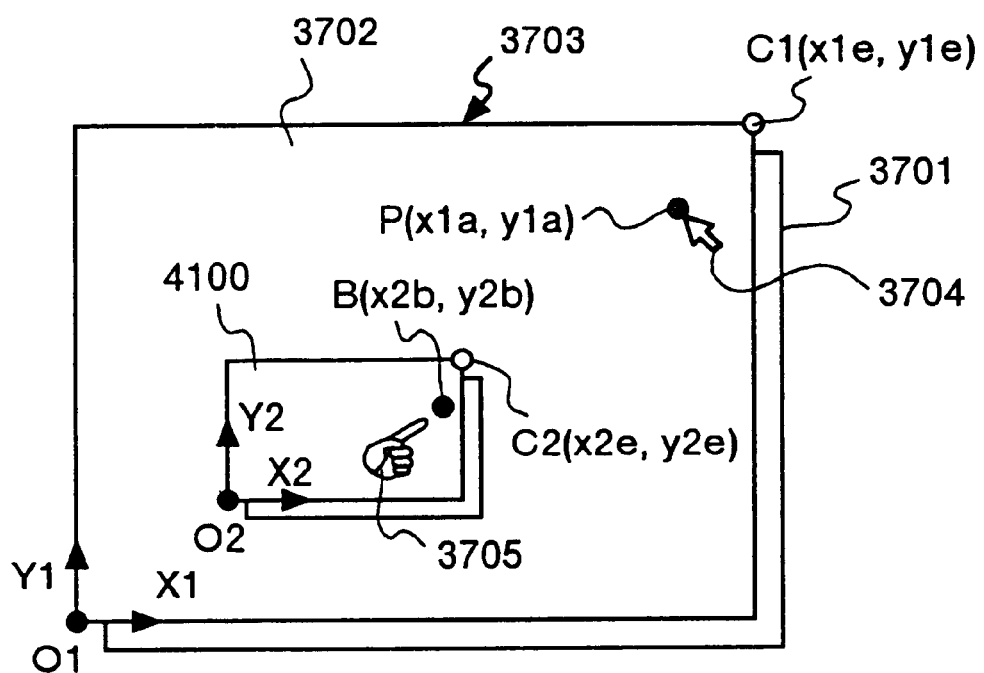
FIG. 62 shows a screen that displays a point-operation area in the display board system according to Embodiment 4 of the present invention.
Figure 63:
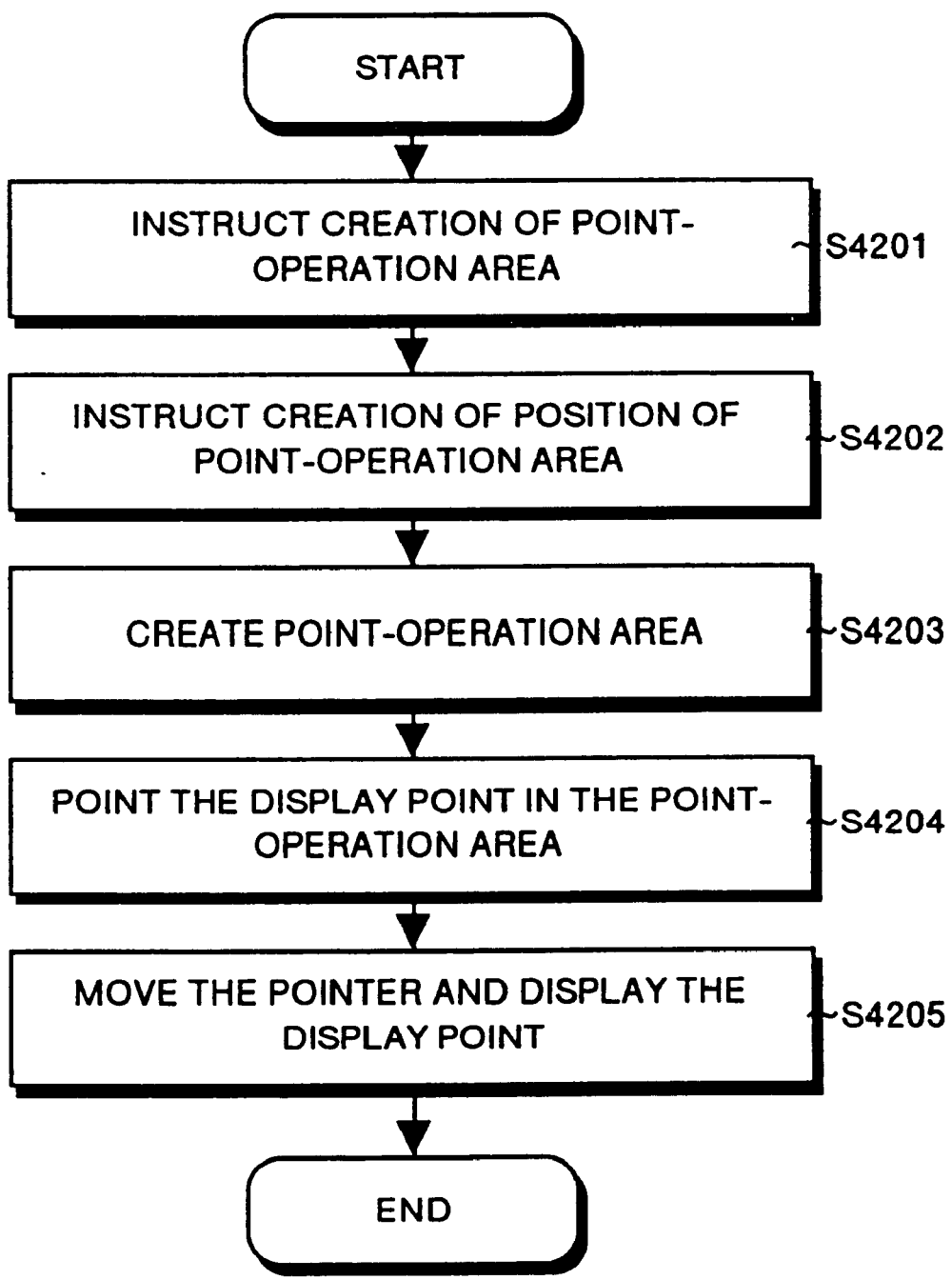
FIG. 63 is a flow chart of a point operation in the display board system according to Embodiment 4 of the present invention.

In the display board system having the configuration described above, description is made for an operation when a point P on the display screen of the image display section 3701 is pointed, for example, as shown in FIG. 60 with reference to the display view in FIG. 62 and the flow chart in FIG. 63. In an ordinary operating situation, when a presenter using the image display unit 3700 touches the point P on the screen 3701 with his or her fingertip, the situation is regarded as that the presenter points to the point P and the pointer 3704 is moved to the point P. However, when the size of a screen of the image display section 3701 is about 100 inches in a width across corners, for example, it will be difficult for the presenter standing at the left edge to the screen to directly point to the point P at the upper right side. Therefore, the CPU 3801 displays an icon for selecting a create a point-operating area with the icon such as a press button at some corner of the image display section 3701. When the presenter selects the create a point-operating area with this icon and specifies a position where the point-operating area is created (steps S4201 and S4202), the pointer area creating section 3809 reduces the image display section 3701 and the coordinate-position input device 3702 to an instructed size shown in FIG. 62, creates a rectangular point-operating area 4100, and displays the area on the image display section 3701 (step S4203).

The presenter having confirmed this point-operating area 4100 points to a point B corresponding to the point P within the point-operating area 4100 instead of directly pointing to the point P on the screen 3703 (step S4204). In response to this operation, the pointer moving section 3810 moves the pointer 3704 to the point P on the screen 3703 and points to the point P (step S4205). Thus, the presenter can indirectly point to the point P on the large screen which the presenter can not reach.

Figure 64A:
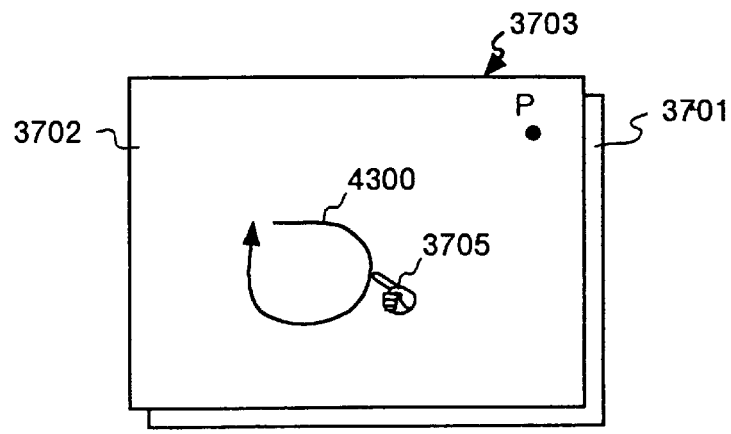
FIGS. 64A, 64B and 64C are processing steps showing display and deletion of a point-operation area in the display board system according to Embodiment 4 of the present invention.
Figure 64B:
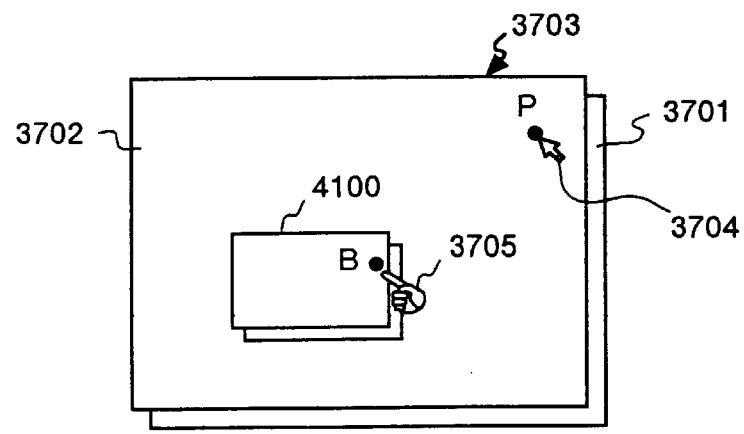
Figure 64C:
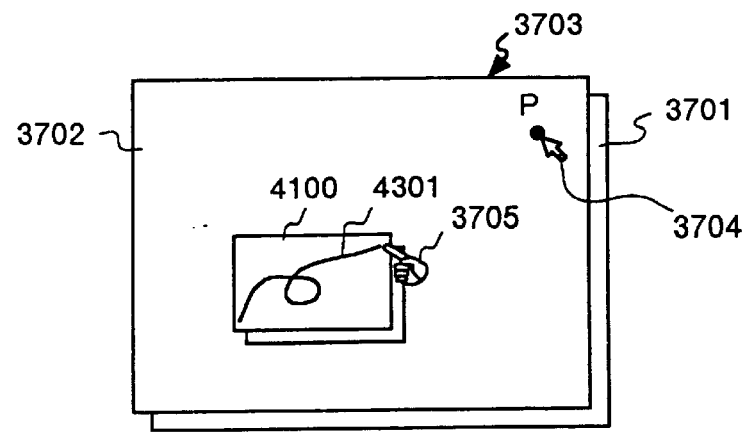
Figure 65:
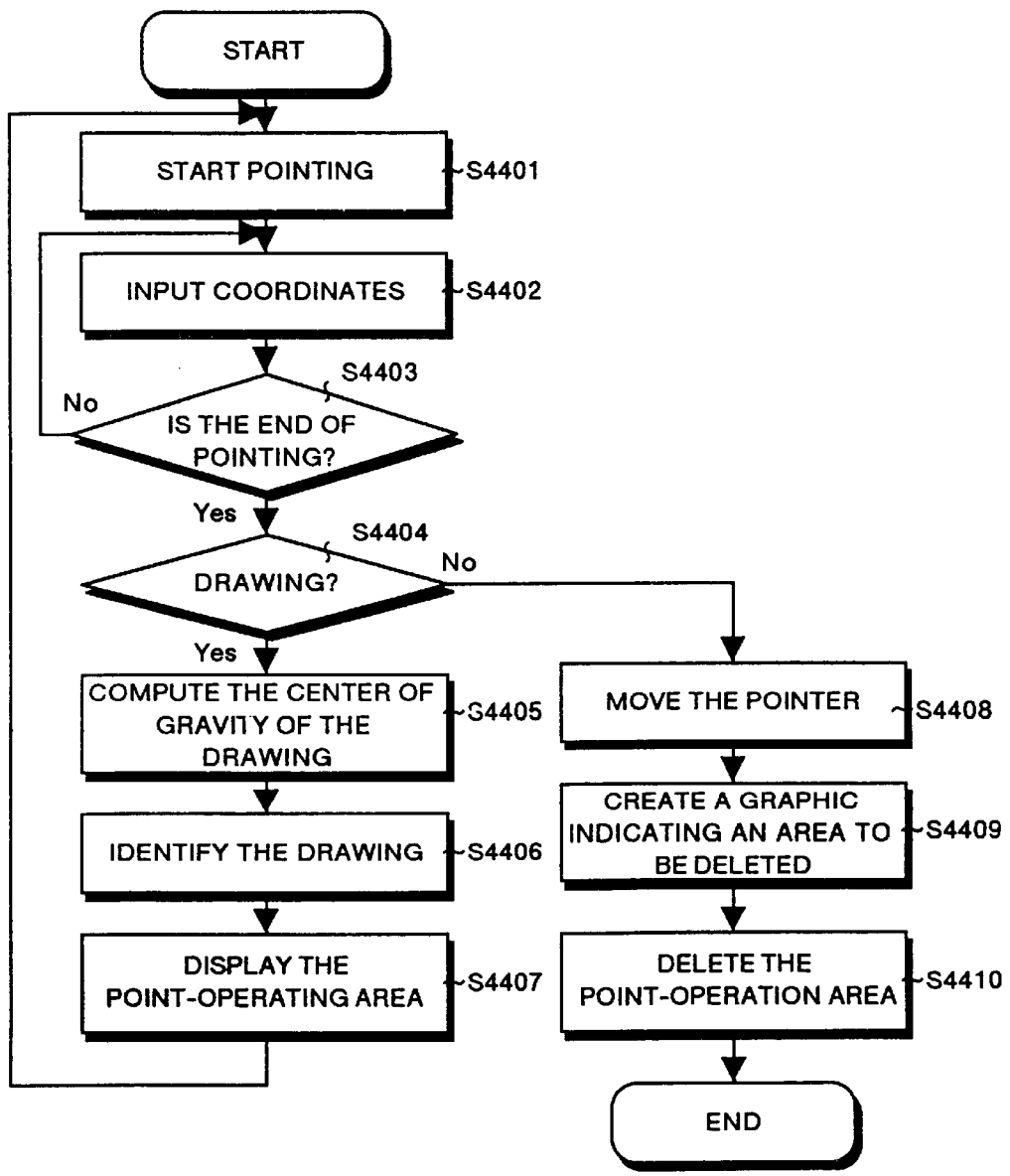
FIG. 65 is a flow chart of the processing for display and deletion of a point-operation area in the display board system according to Embodiment 4 of the present invention.

Then, detailed description is made for operations when a point-operating area 4100 is displayed on the image display section 3701 and when the displayed point-operating area 4100 is deleted with reference to the views for processing steps in FIGS. 64A to 64C and the flow chart in FIG. 65. As shown in FIG. 64A, on the screen 3703 of the image display section 3701 in its ordinary operating status, when a presenter creates a loop-shaped trail having a geometrical feature previously defined, for instance, a trail 4300 similar to a rectangle, the CPU 3801 determines through the controller 3706 that the presenter's fingertip 3705 have touched an entry area of the coordinate-position input device 3702 and continuously records coordinates and times from the point of time when the finger has touched it until the finger 3705 moves off the coordinate-position input device 3702 in the RAM 3803 (steps S4401 to S4403).

The pointer area creating section 3809 determines whether the presenter has created a drawing or has pointed to a point by touching the coordinate-position input device 3702 according to the coordinates and times recorded in the RAM 3803 (S4404).

The pointer area creating section 3809 computes, when it is determined that the drawing has been created as shown in FIG. 64A, the center of gravity in a created pattern according to the created drawing 4300 (step S4405), and identifies a type of pattern (step S4406). When it is determined that the identified pattern is, for instance, a rectangle, the pointer area creating section 3809 creates a point-operating area 4100 as shown in FIG. 64B at the position of the center of gravity n the created pattern as a reference and displays the area on the screen 3703 (step S4407).

When the presenter points, in the above state, to the point B corresponding to the point P on the screen 3703 by touching the coordinate-position input device 3702, the pointer area creating section 3809 determines that the pointing is instructed (steps S4401 to S4404). When it is determined by the pointer area creating section 3809 that the pointing has been instructed, the pointer moving section 3810 moves the pointer 3704 on the screen 3703 to the point P on the screen 3703 corresponding to the point B to which pointing is instructed and displays the moved pointer (step S4408).

In the above state, when a trail 4301 which is not a loop is created in the point-operating area 4100 by the presenter as shown in FIG. 64C and coordinates and each time of the trail 4301 are stored in the RAM 3803, the pointer area creating section 3809 determines that the created trail 4301 is a graphic to be deleted and deletes the point-operating area 4100 from the screen 3703 (steps S4409 and S4410). When this point-operating area 4100 is to be deleted, if the center of gravity in the trail 4301 to the center of gravity in the point-operating area 4100 is closer to a preset value, the trail 4301 is determined as a graphic to be deleted, which makes it possible to suppress redundancy of the operation.

Description is made for the processing, when the point B in the point-operating area 4100 is instructed to be pointed to as described above, for a case where the coordinates of the instructed point B are transformed to coordinates of the point P on the screen 3703. As shown in FIG. 62, it is assumed that the point-operating area 4100 is displayed by reducing the image display section 3701 and the coordinate-position input device 3702 at a specified reduction rate. Then, as shown in FIG. 62, it is assumed that, by setting the lower left edge of the screen 3703, for instance, to the origin O1, each point of the screen 3703 is expressed with X-Y coordinates, and coordinates of a point C1 diagonal to the origin O1 are (x1e, y1e), and that the lower left edge of the point-operating area 4100 corresponding to the origin O1 is the origin O2 of the point-operating area 4100 and the coordinates of a point C2 in the point-operating area 4100 corresponding to the point C1 are (x2e, y2e). As a result the coordinate (x2, y2) of each point in the point-operating area 4100 correspond to coordinate (x1, y1) of each point on the screen 3703 one for one through a factor K decided based on a relation between the coordinate (x1e, y1e) and the coordinate (x2e, y2e). Therefore, the pointer moving section 3810 can accurately move the pointer 3704 to the point P by transforming coordinates from the coordinate (x2b, y2b) of the point B pointed in the point-operating area 4100 to the coordinate (x1a, y1a) of the point P on the screen 3703.

Figure 66:
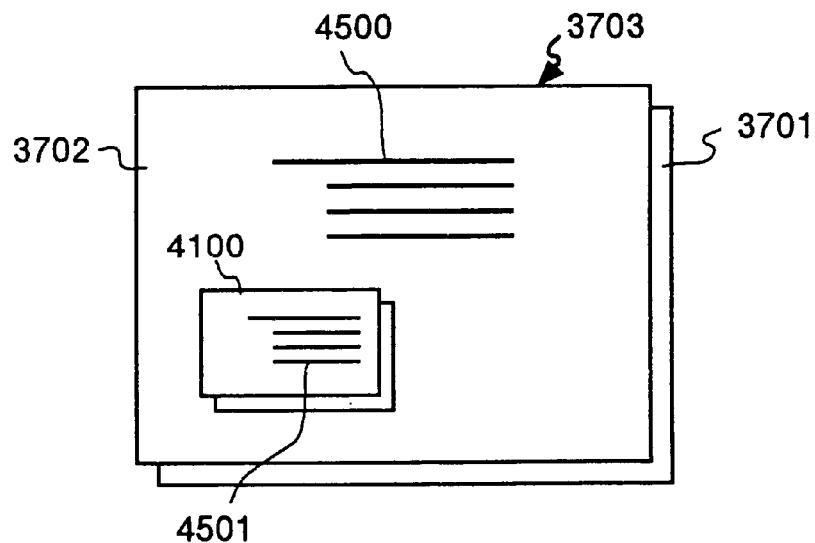
FIG. 66 is an explanatory view that shows display contents on the display screen appearing within the point-operation area in the display board system according to Embodiment 4 of the present invention.

As described above, as each point in the point-operating area 4100 corresponds to each point on the screen 3703 one for one, the point-operating area 4100 is recognized by a user as to be equivalent to a reduced screen of the full screen 3703. Therefore, when the point-operating area 4100 is displayed, as shown in FIG. 66, a similar reduced object 4501 obtained by reducing an object 4500 such as characters and graphics displayed on the full screen 3703 can be displayed in the point-operating area 4100.

Figure 67:
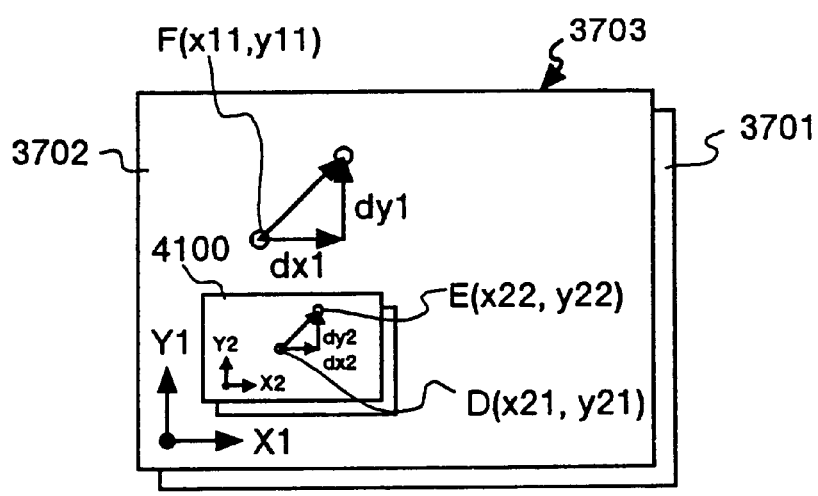
FIG. 67 shows a moving operation of the pointer in association with transformation of coordinates in the display board system according to Embodiment 4 of the present invention.

As the processing of transforming the coordinates of the instructed point B to the coordinates of the point P on the screen 3703, the case of transforming the coordinate (x2b, y2b) of the point B pointed in the point-operating area 4100 to the coordinate (x1a, y1a) of the point P on the screen 3703 has been described, but the pointer 3704 on the screen 3703 can also directly be moved. The processing in this case will be described with reference to FIG. 67.

Relative values in movement of coordinates in the point-operating area 4100 correspond to relative values in movement of the pointer 3704 on the screen 3703 through the factor K. Therefore, when the presenter instructs to move the pointer 3704 from a display position F (x11, y11) on the screen 3703 by keeping on pointing to and moving an arbitrary point D (x21, y21) on the coordinate-position input device 3702 to a point E (x22, y22) within the point-operating area 4100, a coordinate data row pointed within the point-operating area 4100 is inputted with coordinates of X2-Y2. By differentiating or executing differential operation of this inputted coordinate data row, the transform (dx2, dy2) of the inputted coordinate is operated in appropriate time intervals. The coordinate F (x11, y11) of the pointer 3704 on the screen 3703 can be transformed and displayed based on transformation (dx1, dy1) of the coordinate obtained by multiplying the transformation of the coordinate along time within the point-operating area 4100 by the factor K. In this case, although the point D within the point-operating area 4100 may not correspond to a display position F of the pointer 3704 on the screen 3703 one for one, by correlating the transformation (dx2, dy2) of the coordinate to transformation of coordinate of the point F on the screen 3703 through the factor K, and the pointer 3704 on the screen 3703 can be operated in much the same way the mouse is operated.

If this processing of operating the pointer 3704 on the screen 3703 in much the same way the mouse is operated and the processing of using coordinate of a point B pointed on the point-operating area 4100 are switched as required, a user can use properly either the mouse emulation or the pointing operation based on absolute coordinate according to the situation.

The image display unit 3700 is premised on displaying an image generated by a computer. For moving an object in a displayed image or moving an icon or a window in an operating system, an ordinary mouse operation is carried out by moving a pointer over an object, pressing a button (pointing operation) thereon, and moving the object to a desired position in its pressed state. This operation is generally known as an operation of drag. Description is made hereinafter for an operation of drag for moving the pointer over the full screen 3703 by pointing to any coordinate within the point-operating area 4100.

The display board system according to Embodiment 4 has no button mechanism as that provided in an ordinary mouse because the coordinate-position input device 3702 is used therein. As a method of realizing an operation instead of the ordinary mouse operation, a cursor is moved up to target coordinate within the point-operating area 4100, and an object-displayed surface is momentarily pointed thereto with a finger or a pen at the target position.

Figure 68:
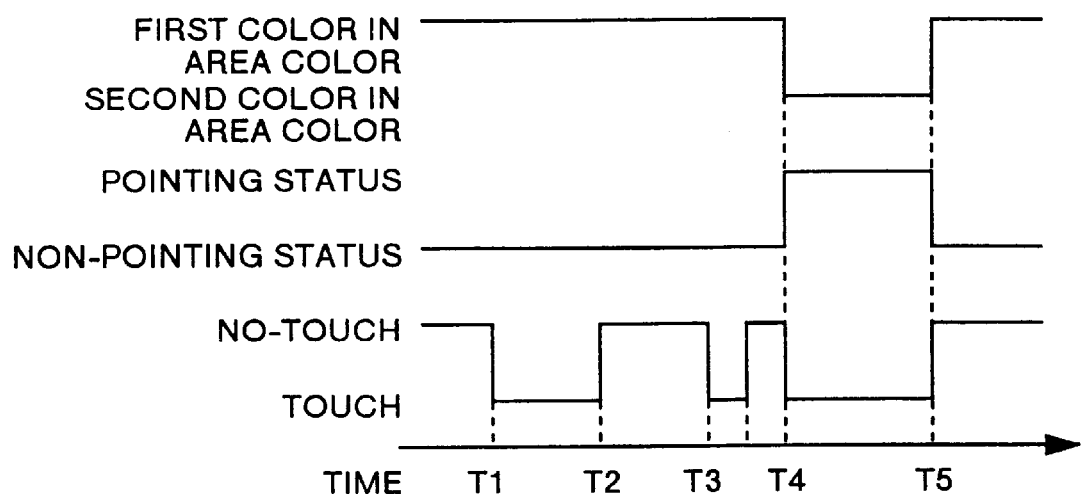
FIG. 68 is a time chart showing drag operations according to operations within a point-operation area in the display board system according to Embodiment 4 of the present invention.

FIG. 68 shows one example of changes of a state of pointing to an entry area of the coordinate-position input device 3702 with the fingertip 3705 on the time axis. During the time T1, the fingertip 3705 is moved keeping on its pointing to the point-operating area 4100 of the coordinate-position input device 3702, and the pointer 3704 is moved to a desired object on the screen 3703. During the time T2, when the pointer 3704 is moved up to the desired object, the fingertip 3705 is moved off the coordinate-position input device 3702 once, and at the point of time T3, the object at the position is momentarily pointed to with the fingertip. At the point of time T4 when the operation is ended and thereafter, the pointing section 3811 selects a desired object and shifts to a state in which the mouse button has been pressed down (a pointing state). This determination above can be made, for instance, by switching the state of pointing to the point-operating area 4100 of the coordinate-position input device 3702 to the non-pointing state and vice versa within an appropriate time interval. Furthermore, the pointing section 3811 changes the display color of the point-operating area 4100 from a first color at a state of not pointing to the area to a second color. According to this change in display color, a user can accurately recognize that the state has been changed to a pointing state even when there is no mechanical button thereon. In this state, the fingertip 3704 is touched again in the point-operating area 4100, the pointed object is moved, and the fingertip is moved off the object at the point of time T5, so that the movement of the object is completed and the state of pointing to the object is released.

Although description has been made for the case where the state is shifted to the pointing state when the point-operating area 4100 is momentarily pointed to at the point of time T3, one of a certain number of states may be selectively specified in the pointing section 3811 depending on a number of times of instant pointing. Furthermore, during a state shifting process for shifting to the pointing state, a user can recognize that the current state is in the process of shifting to the other state by switching the display color in the point-operating area 4100 to a third color, therefore, malfunction can be reduced.

As described above, with the display board system according to Embodiment 4, a point-operating area 4100 used for pointing to a display point on a displayed image appears on a desired position according to an instruction by a user, and the user can operate the pointer 3704 on the screen 3703 in the point-operating area 4100. Therefore, a presenter can easily and accurately point to a position which the presenter can not reach even in the large-sized screen display unit.

Furthermore, a position and a size of the point-operating area 4100 are instructed on the coordinate-position input device 3702, so that the point-operating area 4100 can be displayed on an arbitrary position with a simple operation, and pointing to a display point on the screen 3703 can easily be performed.

In addition, each coordinate within the point-operating area 4100 are displayed in correlation to coordinate within all area on the image display surface one for one, so that a pointed position can easily be specified on the point-operating area 4100.

Furthermore, transform of the coordinate to which is pointed with the pointer within the point-operating area 4100 is correlated to movement of coordinate of the pointer on an image display surface, and the pointer 3704 is moved according to this transform so that the pointer 3704 on the screen 3703 can be operated in much the same way the mouse is operated.

In addition, a user selectably uses a pointing operation based on absolute coordinate and a pointing operation based on transform of coordinate as required, so that the user can use properly either the mouse emulation or the pointing operation based on absolute coordinate according to the situation.

Furthermore, layout information of display contents on the entire screen is displayed in the point-operating area 4100, so that a user can check the display contents in the point-operating area 4100, therefore, a pointing operation on a large-sized screen can easily be performed.

Furthermore, by momentarily pointing to some point within the point-operating area 4100 once or a plurality of times, a plurality of pointing states can be obtained according to a number of times of pointing, so that a pointing operation on a large-sized screen can easily be performed. By changing the display colors of the point-operating area 4100 according to a plurality of pointing states, malfunction and a miss operation of the system on pointing can be reduced.

For example, if a security function is provided in the display board system according to Embodiment 3 and a personal identification number is inputted through a coordinate-position input device, a PID number to be inputted may be seen by some other persons. Therefore, in Embodiment 5, a display board system that can prevent a PID number from being seen by other persons when a PID number is inputted in the display board system will be explained. Specifically, the display board system according to Embodiment 5 displays a ten-key on a position over which a person entering the number casts his shadow when viewed from other persons, so that the ten-key used for entering a PID number is hidden by the person entering it, which allows the ten-key not to be seen from other persons.

Figure 69:
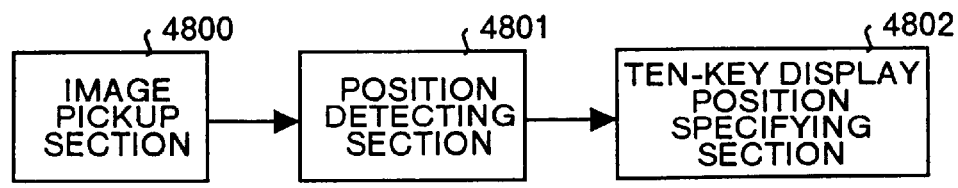
FIG. 69 is a block diagram showing a first example of the configuration of a display board system according to Embodiment 5 of the present invention.

FIG. 69 is a block diagram generally showing a first example of the configuration of the display board system according to Embodiment 5. This display board system comprises a coordinate-position inputting section (corresponding to the coordinate-position input device 102 in Embodiment 3) for detecting a position of a pointing body having pointed at an input surface (corresponding to the touch surface 201 in Embodiment 3) on the input surface, and an image display section (corresponding to the PDP 101 in Embodiment 3) for displaying an image on a screen commonly used as the input surface. The display board system further comprises an image pickup section 4800 for picking up an image of a person who enters a PID number, a position detecting section 4801 for detecting a position of the person who enters a PID number according to the image picked up by the image pickup section 4800, and a ten-key display position specifying section 4802 for displaying the ten-key on the image display section according to the position obtained by the position detecting section 4801.

Figure 70:
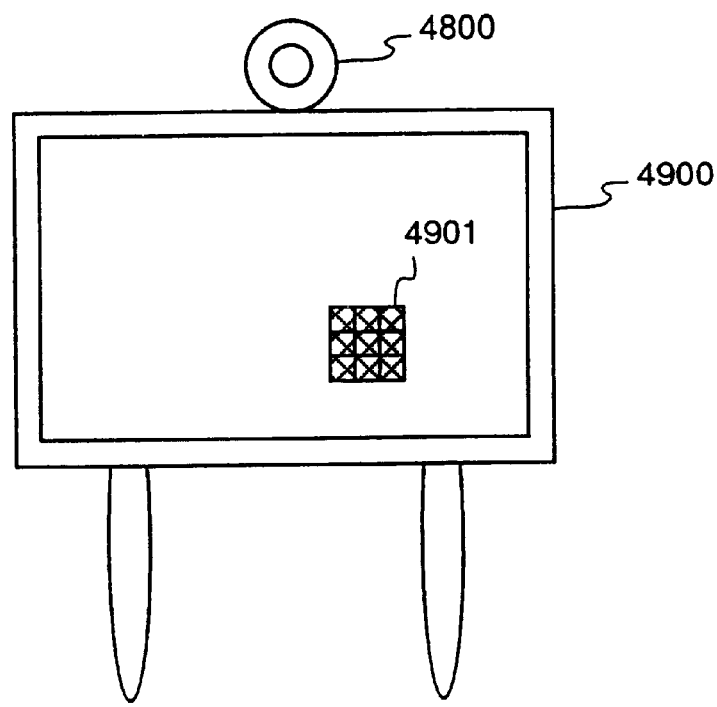
FIG. 70 is an appearance view of the first example of the configuration of the display board system according to Embodiment 5 of the present invention.

FIG. 70 is an appearance view showing a first example of the configuration of the display board system. In the first example of the configuration, the image pickup section (camera) 4800 for picking up an image of the person who enters a PID number standing in front of the section is provided in the display board system 4900. The image picked up by the camera 4800 as the image pickup section 4800 is sent to the position detecting section 4801 built in the display board system 4900. The position detecting section 4801 detects a position of the person from the image of the person picked up by the image pickup section 4800.

Figure 71:
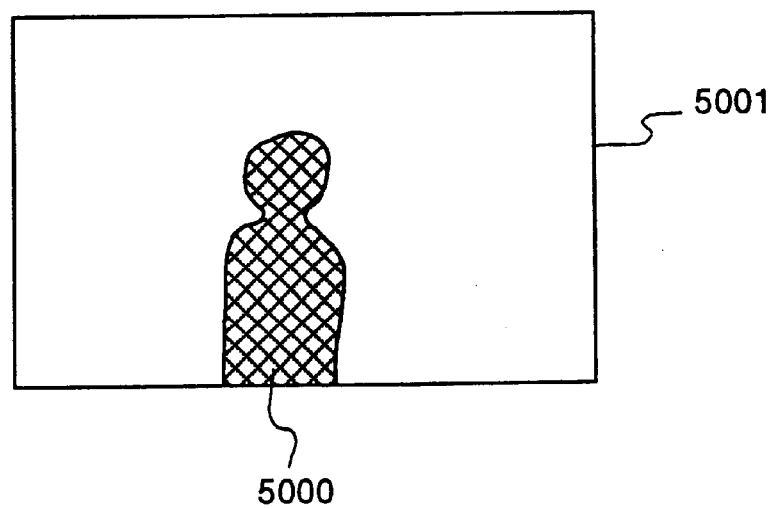
FIG. 71 shows an example of a method of detecting a position of a person from an image based on the first example of the configuration of the display board system according to Embodiment 5 of the present invention.

As a method of detecting a position of a person from an image thereof, various types of methods can be used. For example, at first a local frequency is computed on an inputted full image. Then, the frequency element obtained as described above are subjected to threshold processing, and as described in FIG. 71 the full image is separated into a portion (area 5000) with a high frequency included and a portion (area 5001) with less high frequency included. This processing is employed based on the fact that the image of a person focused on has comparatively more of high frequency elements but a background which is not focused on has less high frequency elements. Herein the portion (area 5000) with high frequencies included in the full image is predicted as a portion of a person. Then, the center of gravity (GX, GY) in the area 5000 where the person is supposed to be photographed is obtained. At which position on the image the person is present can be computed through the processing above.

As described above, when the position of the person is detected as, for instance, (GX, GY), on which position of the input surface the ten-key should be displayed is computed from this position (GX, GY) in the ten-key display position specifying section 4802. As a method of deciding a position of the ten-key to be displayed to the position (GX, GY), various types of methods can be used. For instance, as it is conceivable that the same position as that where the person is standing is probably the hardest-to-view position from other persons, so that the ten-key 4901 is displayed on that position. Furthermore, positions where not only the person who enters a PID number but also viewers are present are presumed from the images and the ten-key 4901 may be displayed on the position obtained through such consideration.

Figure 72:
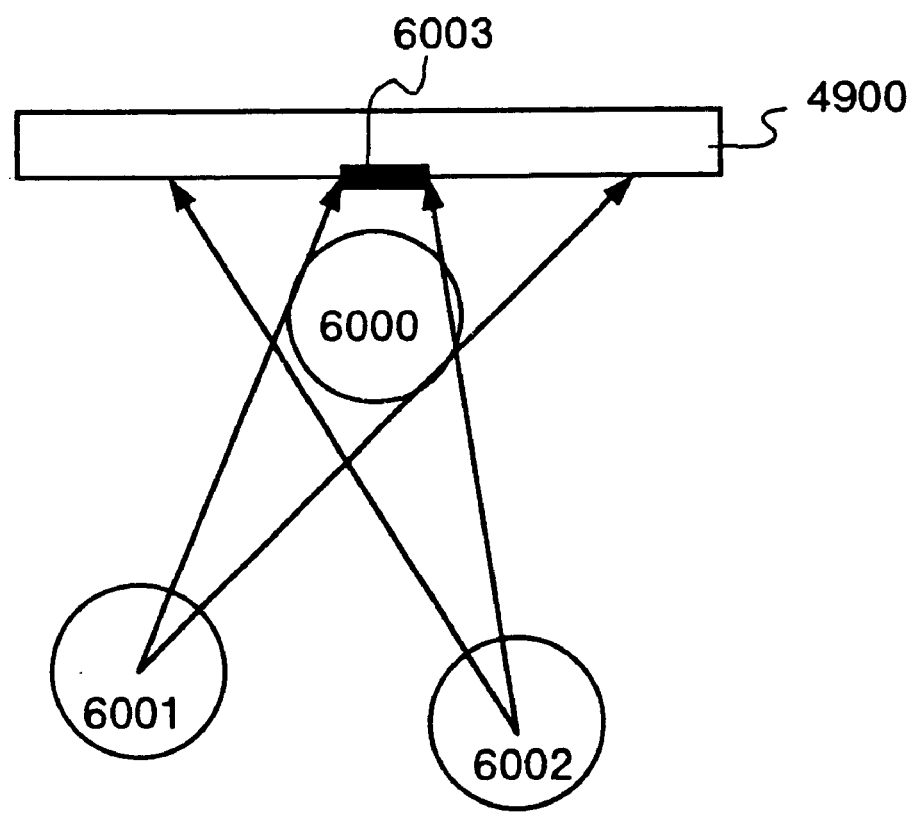
FIG. 72 shows a method of deciding a position where a ten-key is to be displayed in the display board system according to Embodiment 5 of the present invention.

As one example, description is made for a method of deciding a displayed position with reference to FIG. 72. FIG. 72 is a view showing the display board system 4900 when viewed from the upper side thereof. As shown in FIG. 72, for persons 6001 and 6002, a position over which a person 6000 who enters a PID number casts his shadow is an area 6003 indicated by a heavy line, therefore, the ten-key 4901 is displayed on a position within this area 6003. Through the processing described above, the ten-key 4901 is displayed as shown in FIG. 70. Thus, the ten-key 4901 for entry of a PID number is hidden behind the person who enters a PID number so that nobody can see the ten-key.

Figure 73:
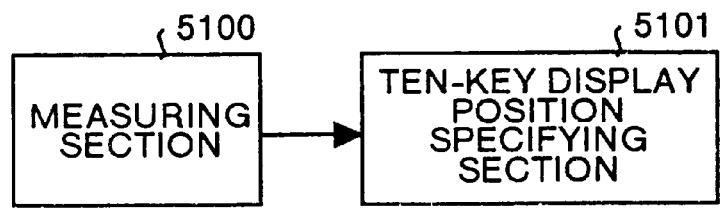
FIG. 73 is a block diagram showing a second example of the configuration of the display board system according to Embodiment 5 of the present invention.

FIG. 73 is a block diagram generally showing a second example of the configuration of the display board system according to Embodiment 5. This display board system comprises a coordinate-position inputting section (corresponding to the coordinate-position input device 102 in Embodiment 3) for detecting a position of a pointing body having pointed to an input surface (corresponding to the touch surface 201 in Embodiment 3) on the input surface and an image display section (corresponding to the PDP 101 in Embodiment 3) for displaying an image on a surface commonly used as the input surface. The display board system further comprises a measuring section 5100 for measuring a three-dimensional position of a person who enters a PID number, and a ten-key display position specifying section 5101 for displaying a ten-key on the image display section according to the three-dimensional position obtained by the measuring section 5100.

Figure 74:
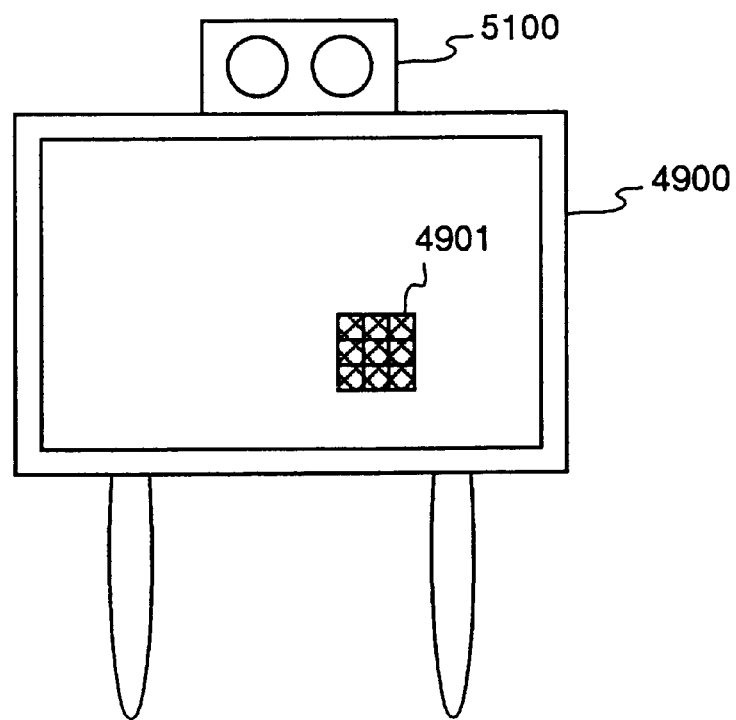
FIG. 74 is an appearance view showing the second example of the configuration of the display board system according to Embodiment 5 of the present invention.

FIG. 74 is an appearance view showing the second example of the configuration of the display board system. In the second example, the measuring section (three-dimensional position measuring device) 5100 for computing a three-dimensional position of a person who enters a PID number by standing in front of the display board system 4900 is provided. As the three-dimensional position measuring device 5100, various types of device can be used. For example, a device using a principle of stereoscopic vision with a twin-lens camera and a device using an optical cutting method of projecting a reference pattern and reading displacement of the pattern from its image or the like can be used.

In the display board system 4900, the measuring section 5100 detects a three-dimensional position of a person (RX, RY, RZ), and the ten-key display position specifying section 5101 computes on which position of the input surface the ten-key should be displayed. As a method of deciding a position of a ten-key to be displayed with respect to the position (RX, RY, RZ), various types of methods can be used. For example, the method described in the first configuration can be used. When the position of the ten-key to be displayed to the position (RX, RY, RZ) is decided, the ten-key 4901 is displayed on the decided display position as shown in FIG. 74. Thus, the ten-key 4901 for entry of a PID number is hidden behind the person 6000 who enters a PID number so as not to be seen from other persons because of the same principle having been described with reference to FIG. 72.

Figure 75:
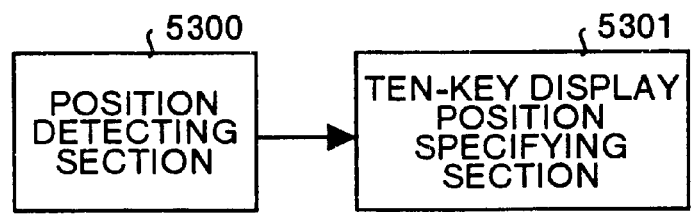
FIG. 75 is a block diagram showing a third example of the configuration of the display board system according to Embodiment 5 of the present invention.

FIG. 75 is a block diagram generally showing a third example of the configuration of the display board system according to Embodiment 5. This display board system comprises a coordinate-position inputting section (corresponding to the coordinate-position input device 102 in Embodiment 3) for detecting a position of a pointing body having pointing to an input surface (corresponding to the touch surface 201 in Embodiment 3) on the input surface and an image display section (corresponding to the PDP 101 in Embodiment 3) for displaying an image on a surface commonly used as the input surface. The display board system further comprises a position detecting section 5300 for detecting a position of a person who enters a PID number by getting on the section, and a ten-key display position specifying section 5301 for displaying a ten-key on the image display section according to the position obtained by the position detecting section 5300.

Figure 76:
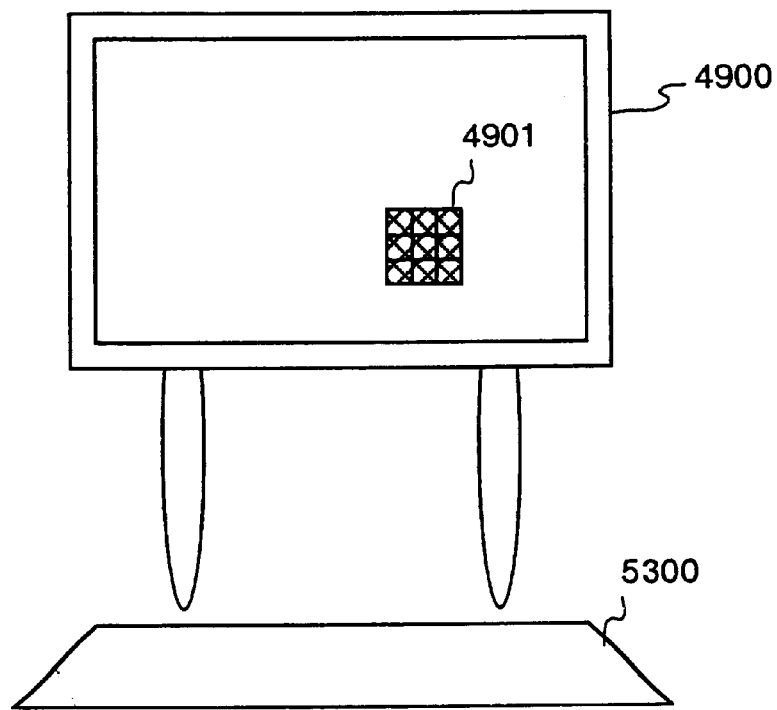
FIG. 76 is an appearance view showing the third example of the configuration of the display board system according to Embodiment 5 of the present invention.

FIG. 76 is an appearance view showing the third example of the configuration of the display board system. In the third example, sheet type of position detecting section (position detecting device) 5300 is provided therein so that a position of a person who enters a PID number standing in front of the display board system 4900 can be found out. As a position detecting method by this position detecting device 5300, various types of methods can be used. For example, a method for detecting a position with a pressure applied on a sheet surface as a pressure-sensitive sheet can be used.

In the display board system 4900, the position detecting section 5300 detects a position of a person (SX, SY), and the ten-key display position specifying section 5301 computes on which position of the input surface the ten-key should be displayed. As a method of deciding a position of a ten-key to be displayed to the position (SX, SY), various types of methods can be used. For example, the method described in the first configuration can be used. When the position of the ten-key to be displayed to the position (SX, SY) is decided, the ten-key 4901 is displayed on the decided display position as shown in FIG. 76. Thus, the ten-key 4901 for entry of a PID number is hidden behind the person 6000 who enters a PID number so as not to be seen from other persons because of the same principle having been described with reference to FIG. 72.

Figure 77:
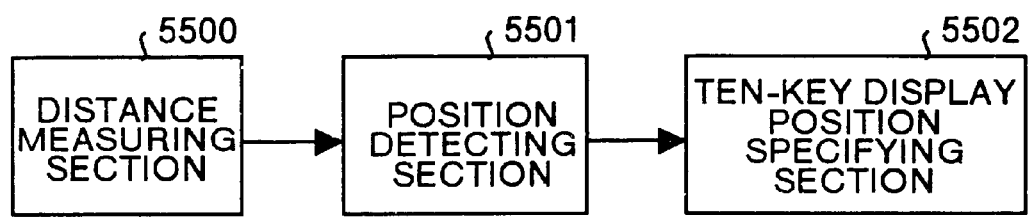
FIG. 77 is a block diagram showing a fourth example of the configuration of the display board system according to Embodiment 5 of the present invention.

FIG. 77 is a block diagram generally showing a fourth example of the configuration of the display board system according to Embodiment 5. This display board system comprises a coordinate-position inputting section (corresponding to the coordinate-position input device 102 in Embodiment 3) for detecting a position of a pointing body having pointed to an input surface (corresponding to the touch surface 201 in Embodiment 3) on the input surface and an image display section (corresponding to the PDP 101 in Embodiment 3) for displaying an image on a surface commonly used as the input surface. The display board system further comprises a plurality of distance measuring sections 5500 located in an array, a position detecting section 5501 for detecting a position of a person who enters a PID number according to the distance measured by the distance measuring sections 5500, and a ten-key display position specifying section 5502 for displaying a ten-key on the image display section according to the position obtained by the position detecting section 5501.

Figure 78:
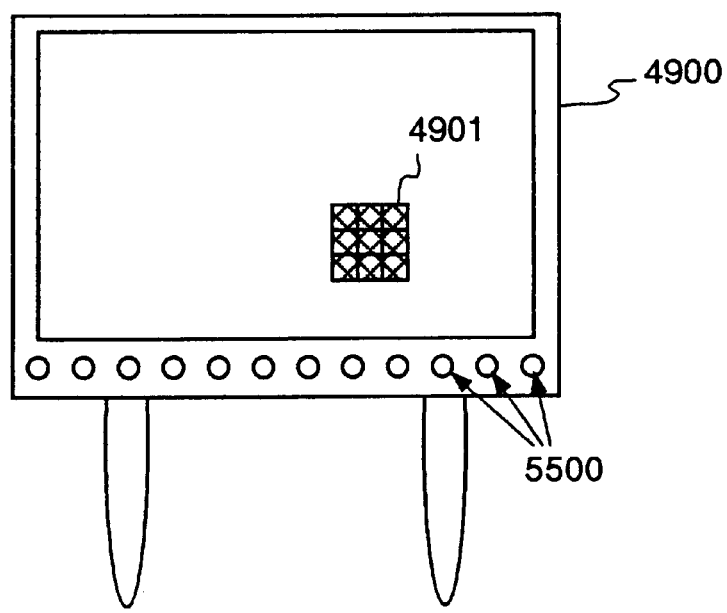
FIG. 78 is an appearance view showing the fourth example of the configuration of the display board system according to Embodiment 5 of the present invention.

FIG. 78 is an appearance view showing the fourth example of the configuration of the display board system. In the fourth example, the distance measuring section (an array with a plurality of distance measuring sensors) 5500 for measuring a distance up to an object extending in one-dimensional direction (a vertical direction to the input surface) by using ultrasonic waves are arranged in an array on the display board system 4900. With this feature, positional information (distance information) for a person standing in front of the display board 4900 can be obtained. The distance information obtained by the distance measuring section 5500 comprising a plurality of distance measuring sensors as described above is given to the position detecting section 5501, and the position detecting section 5501 identifies a position of a person who enters a PID number according to the distance information obtained from the distance measuring section 5500. As a method of identifying a position of a person who enters a PID number from the distance information obtained from the distance measuring section 5500, various types of methods can be used. For example, a position of the distance measuring sensor which has a shortest distance up to the object can be considered as a position (DX) of the person who enters a PID number.

When the position (DX) of the person is obtained as described above, on which position of the input surface from this position (DX) the ten-key should be displayed is computed by the ten-key display position specifying section 5502. As a method of deciding a position of a ten-key to be displayed to the position (DX), various types of methods can be used. For example, the method described in the first configuration can be used. When the position of the ten-key to be displayed to the position (DX) is decided, the ten-key 4901 is displayed on the decided display position as shown in FIG. 78. Thus, the ten-key 4901 for entry of a PID number is hidden behind the person 6000 who enters a PID number so as not to be seen from other persons because of the same principle described with reference to FIG. 72.

Figure 79:
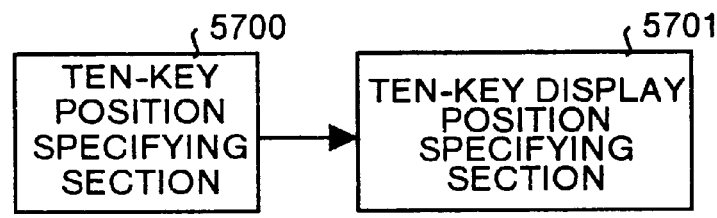
FIG. 79 is a block diagram showing a fifth example of the configuration of the display board system according to Embodiment 5 of the present invention.

FIG. 79 is a block diagram generally showing a fifth example of the configuration of the display board system according to Embodiment 5. This display board system comprises a coordinate-position inputting section (corresponding to the coordinate-position input device 102 in Embodiment 3) for detecting a position of a pointing body having pointed to an input surface (corresponding to the touch surface 201 in Embodiment 3) on the input surface and an image display section (corresponding to the PDP 101 in Embodiment 3) for displaying an image on a surface commonly used as the input surface. The display board system further comprises a ten-key position specifying section 5700 for specifying a position of a ten-key to be displayed, and a ten-key display position specifying section 5701 for displaying a ten-key on a position specified by the ten-key position specifying section 5700.

Figure 80:
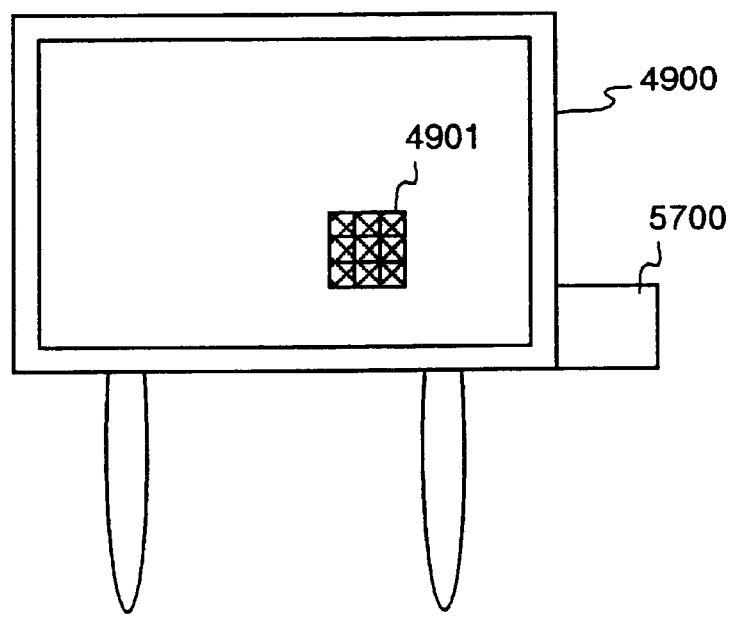
FIG. 80 is an appearance view showing the fifth example of the configuration of the display board system according to Embodiment 5 of the present invention.

FIG. 80 is an appearance view showing the fifth example of the configuration of the display board system. In the fifth example, the ten-key position specifying section 5700 for enabling entry-of a position where a ten-key is to be displayed is provided on the display board system 4900. A person who enters a PID number can specify on which part of an input screen the ten-key should be displayed by using this ten-key position specifying section 5700. As a method of specifying a position of a ten-key using the ten-key position specifying section 5700, various types of methods can be used. For example, methods of manually inputting coordinate of a position, or of displaying a thumbnail image to input a desired position by touching it can be employed.

Also in this fifth example of the configuration, an input window (a ten-key display specifying window) for specifying a position of a ten-key to be displayed with gesture or the like may be displayed on an input surface without using the ten-key position specifying section 5700.

Figure 81:
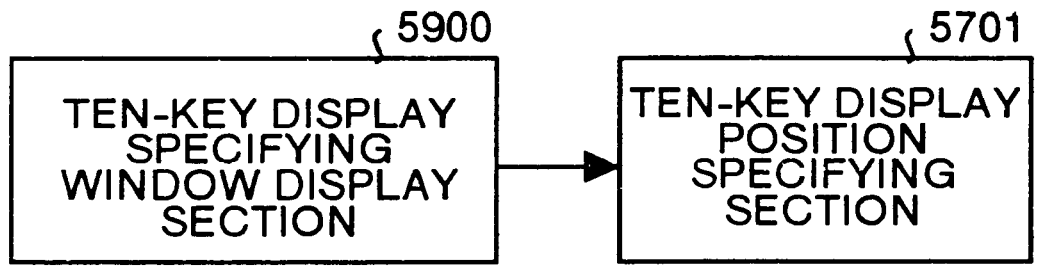
FIG. 81 is a block diagram showing configuration, for displaying an input window (a ten-key display specifying window) to specify a position where a ten-key is displayed on an entry surface, applicable in the display board system according to Embodiment 5 of the present invention.

FIG. 81 is a block diagram generally showing an example of configuration of a display board system which can display an input window (a ten-key display specifying window) for specifying a ten-key display position on an input surface. The display board system shown in FIG. 81 comprises a coordinate-position inputting section (corresponding to the coordinate-position input device 102 in Embodiment 3) for detecting a position of a pointing body having pointed to an input surface (corresponding to the touch surface 201 in Embodiment 3) on the input surface and an image display section (corresponding to the PDP 101 in Embodiment 3) for displaying an image on a surface commonly used as the input surface. The display board system further comprises a ten-key display specifying window display section 5900 for displaying a ten-key display specifying window for specifying a ten-key display position on the image display section, and a ten-key display position specifying section 5701 for displaying the ten-key on a specified position, when an operation of specifying a ten-key display position is performed to the ten-key display specifying window displayed on the image display section by the ten-key display specifying window display section 5900.

Figure 82:
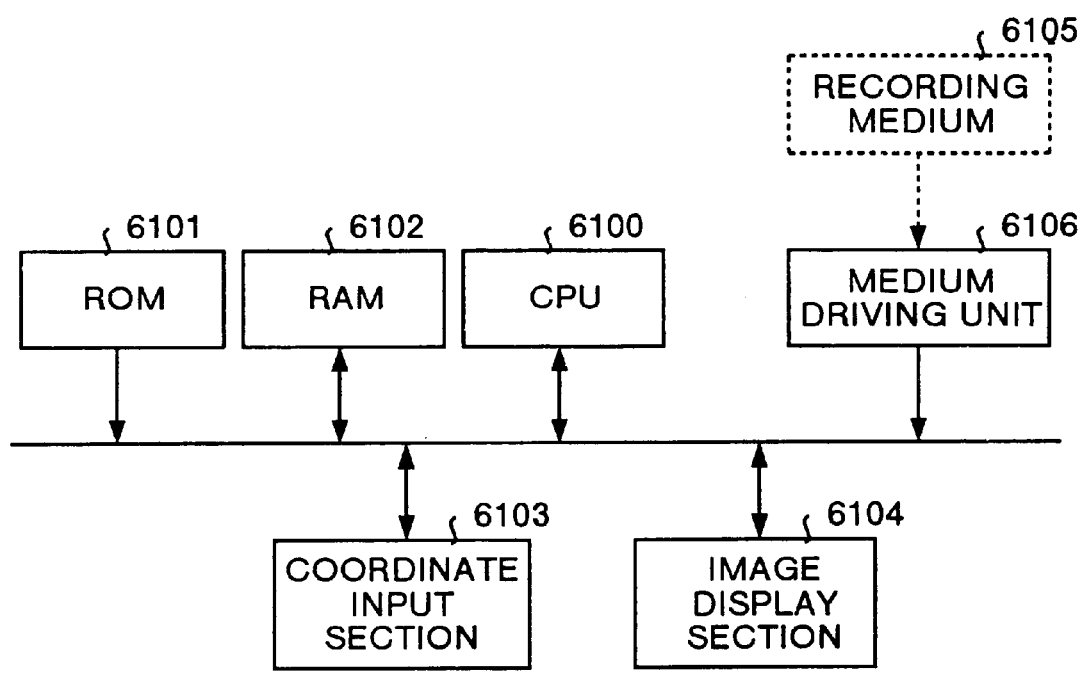
FIG. 82 is a block diagram showing hardware configuration of the display board system according to Embodiment 5 of the present invention.

FIG. 82 is a block diagram showing an example of hardware configuration of the display board system shown in any of the FIG. 69, FIG. 73, FIG. 75, FIG. 77, FIG. 79 and FIG. 81. As shown in FIG. 81, various types of processing in the display board system are realized by, for instance, a microcomputer or a DSP (digital signal processor) and software. More specifically, the display board system comprises at least a CPU 6100 for providing controls over the system as a whole, a ROM 6101 with control programs for the CPU 6100 or the like stored therein, a RAM 6102 used as a work area for the CPU 6100, a coordinate-position inputting section 6103, and an image display section 6104.

Herein the CPU 6100 has functions of the position detecting section 4801 and ten-key display position specifying section 4802 in FIG. 69, the measuring section 5100 and ten-key display position specifying section 5101 in FIG. 73, the position detecting section 5300 and ten-key display position specifying section 5301 in FIG. 75, the position detecting section 5501 and ten-key display position specifying section 5502 in FIG. 77, the ten-key position specifying section 5700 and ten-key display position specifying section 5701 in FIG. 79, or the ten-key display specifying window display section 5900 and ten-key display position specifying section 5701 in FIG. 81.

It should be noted that, the functions of the CPU 6100 described above can be provided in a form of, for example, a software package (more specifically, information recording medium such as a CD-ROM). Therefore, a medium driving unit 6106 for driving an information recording medium 6105 is provided in the example of FIG. 82.

In other words, the functions of the display board system in Embodiment 5 can be realized also by making a built-in processor system read a program recorded in the information recording medium such as a CD-ROM and making a microprocessor or the like execute ten-key display processing. In this case, the program (namely, the program used in the hardware system) for executing the processing described in Embodiment 5 can be provided in a state in which the program is recorded in a medium. An information recording medium with a program recorded therein is not limited to a CD-ROM, and any medium such as a ROM, a RAM, a flexible disk, and a memory card may be used. The program recorded in a medium is installed in a storage device incorporated in hardware system, for example, in a RAM 6102, with which this program is executed and the above mentioned processing function can be realized.

The program for realizing the processing described in Embodiment 5 may be provided not only in the form of a medium but also through communications (e.g., from a server).

It should be noted that the description for each configuration above has assumed the case shown in FIG. 72 as a method of deciding a display position, but if only one viewer is present there, a ten-key for inputting a PID number may be displayed on an extension between the viewer and a person who enters a PID number. If there are a plurality of viewers, various types of deciding method can be used according to each situation taking into consideration positions of the viewers and the person who enters a PID number, such that a ten-key for a PID number is displayed in a blind area from the viewers.

The processing described here is applicable not only to the display board system but also to various types of input device requiring entry of a PID number such as an ATM for bank and a device provided at the entrance of a building that recognizes and allows people to enter inside the building.

As described above, with the display board system according to Embodiment 5, a person who enters a PID number is photographed, a position of the person is detected according to the photographed image, and a ten-key is displayed according to the detected position, so that the ten-key can be displayed at the position hidden by the person, therefore, a possibility that a PID number being inputted is seen by other persons can be reduced.

Also a three-dimensional position of the person who enters a PID number is determined, and a ten-key is displayed according to the determined three-dimensional position, so that a display position of the ten-key can more accurately be decided.

When the person gets on a sheet type of position detecting device, the position of the person is detected, and a ten-key is displayed according to the detected position. Thus, for example, a position where the person stands on the floor in front of an input surface can be detected, therefore, a display position of the ten-key can more accurately be decided.

Furthermore, distance up to the object is measured, a position of the person is detected according to the measured value, and a ten-key is displayed according to the detected position, so that a display position of the ten-key can more accurately be decided.

Furthermore, a display position of a ten-key is specified, and the ten-key is displayed on the specified position. Thus, for example, a display position of the ten-key can manually be inputted, therefore, a display position of the ten-key can be decided according to situation.

Furthermore, a ten-key display specifying window for specifying a display position of a ten-key is displayed, and the ten-key is displayed on a position inputted in the ten-key display specifying window. Thus, a manual input device for specifying a display position of the ten-key can be displayed as software, therefore, a low-cost input device can be provided.

A display board system according to Embodiment 6 is applicable to the display board system according to Embodiment 3, and is used for easily generating a software keyboard and enabling insurance of security with a simple operation.

The display board system according to Embodiment 6 has a coordinate-position input device (corresponding to the coordinate-position input device 102 in Embodiment 3) provided on the surface of an image display unit (corresponding to the PDP 101 in Embodiment 3) and a signal control section. The signal control section has a touched area computing section, a touched position detecting section, a touched area determining section, a software keyboard generating section, and a drawing section. Herein, as described in Embodiment 3, the display surface and touch surface (writing surface) of a display board is formed with the image display unit and coordinate-position input device.

When the touch surface is touched with a fingertip or the like, the coordinate-position input device outputs signals corresponding to the touched area and touched position to the touched area computing section as well as to the touched position detecting section. The touched position detecting section detects coordinates of the point on the touch surface touched with the fingertip or the like from the signals received from the coordinate-position input device. At the same time, the touched area computing section computes a touched area (area of the touched portion) when the touch surface is touched with the fingertip or the like according to the signals received from the coordinate-position input device. The touched area determining section compares the touched area computed by the touched area computing section to a preset threshold value, and determines that a drawing or the like is created on the touch surface when the computed touched area is smaller than the threshold value. The drawing section executes drawing processing according to the touched area computed in the touched area computing section as well as to the coordinates detected in the touched position detecting section to display an image on the image display unit, and also inputs the coordinate (coordinate group) of the image displayed after being subjected to the drawing processing into a computer. When it is determined that the touched area exceeds the threshold value, the touched area determining section determines that the touch surface has been touched with, for instance, a palm, and the software keyboard generating section generates a software keyboard and displays it on the touched position of the image display unit in a size previously set.

By touching the touch surface with, for instance, a palm, a software keyboard can easily be displayed on the image display unit. By operating the displayed software keyboard in the same manner as a keyboard is operated, a user can easily execute various types of operation in the display board system. For example, the display board system can execute authentication processing on permission to access the system according to a PID number inputted through the software keyboard.

Figure 83:
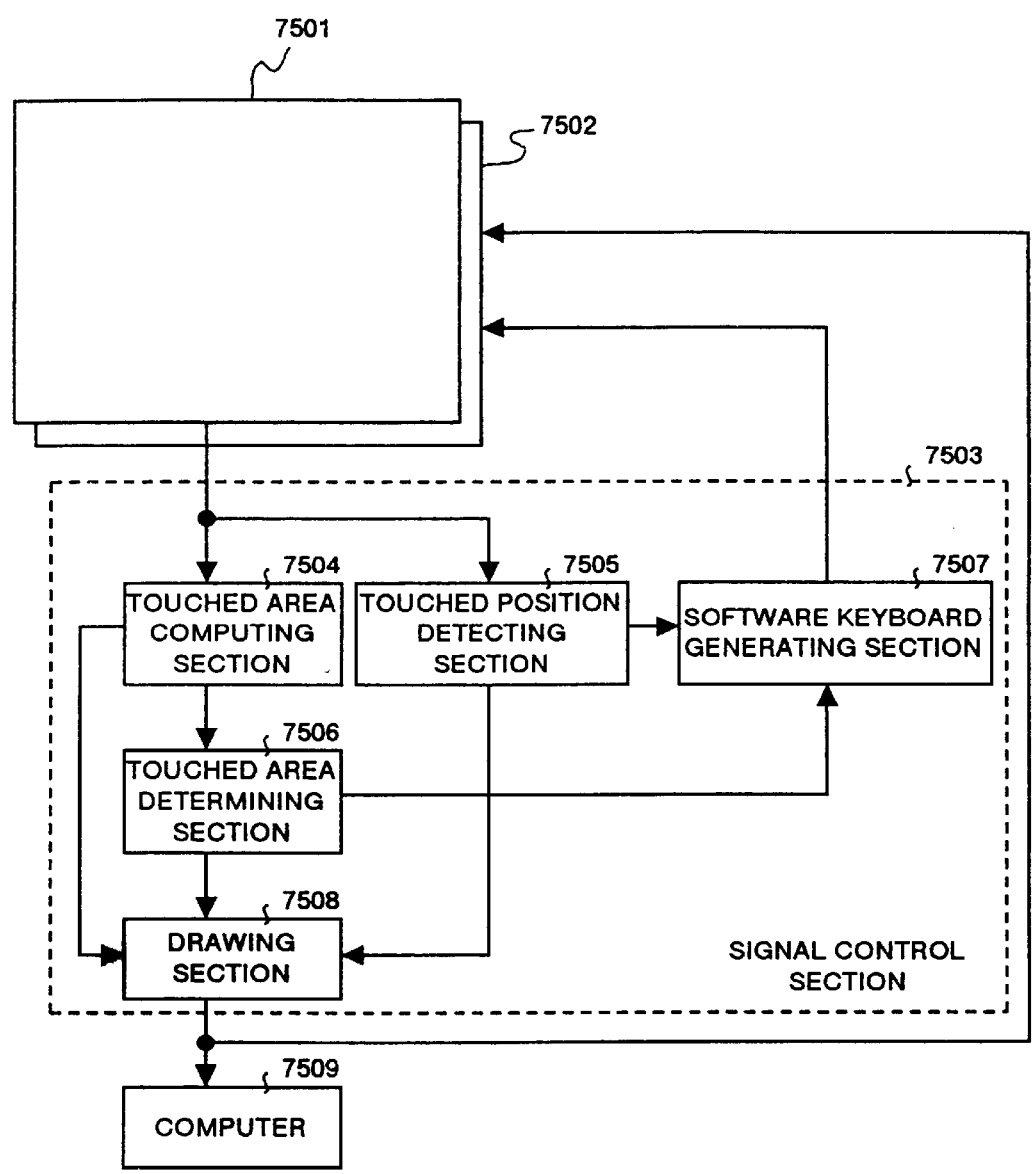
FIG. 83 is a block diagram showing a first example of the configuration of a display board system according to Embodiment 6 of the present invention.

FIG. 83 is a block diagram showing a first example of the configuration of a display board system according to Embodiment 6. As shown in FIG. 83, the display board system has a coordinate-position input device 7501 (corresponding to the coordinate-position input device 102 in Embodiment 3), an image display unit 7502 (corresponding to the PDP 101 in Embodiment 3), and a signal control section 7503. The signal control section 7503 has a touched area computing section 7504, a touched position detecting section 7505, a touched area determining section 7506, a software keyboard generating section 7507 and a drawing section 7508.

Figure 84:
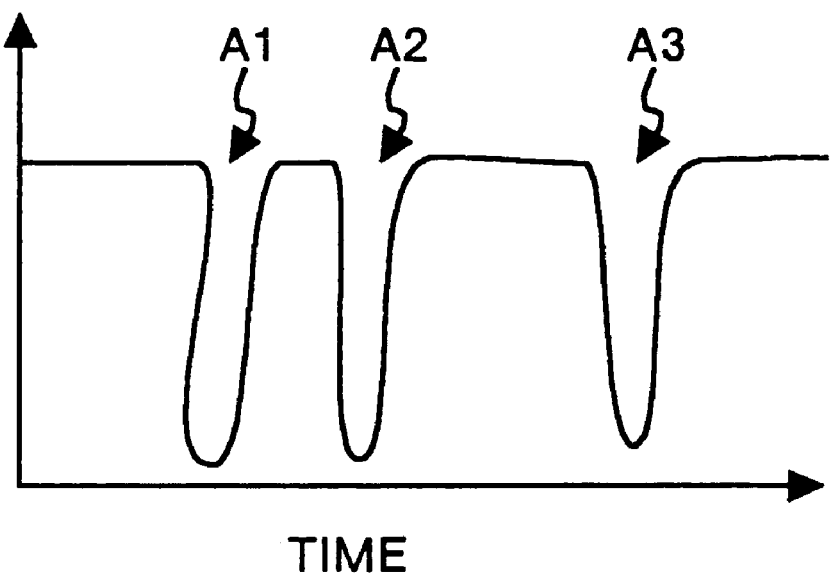
FIG. 84 shows a waveform outputted from a coordinate-position input device in the first example of the configuration of the display board system according to Embodiment 6 of the present invention.

When the touch surface is touched with a fingertip or a pen, the coordinate-position input device 7501 outputs a signal according to the touched area and touched position as shown in FIG. 84. In a screenful time-series signal, by integrating each time when the change is generated, an area of the portion on the touch surface where the fingertip touches can be computed. Then the touched area computing section 7504 computes each area of portions A1, A2, and A3 on the touch surface where the fingertip touches according to the screenful time-series signal outputted from the coordinate-position input device 7501. Then the touched position detecting section 7505 computes coordinates of portions A1, A2 and A3 from the screenful time-series signal outputted from the coordinate-position input device 7501. The touched area determining section 7506 compares the touched area computed by the touched area computing section 7504 with a preset threshold value. The software keyboard generating section 7507 generates, when it is determined in the touched area determining section 7506 that the touched area exceeds the threshold value, a software keyboard and displays it on some position of the image display unit 7502 corresponding to the touched position. The drawing section 7508 executes, when it is determined in the touched area determining section 7506 that the touched area is smaller than the threshold value, drawing processing according to the touched area and touched position on the touch surface, displays an image on the image display unit 7502, and also inputs coordinate (coordinate group) of the image displayed after being subjected to the drawing processing in the computer 7509.

Figure 85:
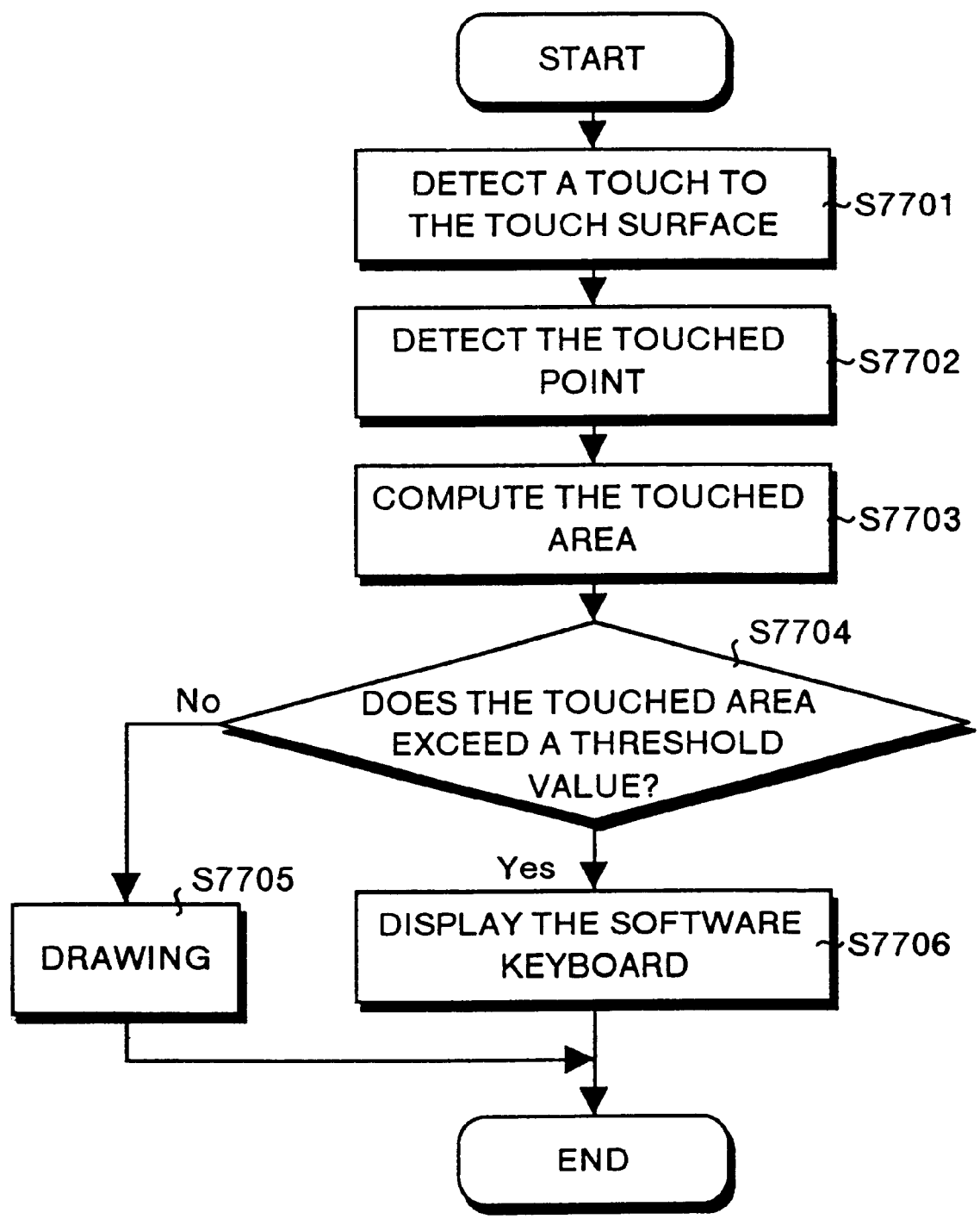
FIG. 85 is a flow chart of operations of the first example of the configuration of the display board system according to Embodiment 6 of the present invention.

Description is made for an operation when the touch surface of the display board system configured as described above is touched with the fingertip or the like with reference to the flow chart in FIG. 85. When the touch surface is touched with the fingertip or the like, the coordinate-position input device 7501 outputs signals corresponding to the touched area and touched position to the touched area computing section 7504 as well as to the touched position detecting section 7505 (step S7701).

The touched position detecting section 7505 detects coordinates of a position on the touch surface touched with the fingertip or the like from the signal received from the coordinate-position input device 7501 (step S7702). At the same time, the touched area computing section 7504 computes an area touched with the fingertip according to the signal received from the coordinate-position input device 7501 (step S7703).

The touched area determining section 7506 compares the touched area computed by the touched area computing section 7504 with the preset threshold value (step S7704), and determines that a graphic or the like is created on the touch surface when the computed touched area is smaller than the threshold value. In response to this determination, the drawing section 7508 executes drawing processing according to the touched area computed in the touched area computing section 7504 as well as according to the coordinates detected in the touched position detecting section 7505 to display an image on the image display unit 7502, and also inputs coordinate (coordinate group) of the image displayed after being subjected to the drawing processing to the computer 7509 (step S7705).

When it is determined that the touched area exceeds the threshold value, the touched area determining section 7506 determines that the touch surface has been touched with, for instance, a palm. In response to this determination, the software keyboard generating section 7507 generates a software keyboard and displays it on some position of the image display unit 7502 corresponding to the touched position in a size previously set (step S7706).

As described above, by touching the touch surface with, for instance, a palm, the software keyboard can easily be displayed on the image display unit 7502. By operating the displayed software keyboard in the same manner as that when a keyboard is operated, various types of operation can easily be executed.

In the first example of the configuration, description has been made for the case where a software keyboard in a certain size is generated in the software keyboard generating section 7507 and displayed on the image display unit 7502. However, the software keyboard generating section 7507 can also display the software keyboard to be displayed on the image display unit 7502 in a size specified by an operator. For example, when the user touches the touch surface with the palm, the software keyboard having a size corresponding to the touched area is generated in the software keyboard generating section 7507 and displayed on the image display unit 7502. As described above, by displaying the palm-sized software keyboard, the most easy-to-use-sized software keyboard can be displayed.

Next description is made for an example of a security function by using the software keyboard displayed on the image display unit 7502 as described above.

Figure 86:
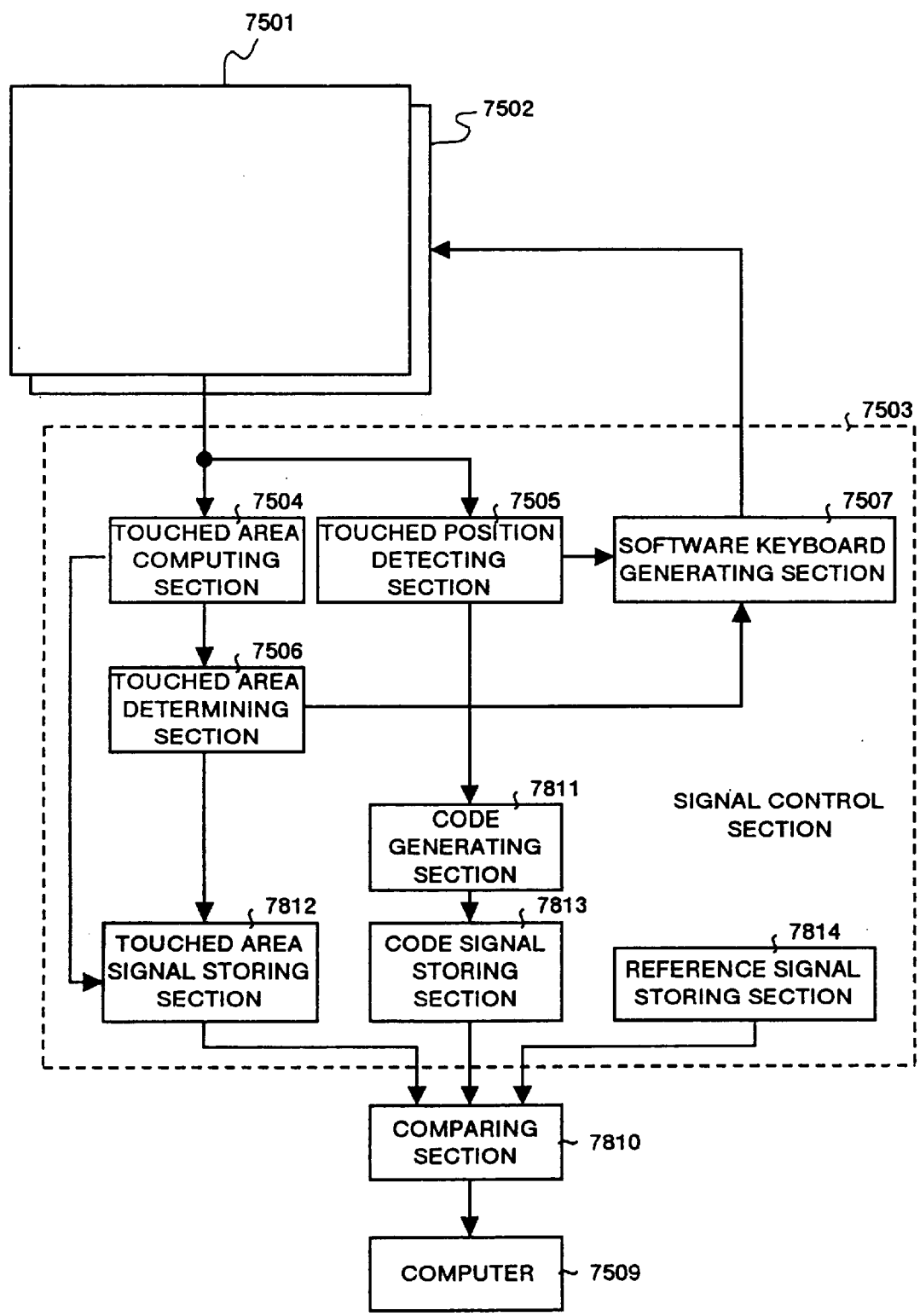
FIG. 86 is a block diagram showing a second example of the configuration of the display board system according to Embodiment 6 of the present invention.

FIG. 86 is a block diagram showing a second example of the configuration of the display board system. As shown in FIG. 86, the display board system has a coordinate-position input device 7501, an image display unit 7502, a signal control section 7503, and a comparing section 7810. The signal control section 7503 has a touched area computing section 7504, a touched position detecting section 7505, a touched area determining section 7506, a software keyboard generating section 7507, and in addition, a code generating section 7811, a touched area signal storing section 7812, a code signal storing section 7813 and a reference signal storing section 7814.

The code generating section 7811 converts a coordinate signal of a touched position on the touch surface detected in the touched position detecting section 7505 to a code signal according to a preset table. The touched area signal storing section 7812 successively stores, when a touched area computed in the touched area computing section 7504 is smaller than the threshold value, the computed touched areas therein. The code signal storing section 7813 successively stores code signals converted in the code generating section 7811. The reference signal storing section 7814 stores a series of code signals for the users previously authorized to use the display board system and also stores a series of touched areas each as reference signals. The comparing section 7810 executes authentication processing by comparing an input signal consisting of the touched area signal series stored in the touched area signal storing section 7812 and the code signal series stored in the code signal storing section 7813 with the reference signals stored in the reference signal storing section 7814.

Figure 87:
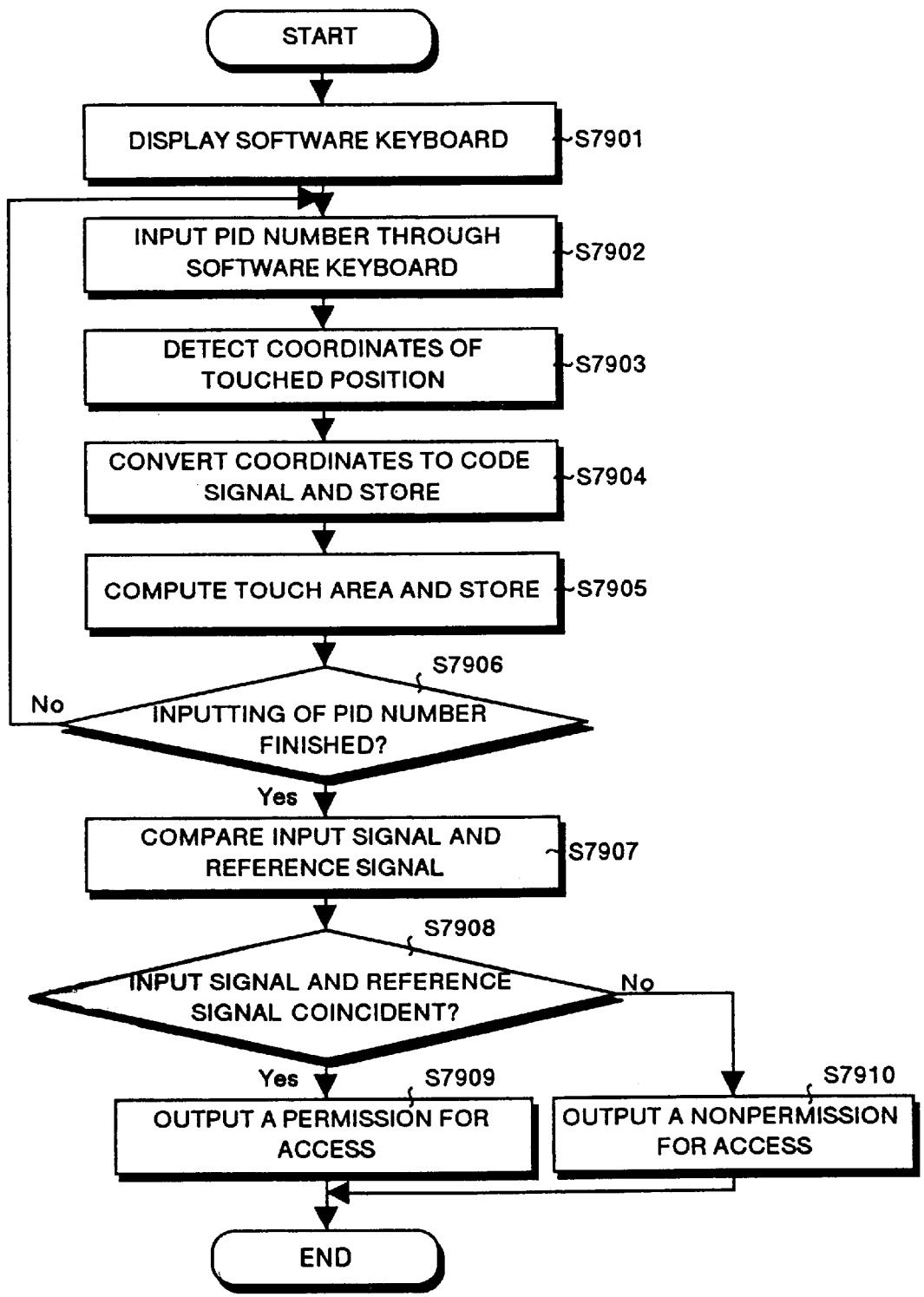
FIG. 87 is a flow chart of operations of the second example of the configuration of the display board system according to Embodiment 6 of the present invention.

Description is made for an operation of the display board system configured as described above with reference to the flow chart in FIG. 87. As described in the first example of the configuration, when the software keyboard is displayed on the image display unit 7502 (step S7901), the user touches the touch surface corresponding to the software keyboard with his or her fingertip or the like to enter a PID number or a password (step S7902). Herein when a ten-key is displayed as a software keyboard, a PID number is inputted, while a password is inputted when a full key is displayed.

The touched position detecting section 7505 detects coordinates of each touched position on the coordinate-position input device 7501 and sends the coordinates to the code generating section 7811 (step S7903). The code generating section 7811 converts the received coordinates into code signals and successively stores the code signals in the code signal storing section 7813 (step S7904).

On the other hand, the touched area computing section 7504 computes a touched area when the user touches the touch surface with his or her fingertip to enter the PID number or the like, and stores the touched area in the touched area signal storing section 7812 (step S7905).

When this operation of inputting a PID number or a password is finished (step 7906), the comparing section 7810 reads out the code signal series stored in the code signal storing section 7813 and the touched area signal series stored in the touched area signal storing section 7812, and compares the input signals consisting of the read-out code signal series and the touched area signal series with the reference signals consisting of the code signal series of the users authorized to access the computer system and the touched area signal series each previously registered in the reference signal storing section 7814 (step S7907). As this comparing method, a simple template matching can be used for comparison of code signals, and Viterbi decoding based on DP matching and HMM and a neural network technology can be used for comparison of signals in touched area series because the signals in the touched area series are the signals changing with time.

As a result of this comparison, when the reference signal coincident with the input signal is registered in the reference signal storing section 7814, it is determined that the user has been registered, and permission to the user to access the system is sent to the computer 7509 (steps S7908 and S7909). When the reference signal coincident with the input signal is not registered in the reference signal storing section 7814, inhibition to access the system is sent to the computer 7509 (steps S7908 and S7910). The computer 7509 displays the received result on the image display unit 7502.

As described above, determination is made as to whether the user is an authorized person or not according to the code signal series as well as according to the touched area signal series indicating a touched position when the PID number and password are inputted from the software keyboard. Therefore, high-reliability authentication for accessing the system can be verified without user's any particular operation required for authentication.

In the second example of the configuration, description has been made for the case where access to the system should be permitted or not depending on the PID number and password inputted from the software keyboard. However, authentication processing as to whether permission to access the system is given or not may be performed according to handwriting of user's signature.

Figure 88:
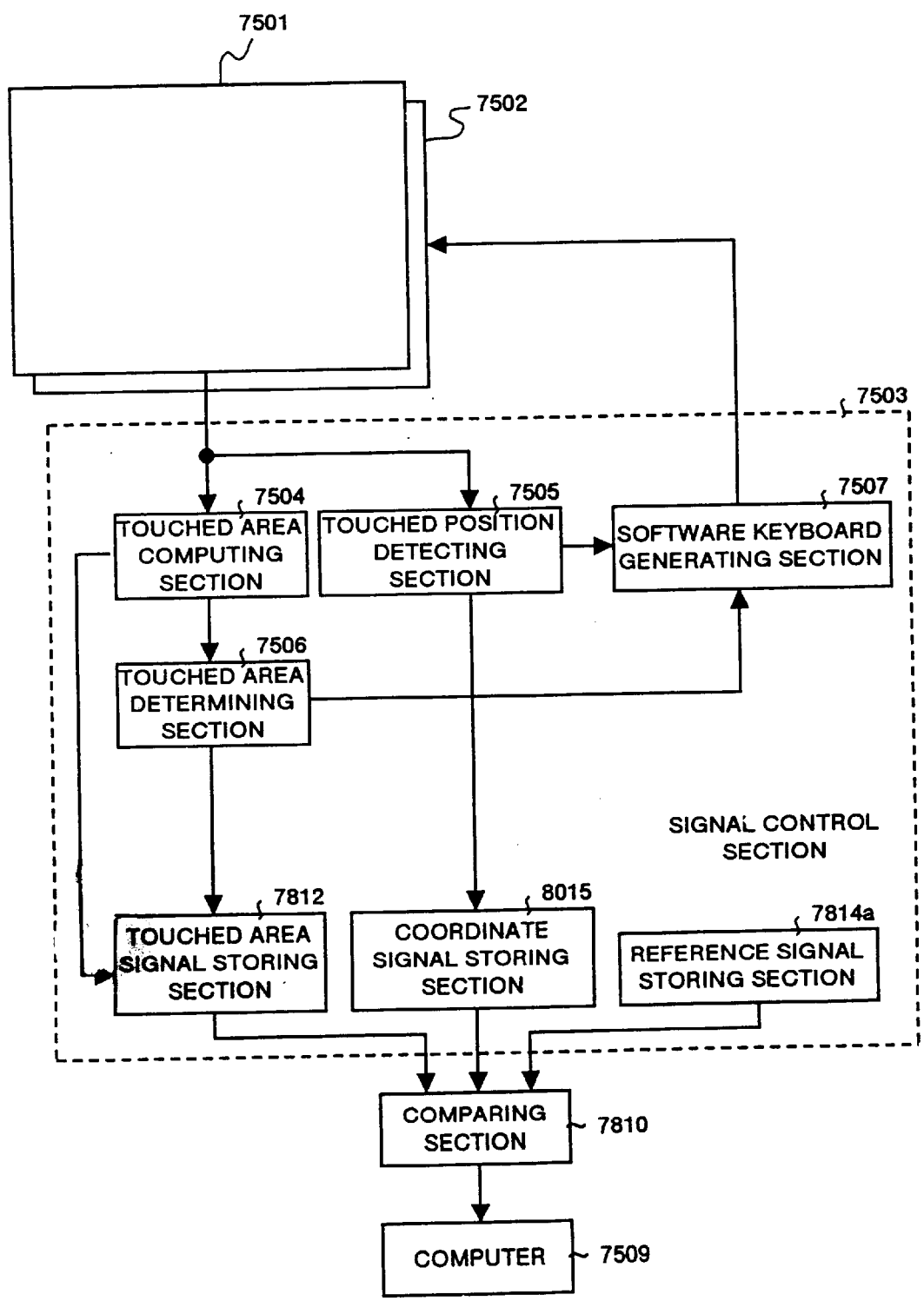
FIG. 88 is a block diagram showing a third example of the configuration of the display board system according to Embodiment 6 of the present invention.

FIG. 88 is a block diagram showing a third example of the configuration of the display board system. The display board system according to this third configuration performs authentication processing as to whether permission to access the system is given or not according to the user's handwriting. The signal control section 7503 of the display board system as shown in FIG. 88 has a touched area computing section 7504, a touched position detecting section 7505, a touched area determining section 7506, a software keyboard generating section 7507, a touched area signal storing section 7812, a coordinate signal storing section 8015, and a reference signal storing section 7814a.

The coordinate signal storing section 8015 stores therein coordinates of a touched position on the touch surface detected by the touched position detecting section 7505. The reference signal storing section 7814a registers therein a coordinate signal series obtained by previously measuring handwritings of users permitted to access the system and a touched area series as reference signals.

Figure 89:
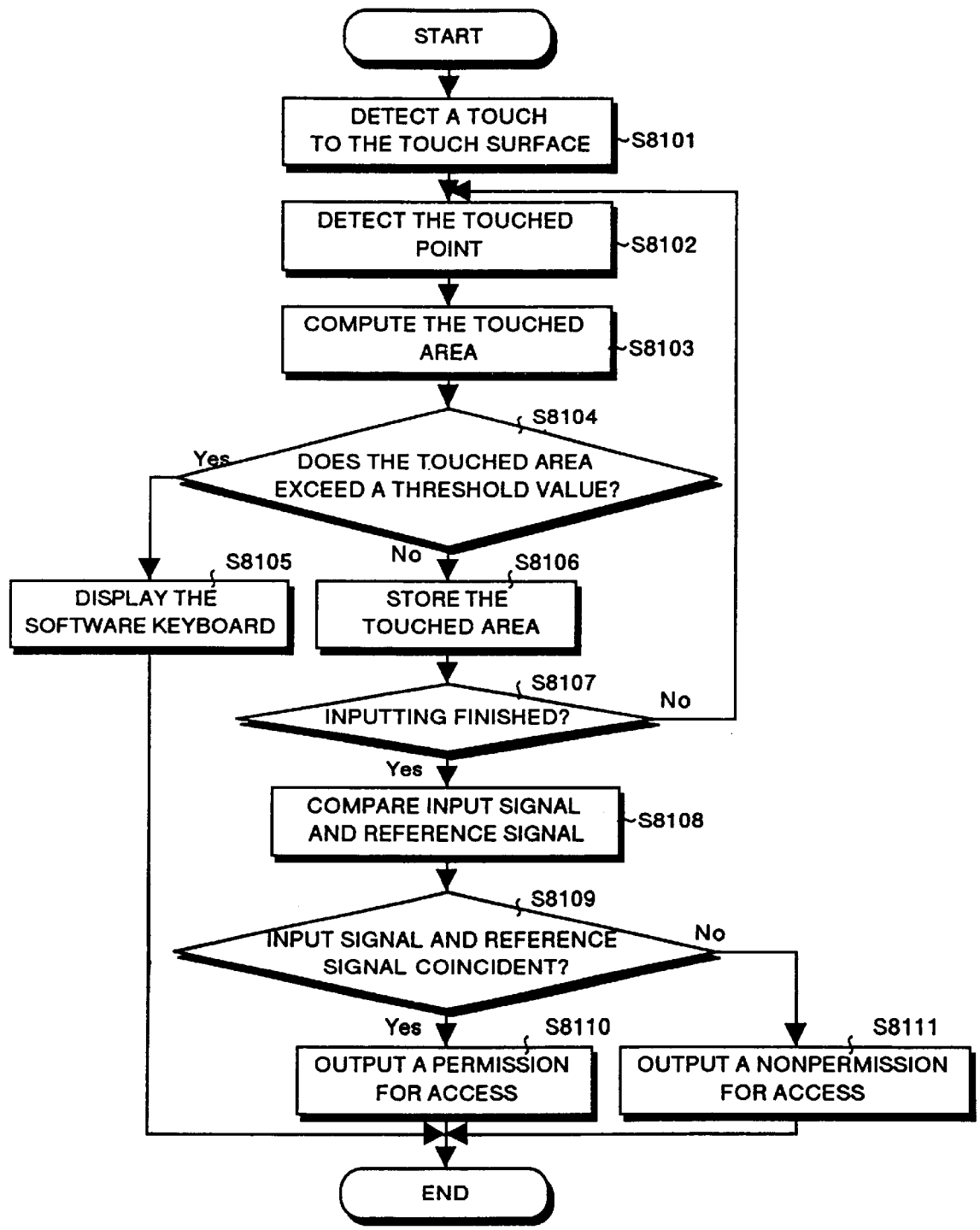
FIG. 89 is a flow chart of operations of the third example of the configuration of the display board system according to Embodiment 6 of the present invention.

Description is made for an operation of the display board system configured as described above with reference to the flow chart in FIG. 89. When the user touches the touch surface with his or her fingertip or the like, the coordinate-position input device 7501 outputs signals corresponding to the touched area and touched position to the touched area computing section 7504 as well as to the touched position detecting section 7505 (step S8101).

The touched position detecting section 7505 detects coordinates of a position on the touch surface touched with the fingertip or the like from a signal received from the coordinate-position input device 7501 and stores the values in the coordinate signal storing section 8015 (step S8102). At the same time, the touched area computing section 7504 computes an area on the touch surface touched with the fingertip according to the signal received from the coordinate-position input device 7501 (step S8103).

The touched area determining section 7506 compares the touched area computed by the touched area computing section 7504 with the preset threshold value (step S8104), and determines that the user has touched the touch surface with, for instance, a palm when the computed touched area is larger than the threshold value. In response to this determination, the software keyboard generating section 7507 generates a software keyboard and displays the keyboard on a position of the image display unit 7502 corresponding to the touched position (steps S8104 and S8105).

On the other hand, when the computed touched area is smaller than the threshold value, the touched area determining section 7506 determines that the user has created some graphics on the touch surface, and the touched areas are successively stored in the touched area signal storing section 7812 (steps S8104 and S8106).

When inputting to the touch surface is finished, the comparing section 7810 reads out the coordinate signal series stored in the coordinate signal storing section 8015 and the touched area signal series stored in the touched area signal storing section 7812. Then the comparing section 7810 compares the input signals consisting of the read-out coordinate signal series and touched area signal series with the reference signals consisting of the coordinate signal series indicating handwriting of user's signature authorized to access the computer system and the touched area signal series each previously registered in the reference signal storing section 7814a (steps S8107 and S8108).

As a result of this comparison, when the reference signal coincident with the input signal is registered in the reference signal storing section 7814a, it is determined that the user has been registered, and permission to the user to access the system is sent to the computer 7509 (steps S8109 and S8110). On the other hand, when the reference signal coincident with the input signal is not registered in the reference signal storing section 7814a, inhibition to access the system is sent to the computer 7509 (steps S8109 and S8111). The computer 7509 displays the received result on the image display unit 7502.

As described above, determination is made as to whether the user is an authorized person or not according to the user's signature, therefore, high-reliability authentication for accessing the system can be verified with a simple operation.

Figure 90:
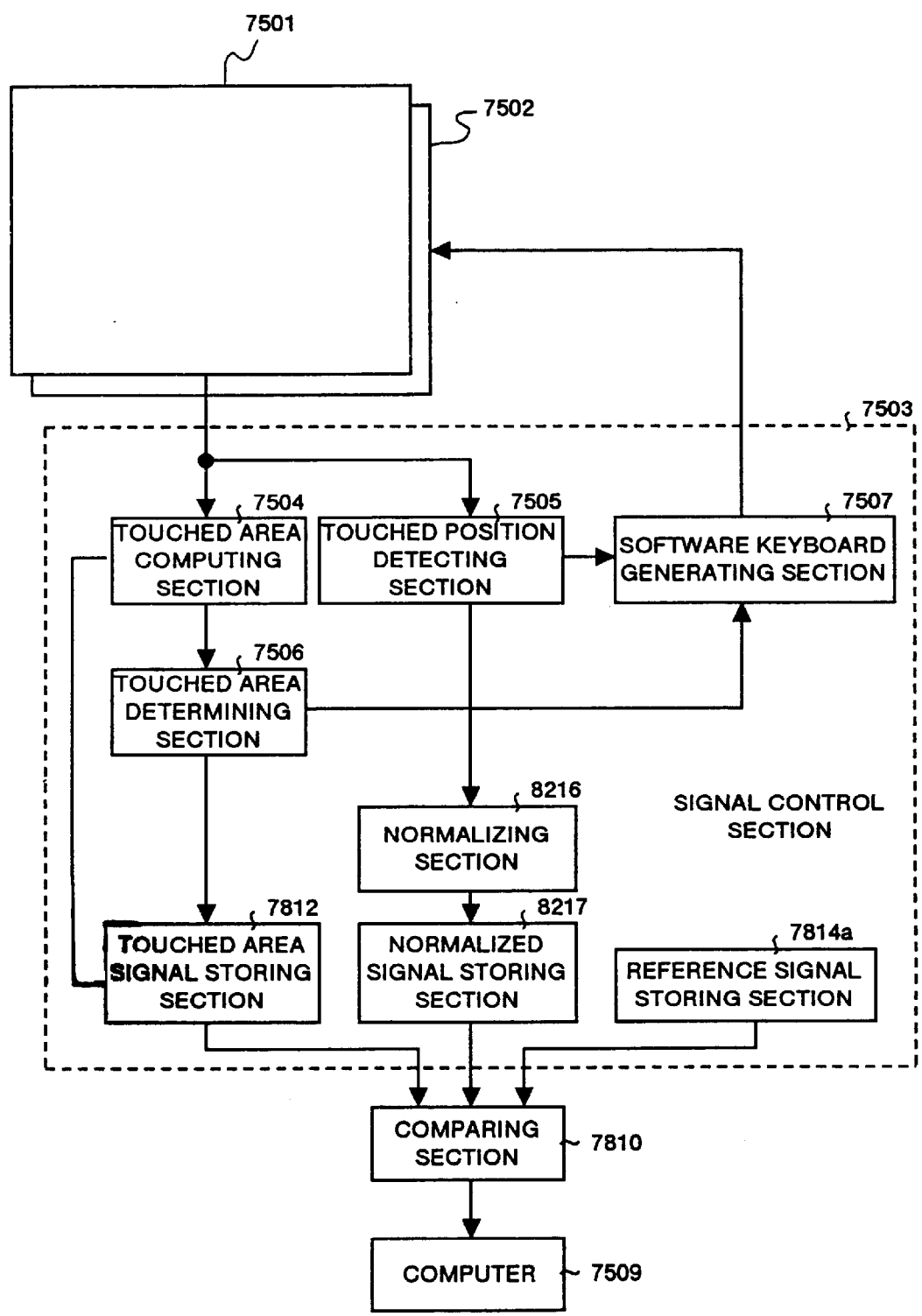
FIG. 90 is a block diagram showing a fourth example of the configuration of the display board system according to Embodiment 6 of the present invention.

In the third example of the configuration, the coordinate signal series for handwriting of user's signature detected in the touched position detecting section 7505 is stored in the coordinate signal storing section 8015. Then the input signal consisting of the coordinate signal series stored in the coordinate signal storing section 8015 and the touched area signal series stored in the touched area signal storing section 7812 are compared with the reference signal registered in the reference signal storing section 7814a. However, as shown in the block diagram (the fourth example of the configuration) in FIG. 90, a normalizing section 8216 and a normalized signal storing section 8217 may be provided instead of the coordinate signal storing section 8015, and a coordinate signal series for handwriting of user's signature detected in the touched position detecting section 7505 may be normalized in the normalizing section 8216 and stored in the normalized signal storing section 8217.

In this case, the input signal consisting of the normalized signal series of the coordinate signal stored in the normalized signal storing section 8217 and the touched area signal series stored in the touched area signal storing section 7812 is compared with the reference signal consisting of a normalized series of coordinate signals showing handwritings of signatures of the users authorized to access the computer system and the touched area series each previously stored in the reference signal storing section 7814*a*. As described above, by normalizing a coordinate signal of a handwriting of a user's signature detected in the touched position detecting section 7505, the user can make a signature of an arbitrary size, which allows convenience to be enhanced.

Figure 91:
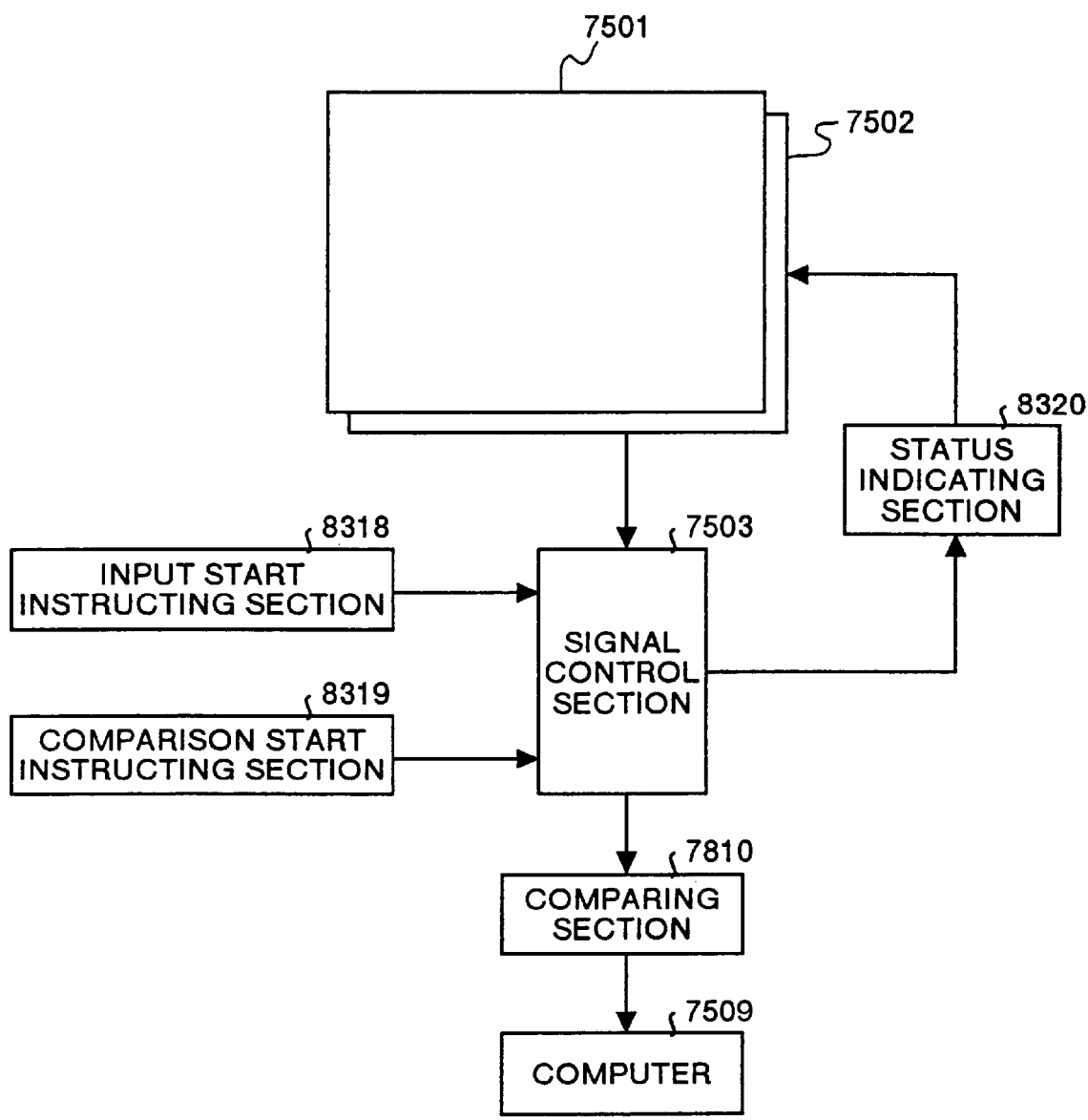
FIG. 91 is a block diagram showing a fifth example of the configuration of the display board system according to Embodiment 6 of the present invention.

As for each configuration for realizing the security function, as shown in the block diagram (the fifth example of the configuration) in FIG. 91, an input start instructing section 8318 for inputting an input start instruction to the signal control section 7503 and a comparison start instructing section 8319 for inputting a comparison start instruction thereto may be provided therein. As a result, when a PID number or a signature is to be inputted, a PID number or the like is inputted according to an input start instruction from the input start instructing section 8318, and when the PID number or the like is to be verified, an operation of comparison can be started according to the comparison start instruction inputted from the comparison start instructing section 8319, so that a PID number or the like can be more accurately verified. A physical switch or a switch like a software keyboard displayed on the image display unit 7502 can be used as the input start instructing section 8318 and the comparison start instructing section 8319.

When a PID number and a password are to be inputted, a touch number counter may be used as the input start instructing section 8318 and the comparison start instructing section 8319. As described above, when the touch number counter is used, the touch number counter is reset to "0" when the displayed software keyboard is first touched, an input start instruction is sent to the signal control section 7503. Then, a number of touches is counted with the touch number counter each time when the user touches the software keyboard, and when the counted value reaches a certain number of times prespecified according to a PID number and a password, a comparison start instruction is sent to the signal control section 7503. As described above, a number of input times of a PID number and a password can also be confirmed.

When handwriting of a user's signature is to be inputted, a timer for measuring an input time may be used as the input start instructing section 8318 and the comparison start instructing section 8319. In this case, when a user touches the coordinate-position input device 7501 to start signing, the time measured by the timer is reset to "0" and the measurement is started, and an input start instruction is sent to the signal control section 7503. When a prespecified period of time is over, a comparison start instruction is sent to the signal control section 7503. As described above, even if a number of characters are not certain like in the case of authentication by a signature, an input operation of a signature and a comparing operation can be performed with stability.

A status indicating section 8320 confirms an input processing standby status before an input start instruction is sent from this input start instructing section 8318 to the signal control section 7503, an input processing start status after the input start instruction is sent to the signal control section 7503, a comparison processing status during comparison operation after a comparison start instruction is sent from the comparison start instructing section 8319, and a comparison operation end status. The confirmed status can be displayed on the image display unit 7502. With this feature, a user can accurately recognize each of the processing statuses, which allows convenience to be enhanced.

As described above, with the display board system according to Embodiment 6, a software keyboard is generated according to a touched area obtained by a user touching with a fingertip or the like on a touch surface formed with the image display unit and coordinate-position input device, and the software keyboard is displayed on a position of the image display unit corresponding to the touched position, so that the software keyboard can easily be displayed.

Furthermore, by displaying a software keyboard in a size according to a size of a touched area obtained by a user touching the touch surface with a fingertip or the like, an arbitrary-sized software keyboard can be displayed, which allows convenience to be enhanced.

In addition, by comparing a code signal series as well as a touched area signal series of coordinates of a touched position when a user touches an input surface with a fingertip or the like with a reference signal, determination can be made as to whether the user is an authorized person or not according to the PID number and password inputted through the software keyboard. Therefore, a high-reliability authentication for accessing the system can be verified without any particular operation by the user required for authentication.

Furthermore, by comparing a coordinate signal series as well as a touched area series when a user touches a touch surface with a fingertip or the like with a reference signal, authentication for accessing the system can be verified according to handwriting of a user's signature, and high-reliability authentication can be performed.

In addition, by normalizing a coordinate signal series when a user touches a touch surface with a fingertip or the like, an arbitrary-sized signature can be used, which allows convenience to be enhanced.

Furthermore, by outputting instruction for inputting data is started through a touch surface or instruction for starting the comparison processing, a PID number or the like can more accurately be recognized. This input start instruction and comparison start instruction are executed with a touch number counting unit for counting a number of times the touch surface is touched or an input time measuring unit for measuring an input time, so that instructions can simply yet accurately be performed.

Furthermore, by displaying a status of inputting data into the touch surface or a status of comparison processing on an image display unit, a user can accurately recognize processing statuses, which allows convenience to be enhanced.

Each processing in Embodiments 1 to 6 described above can be realized by executing a previously prepared program by a computer. This rogram is recorded in a computer-readable recording medium such as a hard disk, a floppy disk, a CD-ROM, MO, and a DVD, and is executed by reading out from the recording medium by the computer. Furthermore, this program may also be provided through the recording medium as described above or alternately through a network or broadcasting.

As described above, with the present invention, an image of a pointing body inserted into an entry area is picked up by at least two image pickup elements, positions where images of the pointing body are formed on the image pickup elements is obtained according to each output from the image pickup elements respectively, and coordinates of a position of the pointing body are identified by using the computed imaging positions. Therefore, coordinates of a position of an entry area pointed using an arbitrary pointing body such as a fingertip or an ordinary pen can be identified without using a particular pointing body, which allows operability of the coordinate-position inputting/detecting device to be enhanced.

With the present invention, light is emitted from the light emitting unit into the entry area, an image of the pointing body illuminated by the light emitted from the light emitting unit is picked up by at least two image pickup elements, positions where images of the pointing body are formed on the image pickup elements are computed according to each output from the image pickup elements, and coordinates of the position of the pointing body are identified by using the computed imaging positions. Therefore, coordinates of a position of an entry area pointed using an arbitrary pointing body such as a fingertip or an ordinary pen can be identified without using a particular pointing body, which allows operability of the coordinate-position inputting/detecting device to be enhanced.

With the present invention, the light emitting unit and image pickup devices are so placed that the direction of the light emitted from the light emitting unit is substantially the same as the direction from which the pointing body is viewed from each of the image pickup elements. Therefore, the light emitted from the light emitting unit does not directly enter the image pickup elements, and also shadow is not generated on the pointing body as much as possible, which allows an image of a pointing body to accurately be picked up.

With the present invention, there is provided an incident light preventing unit for preventing the light emitted from the light emitting unit from directly entering into each of the image pickup elements. Therefore the light emitted from the light emitting unit does not directly enter into the image pickup elements, which allows malfunction of image pickup element to be prevented.

With the present invention, the light emitting unit comprises at least a light source and a mirror. Therefore, the light emitted by the light source can be reflected by the mirror and diffused along the entry area, so that, a light that covers the entire entry area can be emitted from the light emitting unit.

With the present invention, the angle of the light emitted by the light source can be changed by operating the mirror. Therefore, when the coordinate-position inputting/detecting device is provided, for instance, on the front surface of a display, adjustment is possible so that light emitted from light emitting unit is parallel to a display surface.

With the present invention, light reflected by a mirror is received by a light receiving element, and the angle of the mirror is changed according to intensity of the light received by the light-receiving element. Therefore, when the coordinate-position inputting/detecting device is provided, for instance, on the front surface of a display, the work for adjusting the light emitted from light emitting unit so as to be parallel to a display surface can be simplified.

With the present invention, reflection preventing means prevents light emitted from light emitting means from its being reflected, so that it is possible to prevent scattered light from its entering image pickup elements, which allows malfunction of an image pickup element to be prevented.

With the present invention, when coordinates of the same position are obtained continuously then it is determined that the coordinates are obtained due to dust or something, therefore the coordinates of this position are not stored in the storing unit and also are not outputted to an external device. Therefore, it is possible to prevent coordinates of the position obtained due to dust or something from its being outputted to an external device.

With the present invention, optical distortion of an image of a pointing body picked up by each of image pickup elements is electrically corrected, so that higher quality of an image of a pointing body can be obtained.

With the present invention, when a plurality of pointing bodies each with a different pattern provided thereto are inserted into the entry area, patterns can be recognized according to each output from the image pickup elements, which allows an entry operation concurrently using a plurality of pointing bodies to be carried out.

With the present invention, width of the pointing body is determined according to images of the pointing body picked up by image pickup elements, thus the width of the pointing body can easily be computed.

With the present invention, the coordinates of a position of a pointing body identified by coordinate-value identifying unit is corrected by using the width of the pointing body identified by width identifying unit, which allows coordinates of an accurate position to be computed.

With the present invention, image of an entry area previously picked up by each of image pickup elements is stored as a reference image, images of the entry area picked up afterward by each of the image pickup elements are extracted. Then, a difference between the corresponding reference images and images of the pointing body inserted into the entry area obtained by the corresponding image pickup elements is extracted. From this difference, a position in the image of each of the image pickup elements where an image of the pointing body is formed is computed and coordinates of the position of the pointing body are obtained using the computed positions of the pointing body. Therefore, coordinates of a position of an entry area pointed using an arbitrary pointing body such as a fingertip or an ordinary pen can be identified without using a particular pointing body, which allows operability of the coordinate-position inputting/detecting device to be enhanced.

With the present invention, image of the entry area is picked up by two-dimensional image pickup elements, which allows coordinates of a three-dimensional position of a pointing body to be computed.

With the present invention, a reference image consists of an image only of a background plate, so that an image of only a pointing body can easily be extracted from an image with the background plate and the pointing body included therein.

With the present invention, a reference pattern can be removed from an image with a background plate and the pointing body included therein according to the reference image. Therefore, an image of only a pointing body can easily be extracted.

With the present invention, an area photographable by the image pickup element is restricted by an area restricting unit so that the area is adjusted to the entry area. Therefore, an image pickup element may not be affected by noise such as interference light.

With the present invention, when coordinates of the same position are obtained continuously then it is determined that the coordinates are obtained due to dust or something. In such a case the coordinates of this position are not stored in the memory and also are not outputted to an external device. As a result, it is possible to prevent coordinates of the position obtained due to dust or something from its being outputted to an external device With the present invention, by deciding each image of an entry area used to compute coordinates of a position abandoned by updating means as each new reference image, dust existing on the entry area is taken in as a portion of a reference image. Therefore, it is prevented that coordinates of a position of dust are disadvantageously computed.

With the present invention, the coordinate-position inputting/detecting device is provided in the front surface of a display unit for displaying characters and images, and a display surface and a writing surface of a display board are formed with the display unit and coordinate-position inputting/detecting device. Therefore, viewability of the display unit and operability as well as reliability of the system can be improved.

With the present invention, the coordinate-position inputting/detecting device is provided in the front surface of a display unit for displaying thereon characters and images, and a display surface and a writing surface of the display board are formed with the display unit and coordinate-position inputting/detecting device, therefore, viewability of the display unit and operability as well as reliability of the system can be improved. Furthermore, the display board system comprises a frame unit having a holding section for holding a display surface and a writing surface of the display board at a specified height. A printer accommodating section accommodates the printer therein, and a control unit accommodating section accommodates the control unit therein. The control unit accommodating section, the printer accommodating section, and the holding section are arranged in the vertical direction in this order from the bottom, and as a result of that, transport and installation of the system can easily be carried out, which allows adaptability for handling of the system to be improved. Namely, downsizing and integration of the system as a whole can be achieved, and also adaptability for handling, operability and reliability can be improved.

With the present invention, because a plasma display is used as a display unit, in addition to the above mentioned effects that viewability of a display unit and operability as well as reliability of the system can be improved, optimizations of the system can be performed by making use of characteristics of the plasma display that makes a thickness of a display unit thinner, has high brightness as well as a wide viewing angle, and can smoothly reproduce moving pictures.

With the present invention, a keyboard placement section for placing a keyboard connected to a personal computer is provided at a position in the upper side of the printer accommodating section and in the lower side of the holding section of a frame unit. Therefore, adaptability for handling of the system can be improved.

With the present invention, an angle adjusting unit for adjusting an angle of a display surface and a writing surface of the display board is provided in a holding section. Thus, incoming disturbance light to a display unit (display surface), especially, light from lighting equipment such as a fluorescent tube on a ceiling can be prevented. This allows viewability of the display unit, operability for entry, and adaptability for handling of the system to be improved.

With the present invention, a plurality of connecting terminals for connecting various types of information equipment and AV equipment such as a digital camera, a DVD player, and video equipment are provided in a display unit and is usable as a large-sized screen monitor, therefore, it is possible to provide a display board system enabling connection and operation of various types of information equipment and AV equipment without a computer. In addition, it is possible to make use of a display board system at any occasion, which allows general versatility of the display board system to be improved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A coordinate position inputting/detecting device comprising:
at least two image pickup elements provided with a prespecified space therebetween on a peripheral section of an entry area including a plane, the at least two image pickup elements each providing a pointing body monitoring output indicating a two-dimensional area of each of the at least two image pickup elements receiving an illuminated image of a pointing body inserted into said entry area and moved therein to perform an entry operation;
coordinate-value means for computing positions where each illuminated image is formed on each of said at least two image pickup elements according to each corresponding output from said at least two image pickup elements, the computed positions including an indication of a location of the pointing body relative to a point determined by two coordinates in the plane and a coordinate distance of the pointing body above the plane during movement of the pointing body, and
means for inputting commands to a computer based at least on detected changes in the coordinate distance of the pointing body above the plane, the commands being other than drawing commands indicating pointing body movements for display.

2. The coordinate-position inputting/detecting device according to claim 1, wherein the means for inputting commands includes means for comparing the detected changes in the coordinate distance of the pointing body above the plane to reference distance data.

3. The coordinate-position inputting/detecting device according to claim 1 further comprising discriminating dust from the pointing body.

4. A coordinate-position inputting/detecting device comprising:
at least two image pickup elements provided with a prespecified space therebetween on a peripheral section of an entry area including a plane, the at least two image pickup elements each providing a pointing body monitoring output an indicating a two-dimensional light responsive area of each of the at least two image pickup elements receiving an illuminated image of a pointing body inserted into said entry area and moved therein to perform an entry operation;
a coordinate-value unit configured to compute positions where each illuminated image is formed on each of said at least two image pickup elements according to each corresponding output from said at least two image pickup elements, the computed positions including an indication of a location of the pointing body relative to a point determined by two coordinates in the plane and a coordinate distance of the pointing body above the plane during movement of the pointing body, and
an input configured to input commands to a computer based at least on detected changes in the coordinate distance of the pointing body above the plane, the commands being other than drawing commands indicating pointing body movements for display.

5. The coordinate-position inputting/detecting device according to claim 4, wherein the input configured to input commands includes a comparing unit configured to compare the detected changes in the coordinate distance of the pointing body above the plane to reference distance data.

6. The coordinate-position inputting/detecting device according to claim 4 further comprising a discriminating unit configured to discriminate dust from the pointing body.

7. A coordinate-position inputting/detecting method comprising the steps of:
obtaining an illuminated image of a pointing body inserted into an entry area on each of at least two image pickup elements provided with a prespecified space therebetween on a peripheral section of the entry area;
providing an output from each of the at least two image pickup elements that indicates an area on the corresponding one of the at least two image pickup elements having the corresponding illuminated image formed thereon;
computing positions where each of the illuminated images are formed on a corresponding one of said at least two image pickup elements according to each output;
identifying coordinates of a position of said pointing body in and above a plane in the entry area from the computed positions; and
determining whether or not changes in pointing body position are computer function controlling commands that are not displayed based at least on changes of distancing of the pointing body position above the plane.

8. The coordinate-position inputting/detecting method according to claim wherein the determining step includes comparing changes of distancing of the pointing body position above the plane to reference distance data.

9. The coordinate-position inputting/detecting method according to claim 7 further comprising a step of discriminating dust from the pointing body.

10. A display board system comprising at least:
display means for displaying characters and images;
a coordinate-position inputting/detecting device with an entry area provided in front of said display means; and
control means for determining if a pointing body motion in the entry area constitutes a drawing control or a function control according to input from said coordinate-position inputting/detecting device,
wherein the display means forms a display surface and the coordinate-position inputting/detecting device forms a writing surface of a display board as part of the entry area and said coordinate-position inputting/detecting device comprises,
at least two image pickup elements provided with a prespecified space therebetween on a peripheral section of an the entry area into which a the pointing body is inserted, with illuminated images of the pointing body inserted into said entry area being formed on an area of each of the at least two image pickup elements with each of the at least two image pickup elements providing an output corresponding to the area of each that the illuminated images are formed on, and
coordinate-value identifying means for computing positions where the illuminated images of said pointing body are formed according to each output from each of the at least two image pickup elements, the computed positions including an indication of a location of the pointing body relative to a point determined by two coordinates on the writing surface and a coordinate distance of the pointing body above the writing surface during movement of the pointing body,
wherein the control means determines if a pointing body motion in the entry area constitutes a drawing control or a function control based at least on detected changes in the coordinate distance of the pointing body above the writing surface.

11. A display board system according to claim 10, wherein said display means is a plasma display.

12. A display board system according to claim 10, wherein said display means further has a plurality of connecting means for connecting various types of information equipment including video equipment, and is usable as a large-sized screen monitor using said connecting means.

13. The display board system according to claim 10, wherein the control means determines if a pointing body motion in the entry area constitutes a drawing control or a function control based at least on detected changes in the coordinate distance of the pointing body above the writing surface by comparing the detected changes in the coordinate distance of the pointing body above the writing surface to reference distance data.

14. The display board system according to claim 10 further comprising a discriminating means for discriminating dust from the pointing body.

15. A display board system comprising at least:
display means for displaying characters and images;
a coordinate-position inputting detecting device with an entry area provided in front of said display means;
printing means for outputting image data onto a recording paper; and
control means for providing controls over the display by said display means as well as over printing operations by said printing means according to input from said coordinate-position inputting/detecting device,
wherein the display means forms a display surface and the coordinate-position inputting/detecting device forms a writing surface of the display board and said coordinate-position inputting/detecting device comprises,
at least two image pickup elements provided with a prespecified space therebetween on a peripheral section of an entry area, the at least two image pickup elements each providing an output indicating a portion of each of the at least two image pickup elements receiving an illuminated image of a pointing body inserted into said entry area to perform an entry operation, and
coordinate-value identifying means for computing positions where each illuminated image is formed on each of the at least two image pickup elements according to each corresponding output from the at least two image pickup elements, and for identifying coordinates of a position of said pointing body by using the computed positions;
and further wherein said control means is a personal computer and said display board system further comprises,
a frame unit having holding means for holding the display surface and the writing surface of the display board at a specified height,
a printer accommodating means for accommodating said printing means therein, and
control accommodating means for accommodating said control means therein,
wherein said control accommodating means and said printer accommodating means are arranged in the frame unit beneath the holding means.

16. A display board system according to claim 15; wherein said display means is a plasma display.

17. A display board system according to claim wherein said frame unit has a keyboard placement means provided at a position on the upper side of said printer accommodating means but on the lower side of said holding means for placing a keyboard connected to said personal computer.

18. A display board system according to claim 15; wherein said holding means includes an angle adjusting means for adjusting an angle of the display surface and the writing surface of the display board.

19. A display board system according to claim 15; wherein said display means further has a plurality of connecting means for connecting various types of information equipment including video equipment, and is usable as a large-sized screen monitor using said connecting means.

20. A display board system comprising at least:

display means for displaying characters and images;

a coordinate-position inputting/detecting device with an entry area provided in front of said display means;

printing means for outputting image data onto a recording paper; and control means for providing controls over the display by said display means as well as over printing operations by said printing means according to input from said coordinate-position inputting/detecting device, wherein the display means forms a display surface and the coordinate-position inputting/detecting device forms a writing surface of the display board and said coordinate-position inputting/detecting device comprises, light emitting means for emitting light into an entry area, at least two image pickup elements provided with a prespecified space therebetween on a peripheral section of said entry area for picking up illuminated images made up of light reflected from a pointing body inserted into the entry area and illuminated by the light emitted from said light emitting means, and coordinate-value identifying means receiving an output from each of the at least two image pickup elements resulting from corresponding illuminated images made up of light reflected from the pointing body impinging thereon and using each of the outputs for computing corresponding positions where the illuminated images of said pointing body are formed on corresponding ones of the at least two image pickup elements, and for identifying coordinates of a position of said pointing body by using the computed positions, and further wherein said control means is a personal computer and said display board system further comprises, a frame unit having holding means for holding the display surface and the writing surface of the display board at a specified height, a printer accommodating means for accommodating said printing means therein, and control accommodating means for accommodating said control means therein, wherein said control accommodating means and said printer accommodating means are arranged in the frame unit beneath the holding means.

21. A display board system according to claim 20; wherein said display means is a plasma display.

22. A display board system according to claim 20; wherein said frame unit has a keyboard placement means provided at a position on the upper side of said printer accommodating means but on the lower side of said holding means for placing a keyboard connected to said personal computer.

23. A display board system according to claim 20; wherein said holding means includes an angle adjusting means for adjusting an angle of the display surface and the writing surface of the display board.

24. A display board system according to claim 20; wherein said display means further has a plurality of connecting means for connecting various types of information equipment including video equipment, and is usable as a large-sized screen monitor using said connecting means.

* * * * *

UNITED STATES PATENT AND TRADEMARK OFFICE
CERTIFICATE OF CORRECTION

PATENT NO. : 6,760,009 B2  Page 1 of 1
APPLICATION NO. : 10/164648
DATED : July 6, 2004
INVENTOR(S) : Omura et al.

It is certified that error appears in the above-identified patent and that said Letters Patent is hereby corrected as shown below:

On the title page, Item (30), the Foreign Application Priority Data is incorrect. Item (30) should read:

-- (30)      Foreign Application Priority Data

Jun. 9, 1998   (JP) ..........................10-160302
    Jul. 30, 1998  (JP) ..........................10-215321
    Aug. 17, 1998  (JP) ..........................10-230960
    May 14, 1999   (JP) ..........................11-133795  --

Signed and Sealed this

Twenty-sixth Day of February, 2008

JON W. DUDAS
*Director of the United States Patent and Trademark Office*